United States Patent [19]

Rony et al.

[11] Patent Number: 5,280,424
[45] Date of Patent: Jan. 18, 1994

[54] OSCILLATORY SYSTEMS AND METHODS OF SYNTHESIZING SAME

[76] Inventors: Peter R. Rony, 1501 Highland Cir., Blacksburg, Va. 24060; Peter K. Mercure, 919 Vine St., Midland, Mich. 48640

[21] Appl. No.: 705,020

[22] Filed: May 22, 1991

[51] Int. Cl.$^5$ .................. G06F 15/46; G05B 13/02
[52] U.S. Cl. .................... 364/148; 422/62; 422/108; 364/155; 364/176; 364/500
[58] Field of Search .................... 364/148–166, 364/172, 176–179, 497–503, 556, 550, 551.01, 183; 422/62, 99–101, 105–116; 204/405–409

[56] References Cited

U.S. PATENT DOCUMENTS

| | | | |
|---|---|---|---|
| 3,576,441 | 4/1971 | Adams et al. | 341/13 X |
| 3,590,227 | 6/1971 | Porter et al. | 364/500 X |
| 3,769,178 | 10/1973 | Rothermel, Jr. | 364/500 X |
| 4,076,503 | 2/1978 | Atwood et al. | 141/90 X |
| 4,095,272 | 6/1978 | Vanzen | 364/497 |
| 4,272,329 | 6/1981 | Hetrick et al. | 204/1 T |
| 4,396,466 | 8/1983 | Hetrick et al. | 204/1 T |
| 4,408,169 | 10/1983 | Fraser | 331/65 |

OTHER PUBLICATIONS

Epstein, I. *Chemical Engineering News*, "Patterns in Time and Space-Generated by Chemistry" Mar. 30, 1987.

Epstein et al. *Scientific American*, Mar. 1983, "Oscillating Chemical Reactions."

Borman, S., *Chemical & Engineering News*, "Electrodes a Few Atoms Wide Made at Caltech," p. 8, Nov. 26, 1990.

Penner et al., *Science*, 250, 1118–1121 (Nov. 23, 1990).

*Primary Examiner*—Joseph Ruggiero
*Attorney, Agent, or Firm*—Synnestvedt & Lechner

[57] ABSTRACT

Methods of synthesizing stable oscillatory chemical systems from chemical systems having at least one output dynamically related to at least one input are provided. The output and input of the chemical system are selected such that a dynamic relation exists between the input/output pair. The chemical pair is then analyzed to determine whether the response of said output to a change in the input is a cumulative response or resilient response. If the input/output response relationship of the selected input/output pair is determined to be resilient, then the methods require connecting a feedback block between said output and said input, said feedback having non-linear dynamics and inverting preaction hysteresis characteristics, or optionally repeating the selection and analysis steps with the different input/output pair until said output exhibits a cumulative response to a change in the input. If the response is determined to be cumulative, the methods require connecting a feedback block between said chemical system output and said chemical system input, said feedback block having non-linear dynamics and inverting Schmitt trigger hysteresis characteristics.

20 Claims, 45 Drawing Sheets

Figure 3. The Schmitt Trigger

Figure 4. The Pre-Action Trigger

Platinum electrode hanging Mercury drop electrode

Figure 15. Potential output section of potentiostat

Figure 16. Current measuring and output

Figure 17. Power supply for potentiostat

Figure 18. Series of scanning voltammograms (ferricyanide, 2 to 8 millimolar)

Figure 19. Peak scanning voltammetry current as a function of concentration (ferricyanide)

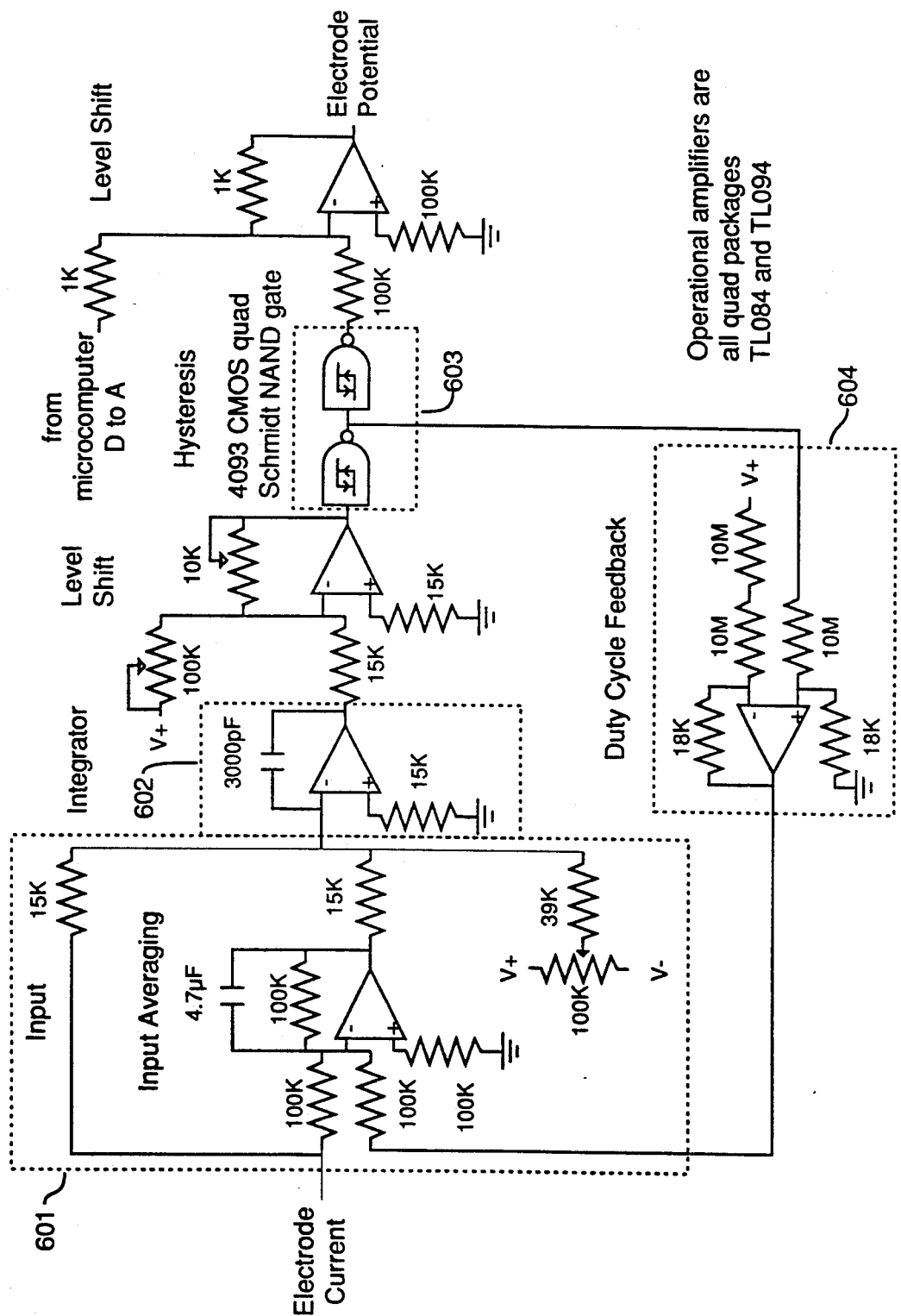
Figure 22 Complete oscillogenic feedback circuit

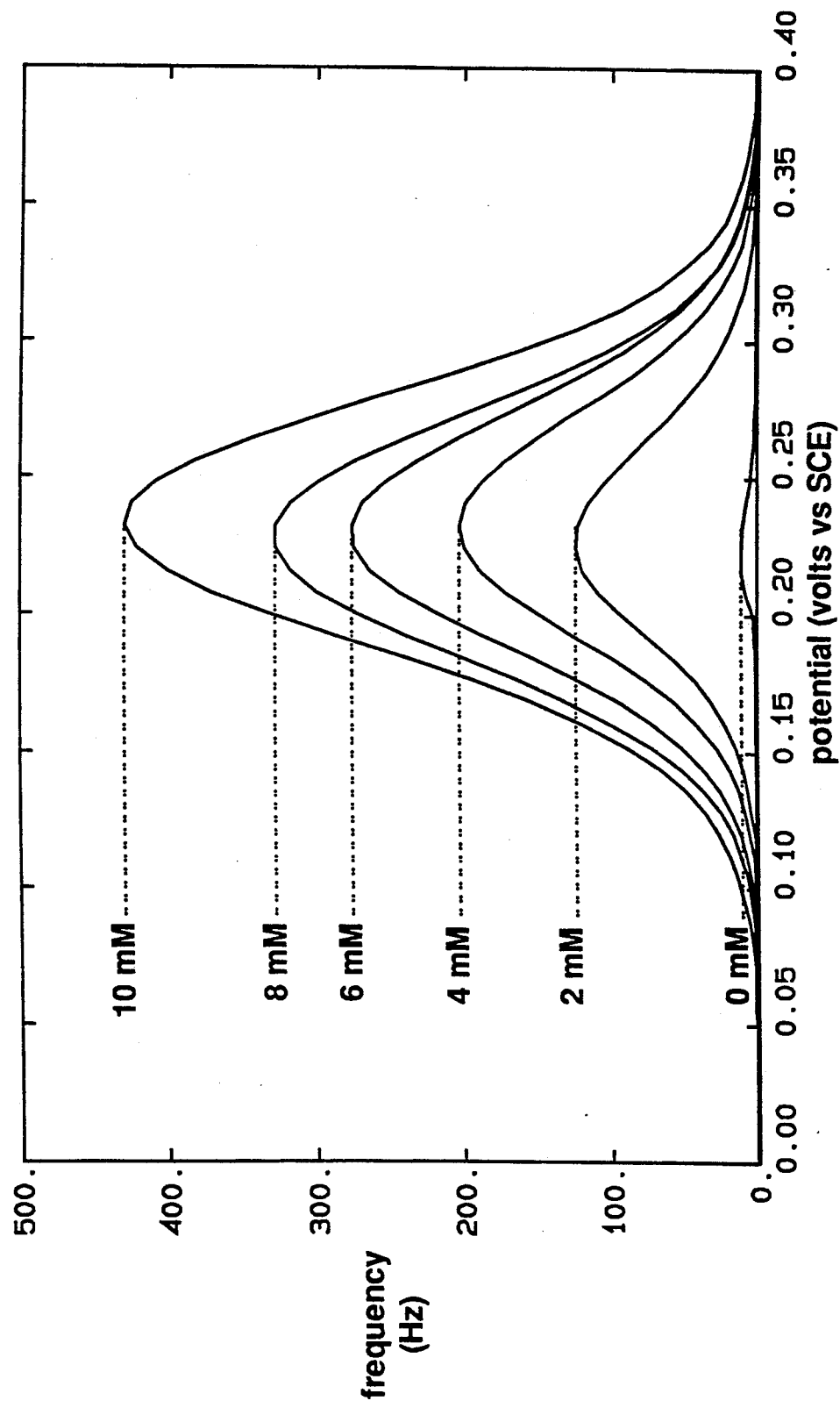
Figure 23. Electrochemical Oscillogenic Scan (ferricyanide with platinum electrode)

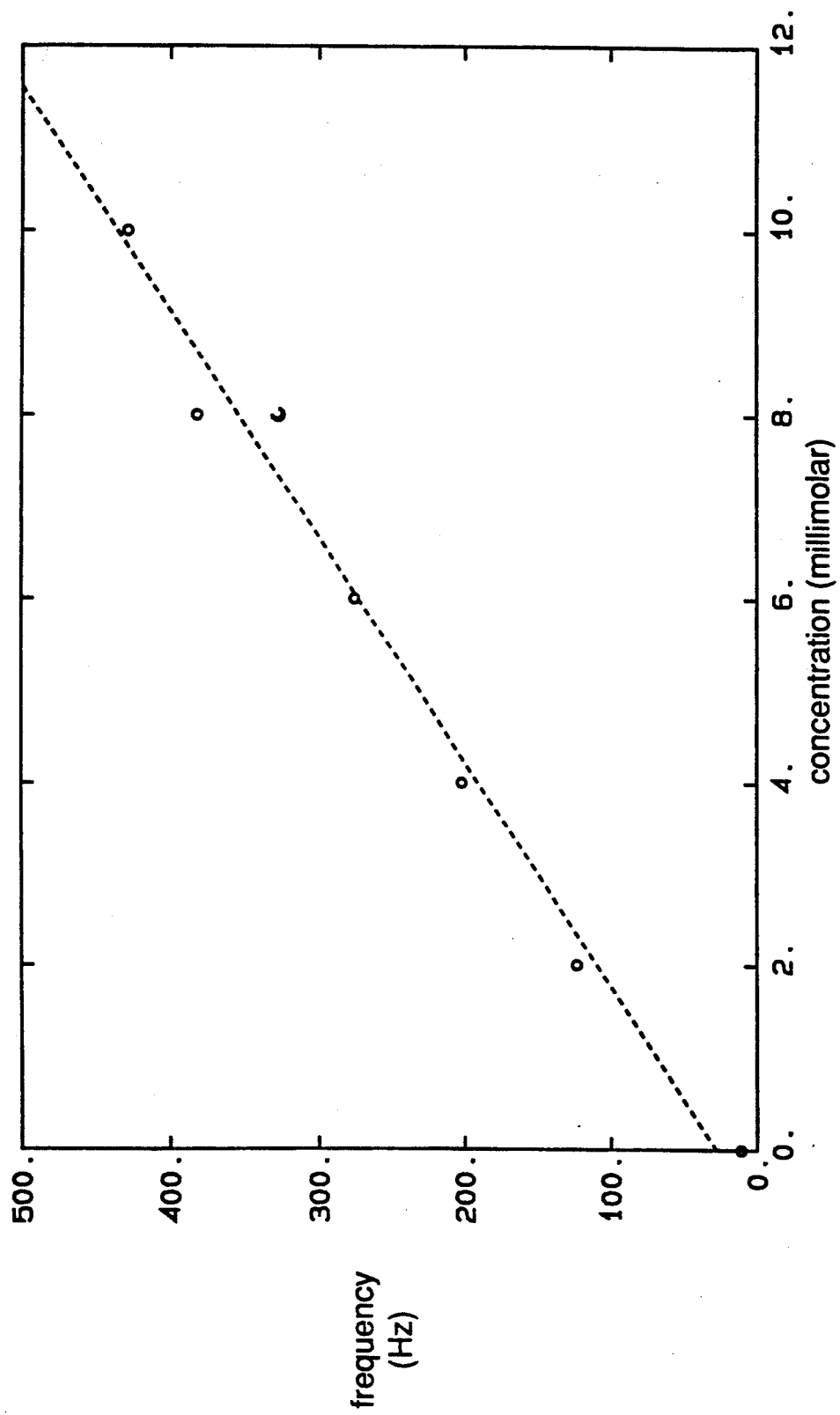
Figure 24 Electrochemical Oscillogenic Scan
Peak frequency as a function of concentration

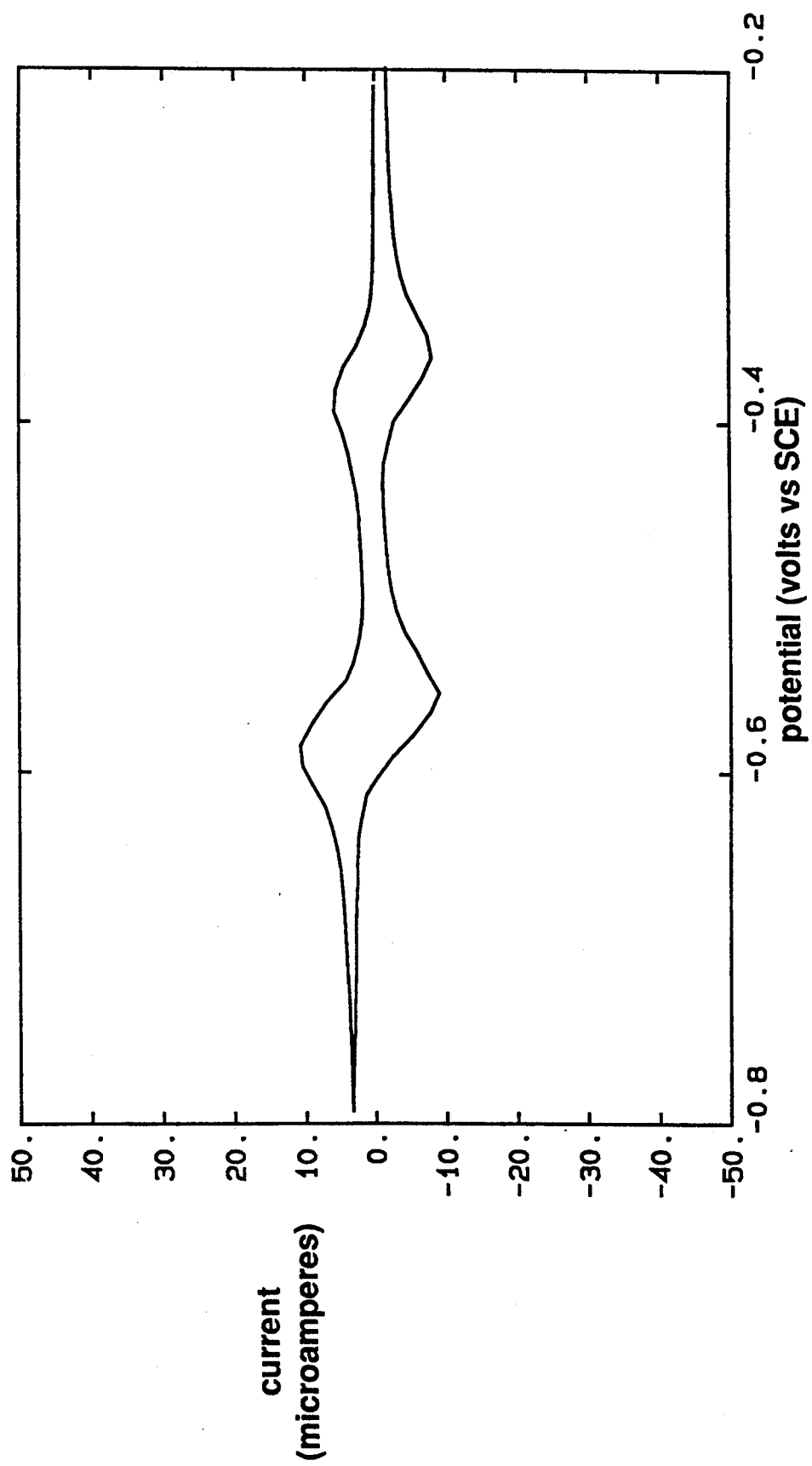
Figure 25. Scanning voltammetry of Cd(II)/Pb(II) (4 mM Cd, 2 mM Pb)

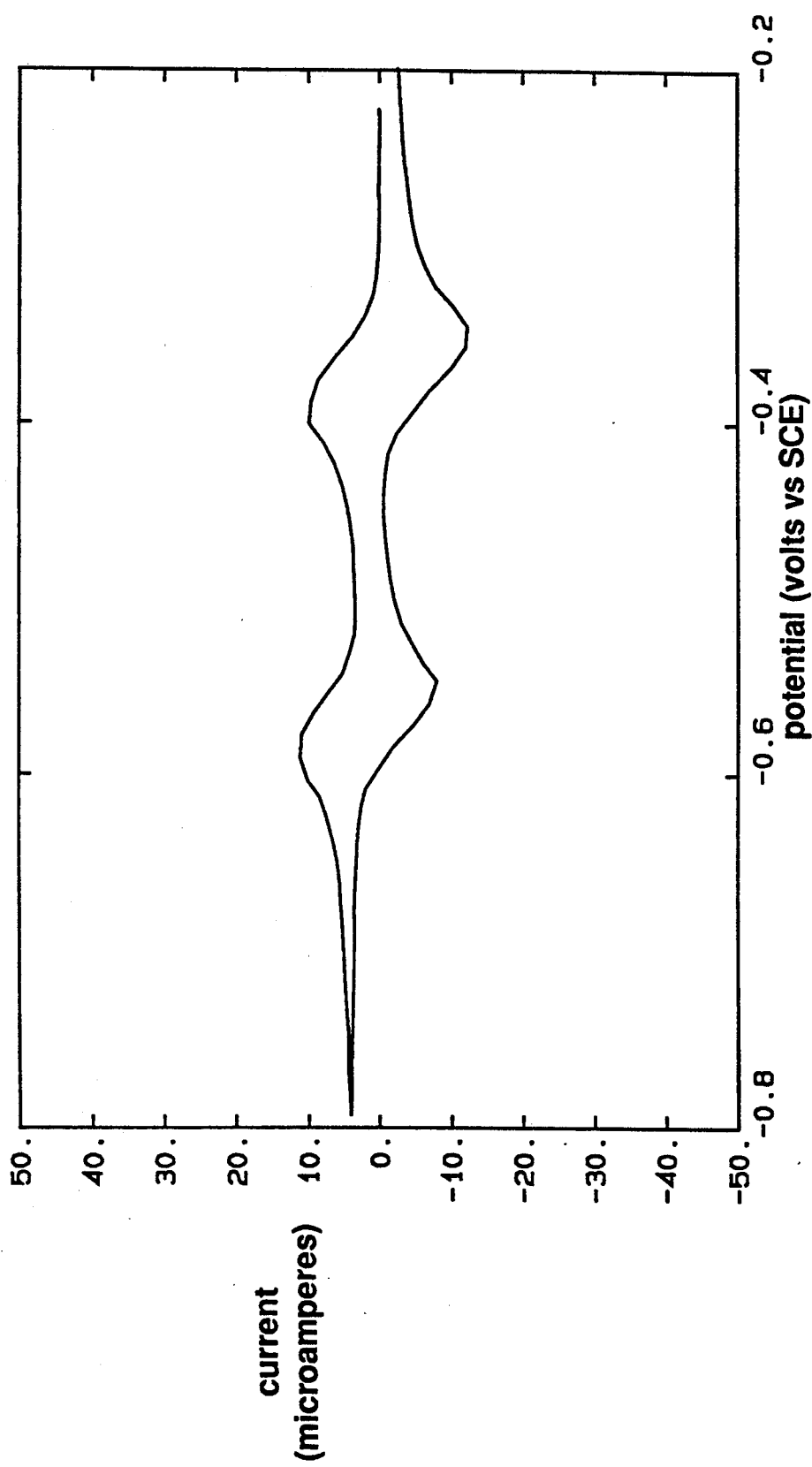
Figure 26. Scanning voltammetry of Cd(II)/Pb(II) (4 mM Cd, 4 mM Pb)

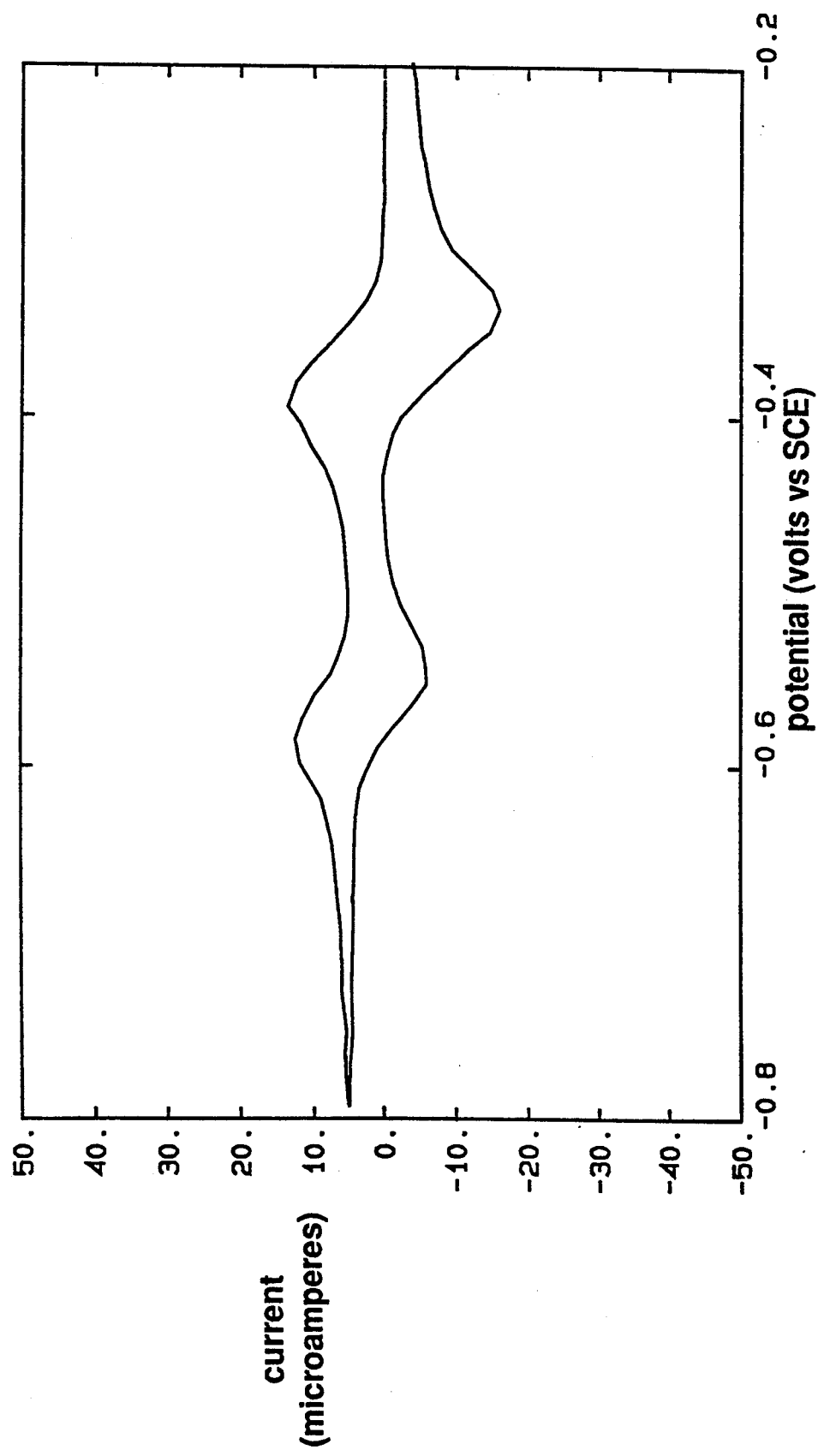
Figure 27. Scanning voltammetry of Cd(II)/Pb(II) (4 mM Cd, 6 mM Pb)

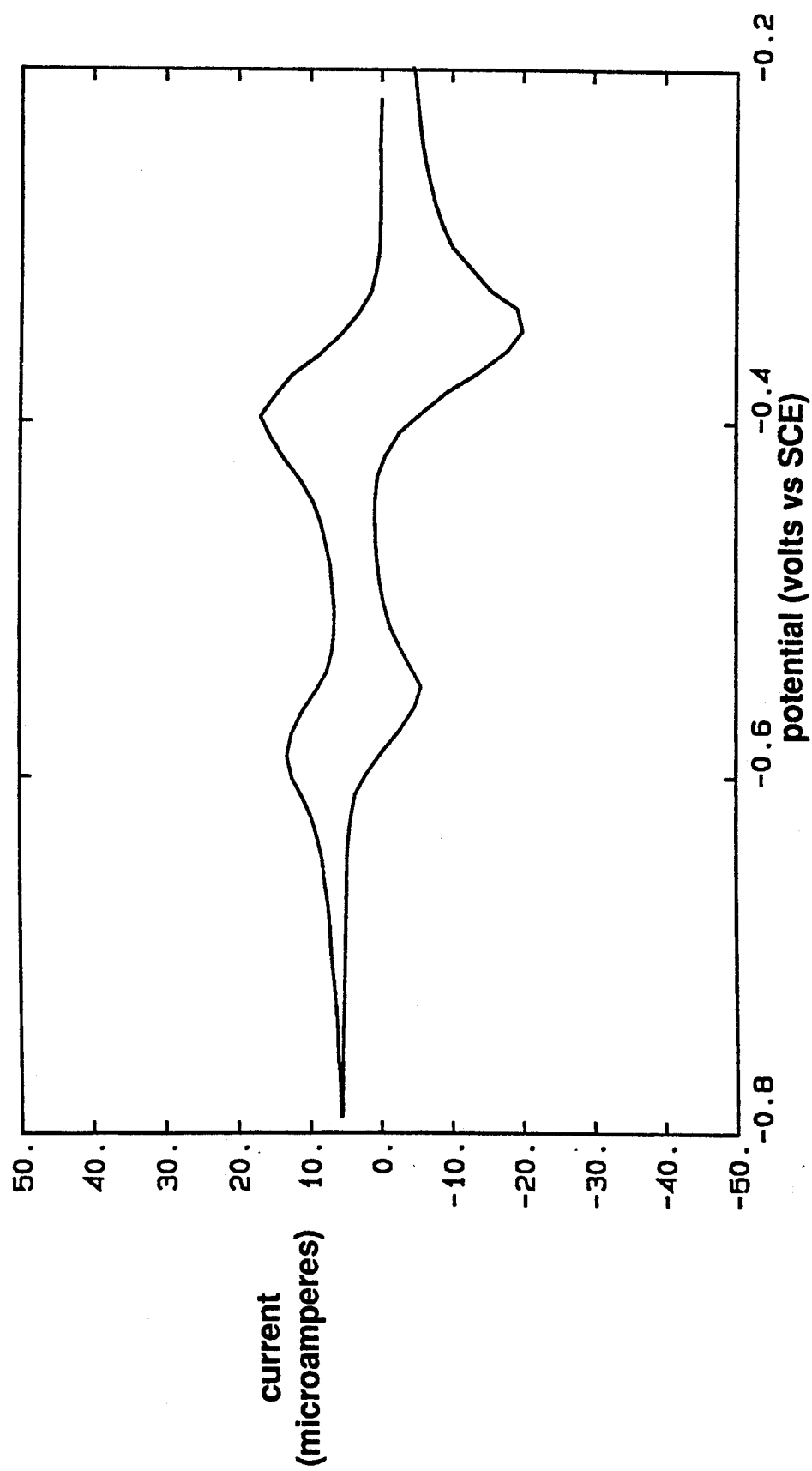
Figure 28. Scanning voltammetry of Cd(II)/Pb(II) (4 mM Cd, 8 mM Pb)

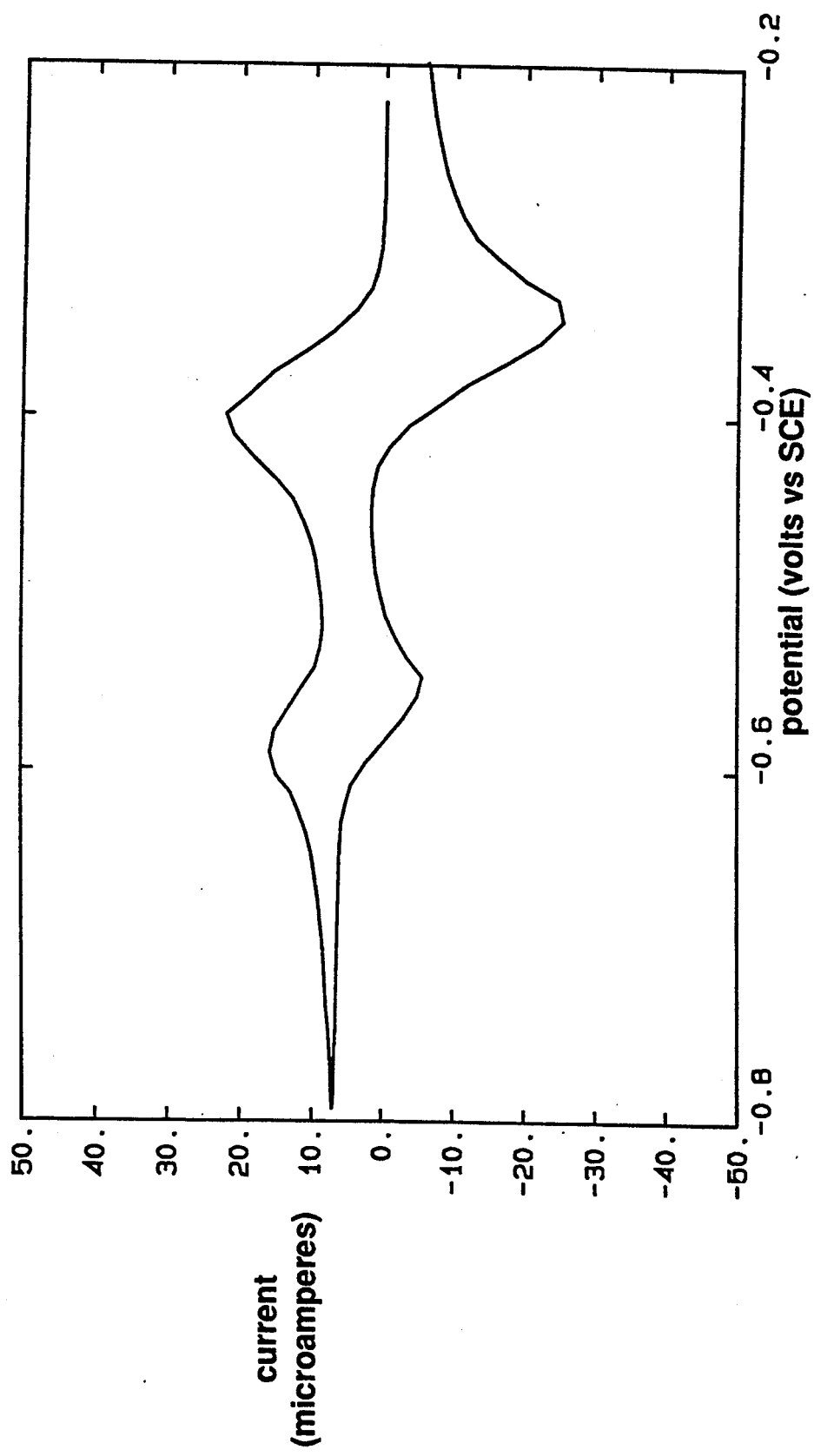
Figure 29. Scanning voltammetry of Cd(II)/Pb(II) (4 mM Cd, 10 mM Pb)

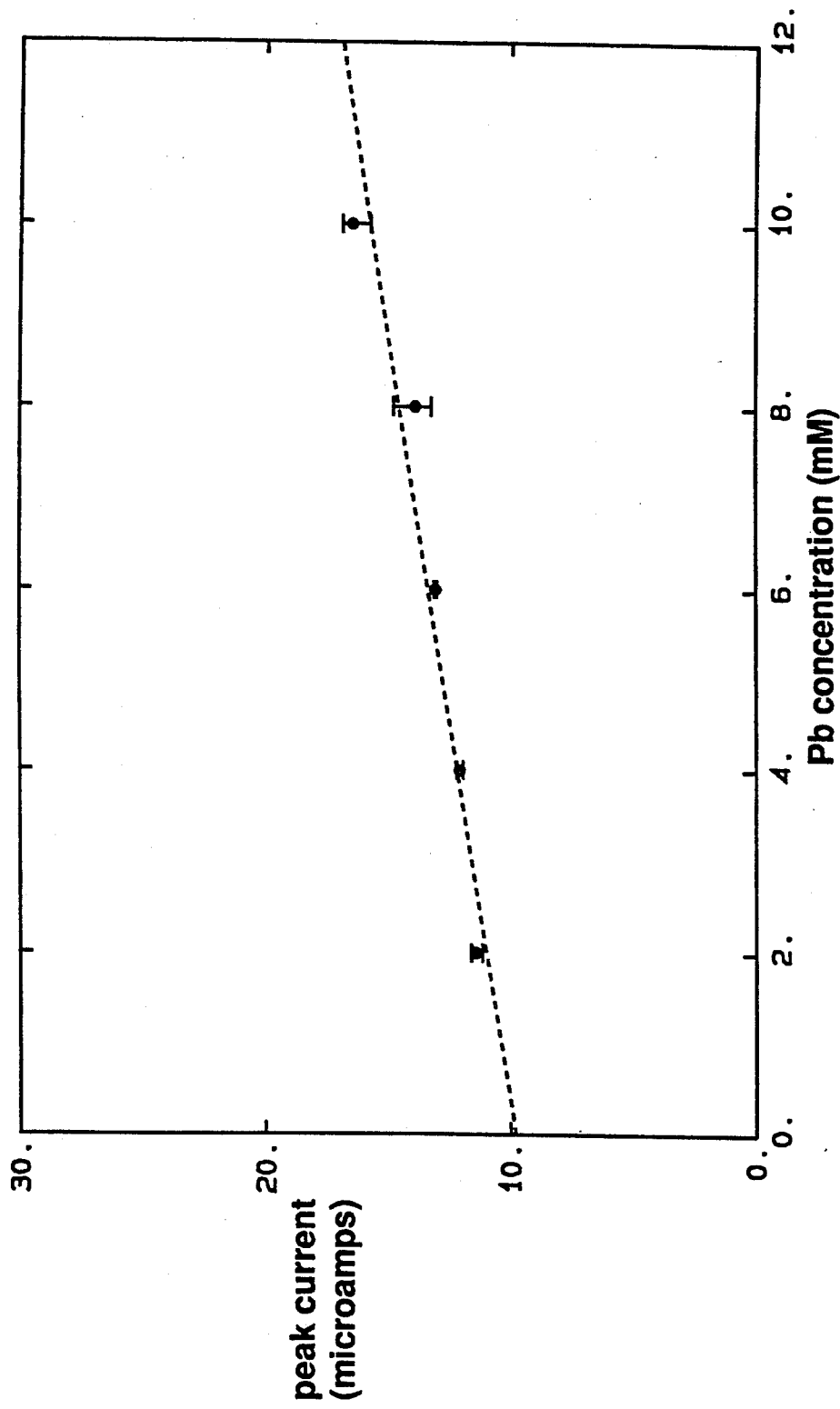
Figure 30. Cadmium (II) peak in scanning voltammetry

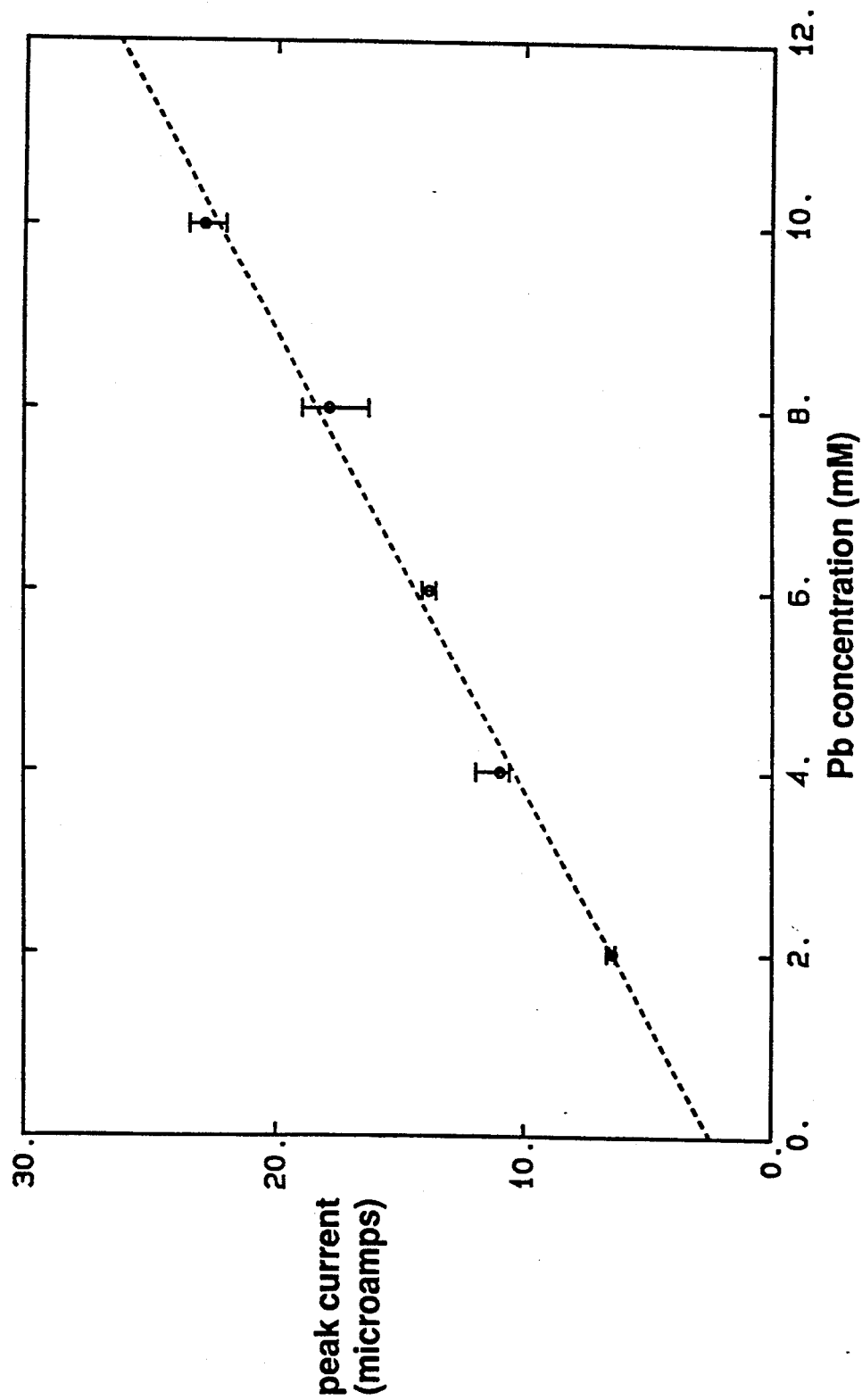
Figure 31. Lead (II) peak in scanning voltammetry

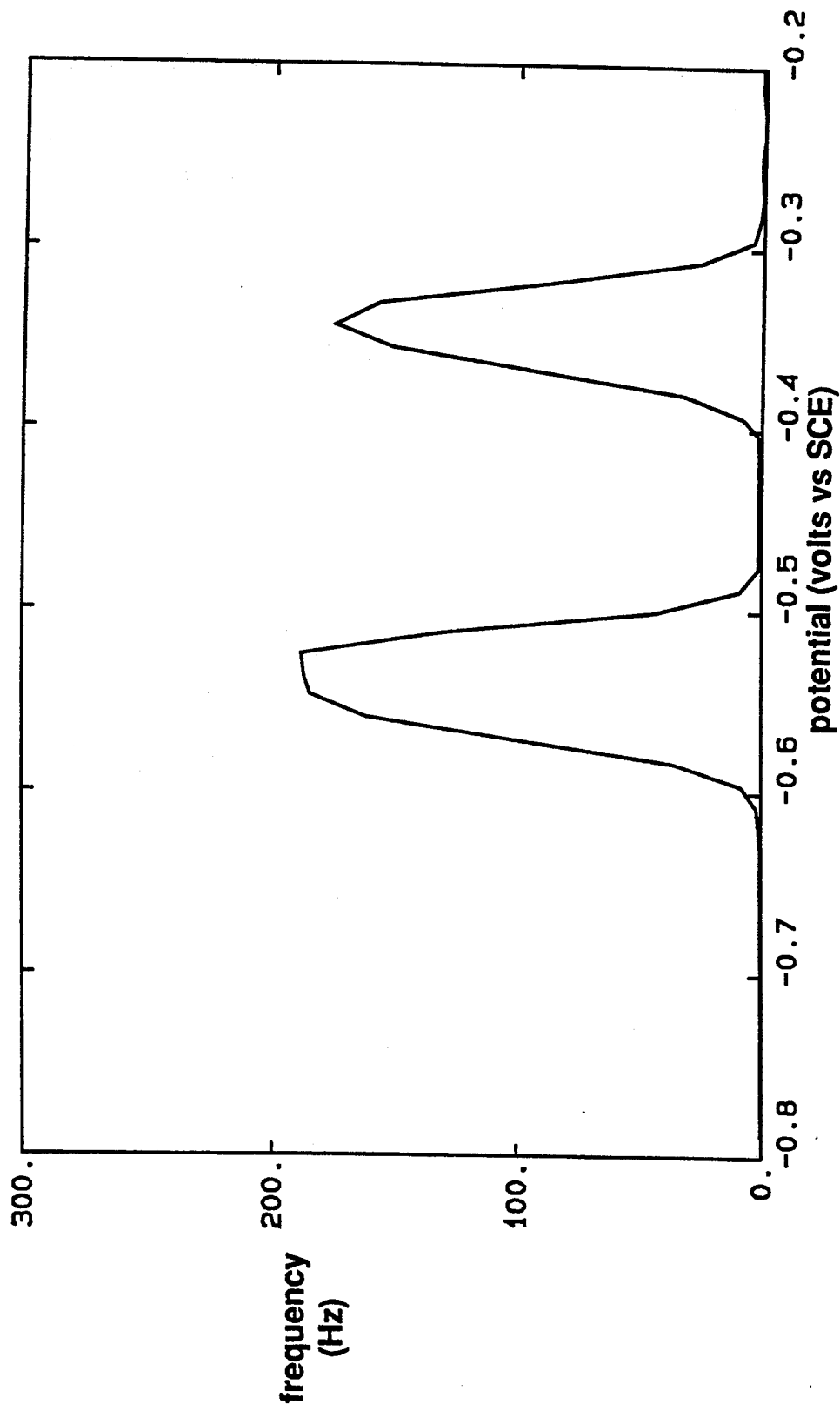
Figure 32. Oscillogenic Scan of Cd(II)/Pb(II) (4 mM Cd, 2 mM Pb)

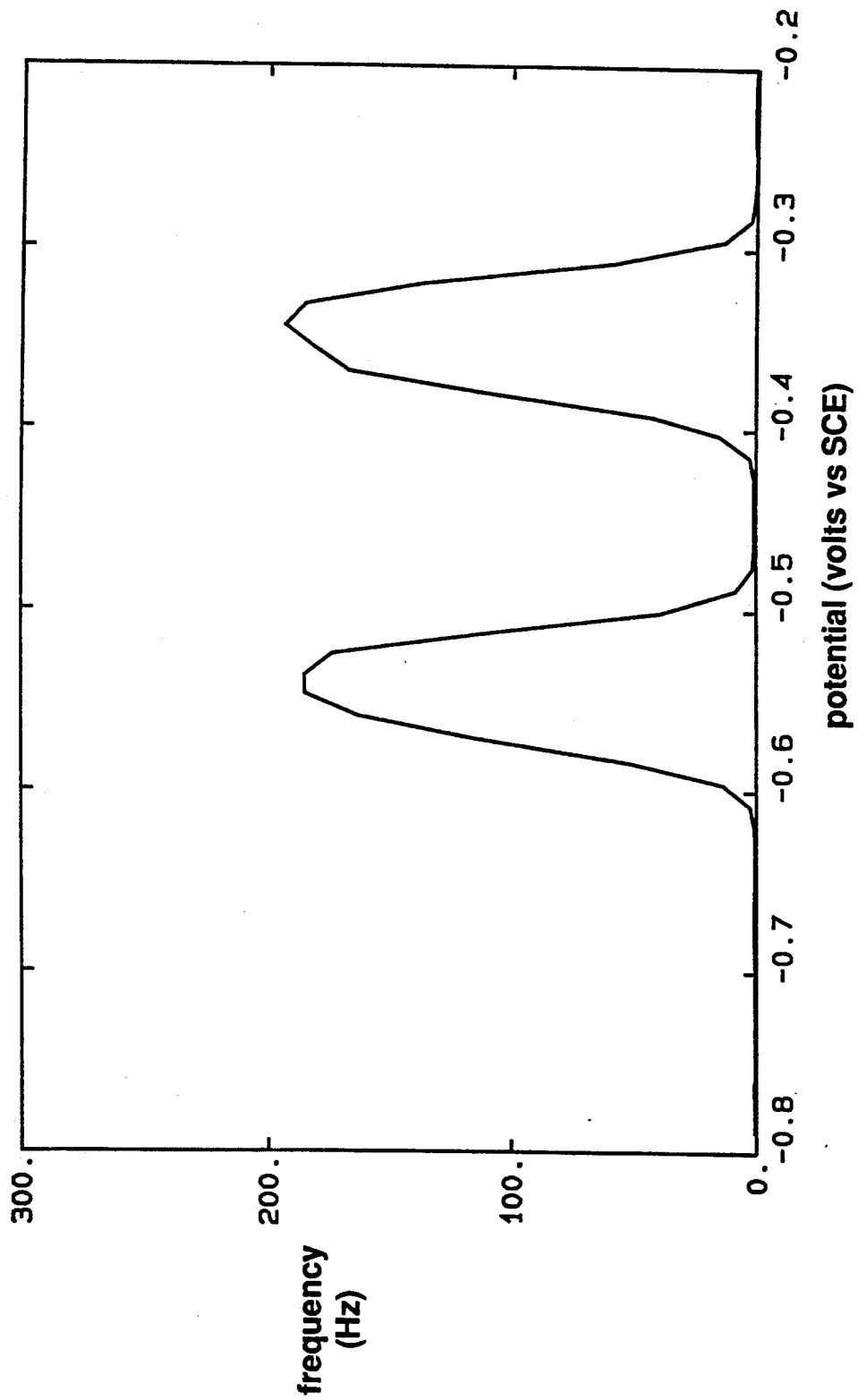
Figure 33. Oscillogenic Scan of Cd(II)/Pb(II) (4 mM Cd, 4 mM Pb)

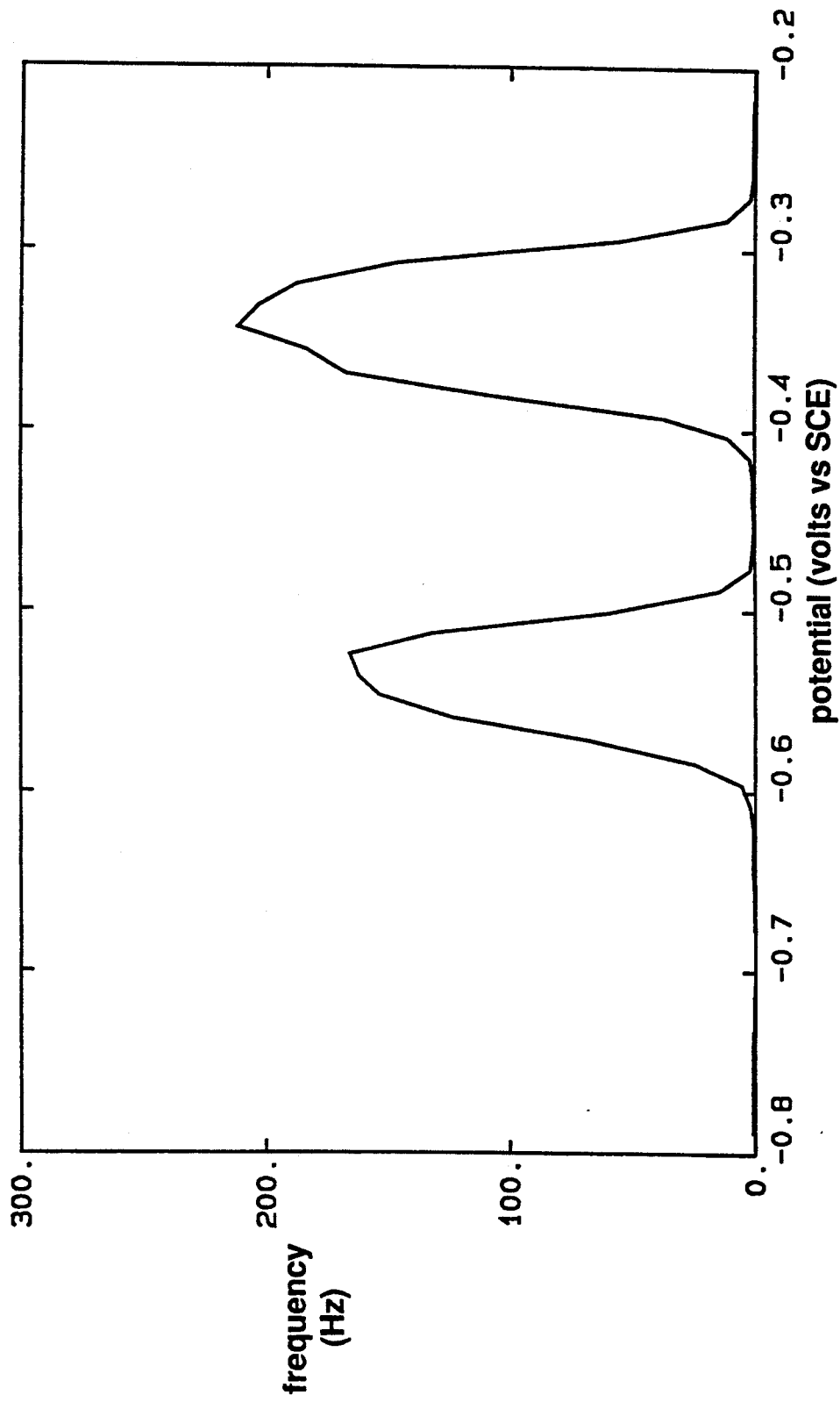
Figure 34. Oscillogenic Scan of Cd(II)/Pb(II) (4 mM Cd, 6 mM Pb)

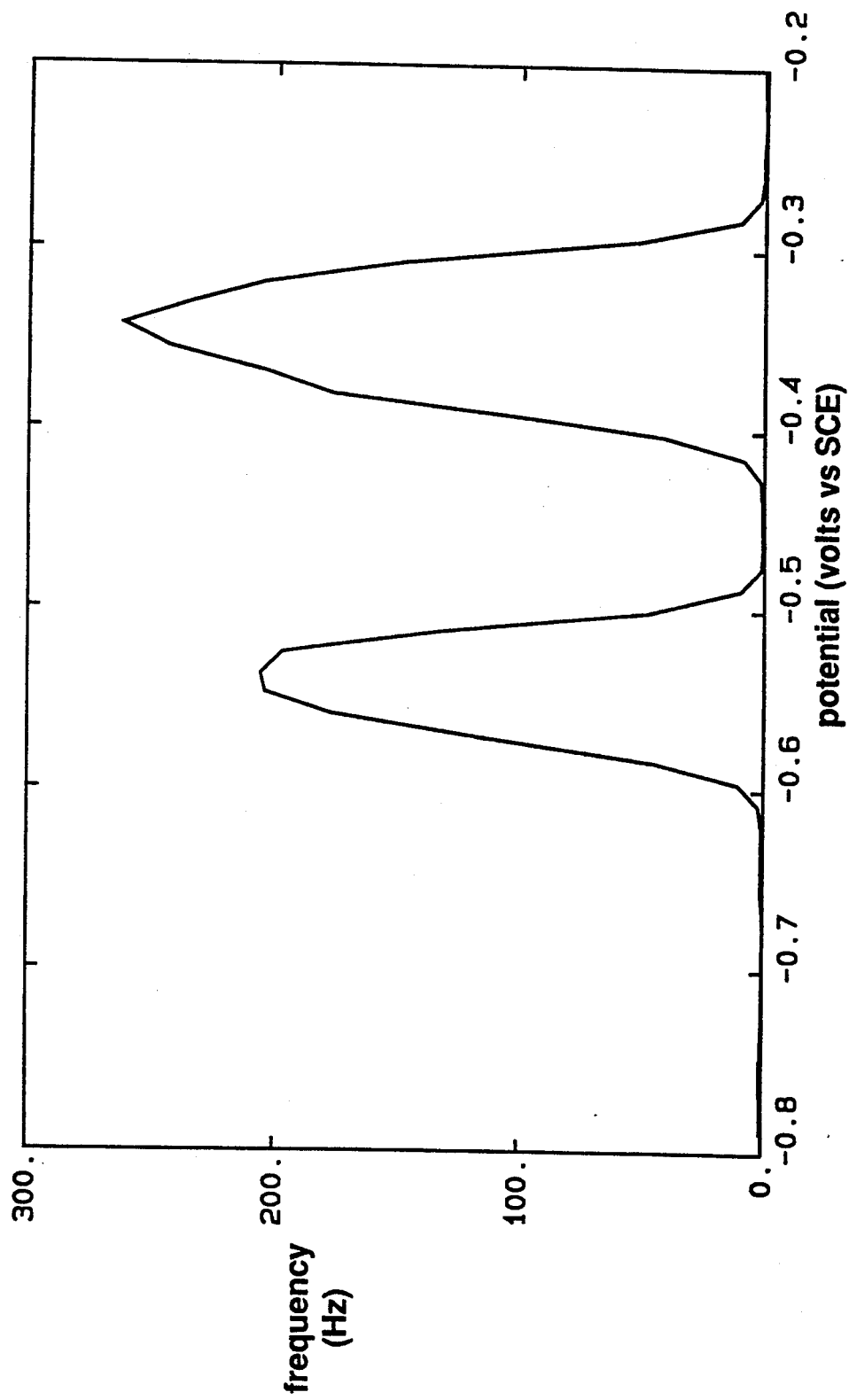
Figure 35. Oscillogenic Scan of Cd(II)/Pb(II) (4 mM Cd, 8 mM Pb)

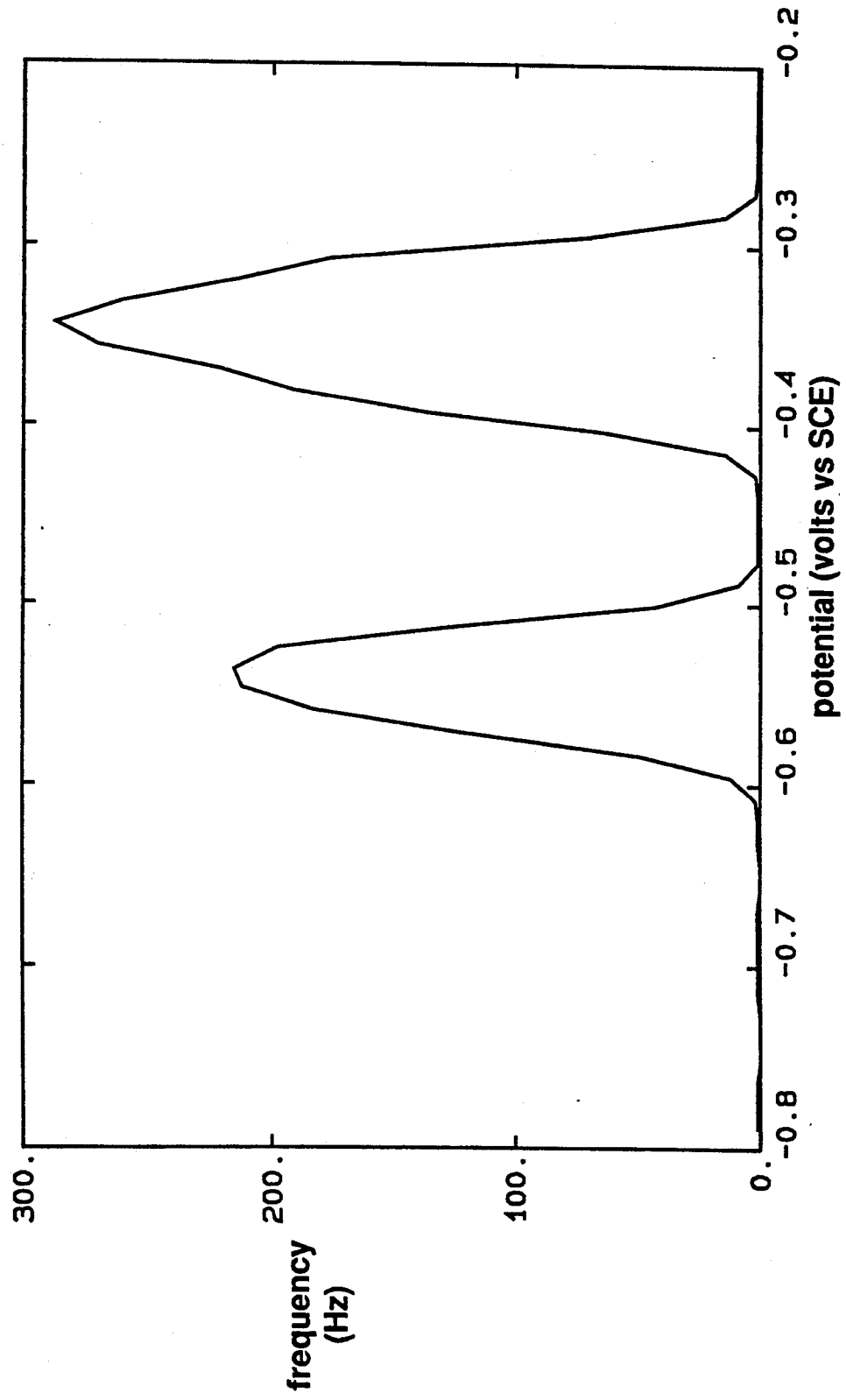
Figure 36. Oscillogenic Scan of Cd(II)/Pb(II) (4 mM Cd, 10 mM Pb)

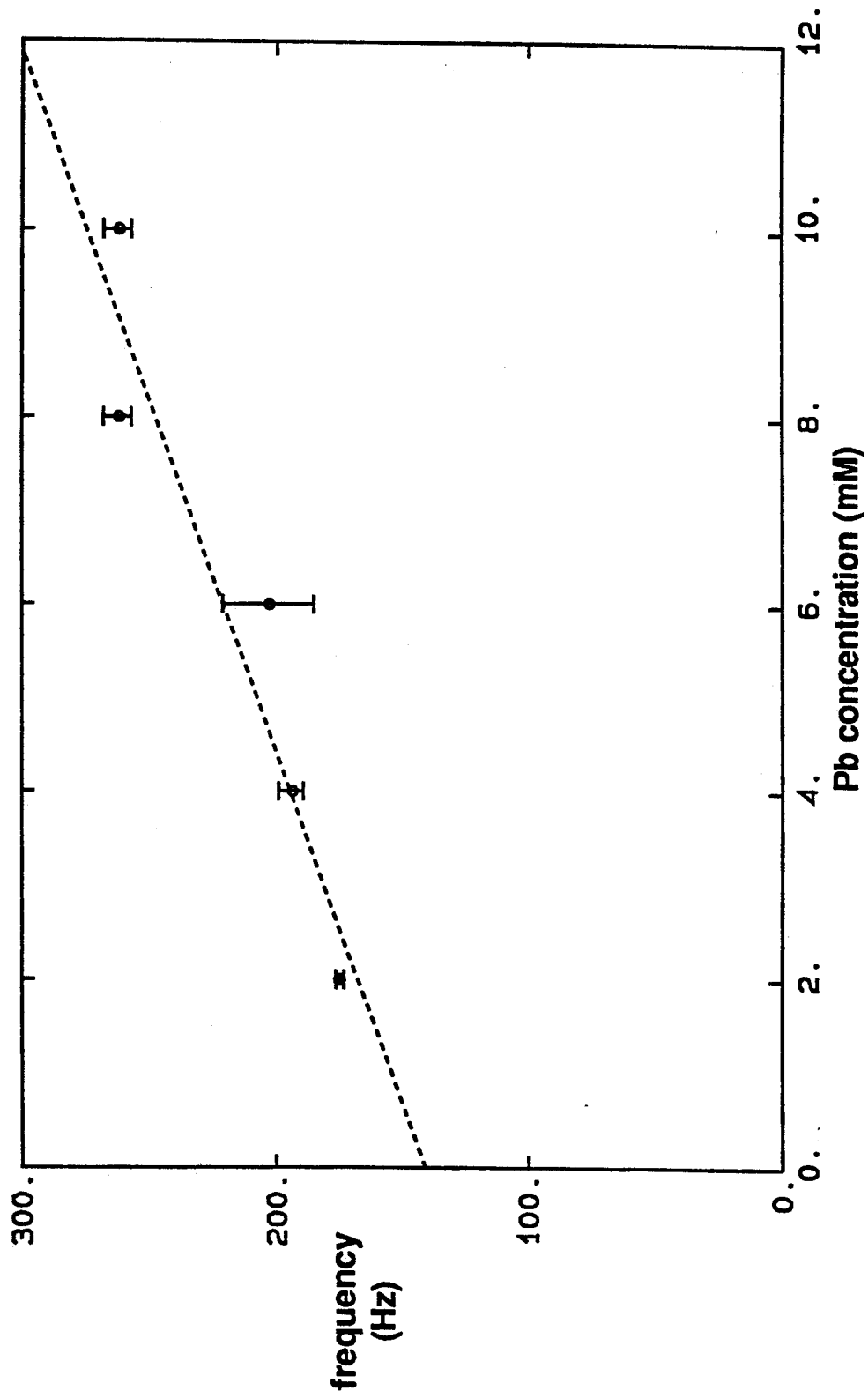
Figure 37. Lead (II) peak in oscillogenic scan

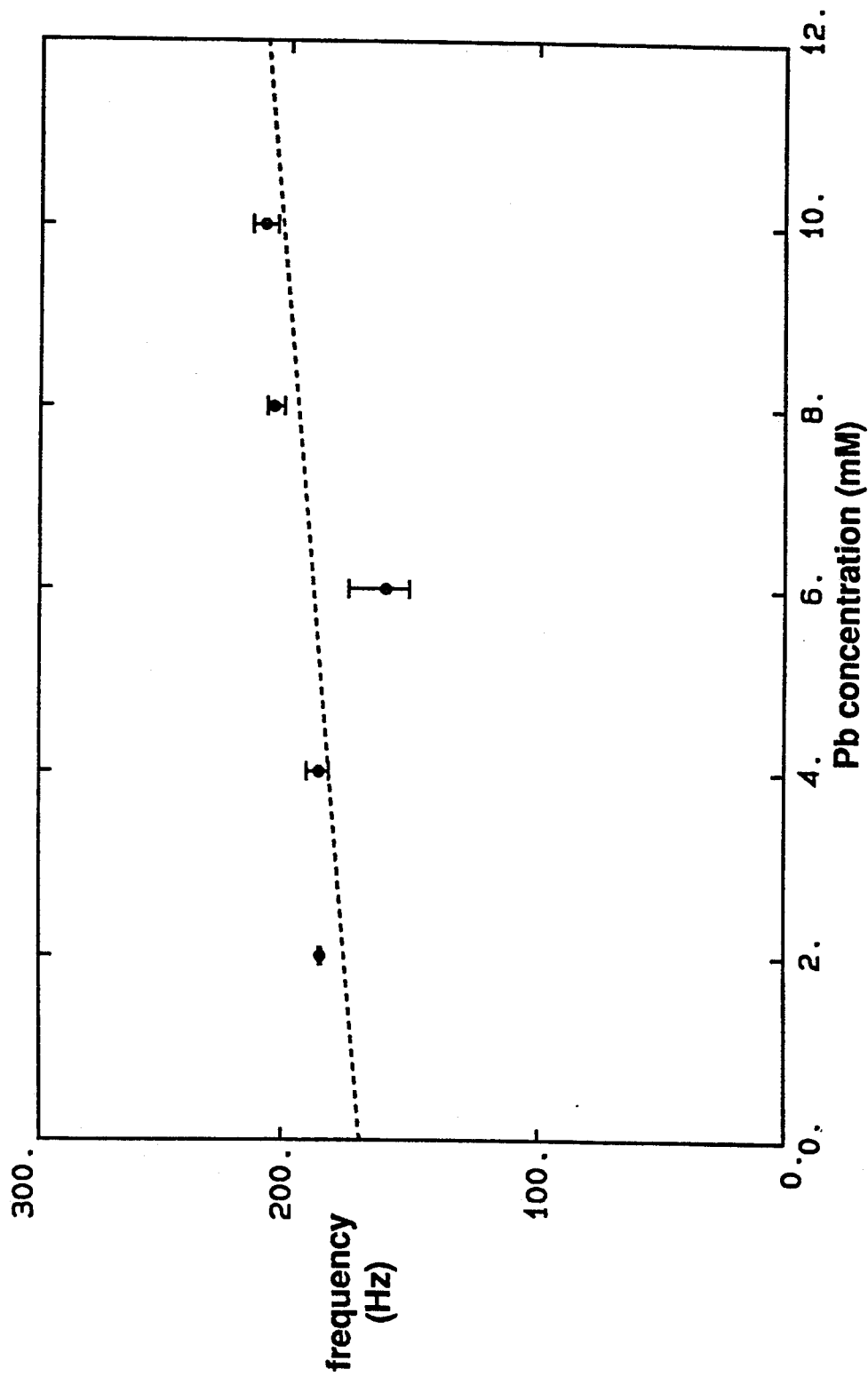
Figure 38. Cadmium (II) peak in oscillogenic scan

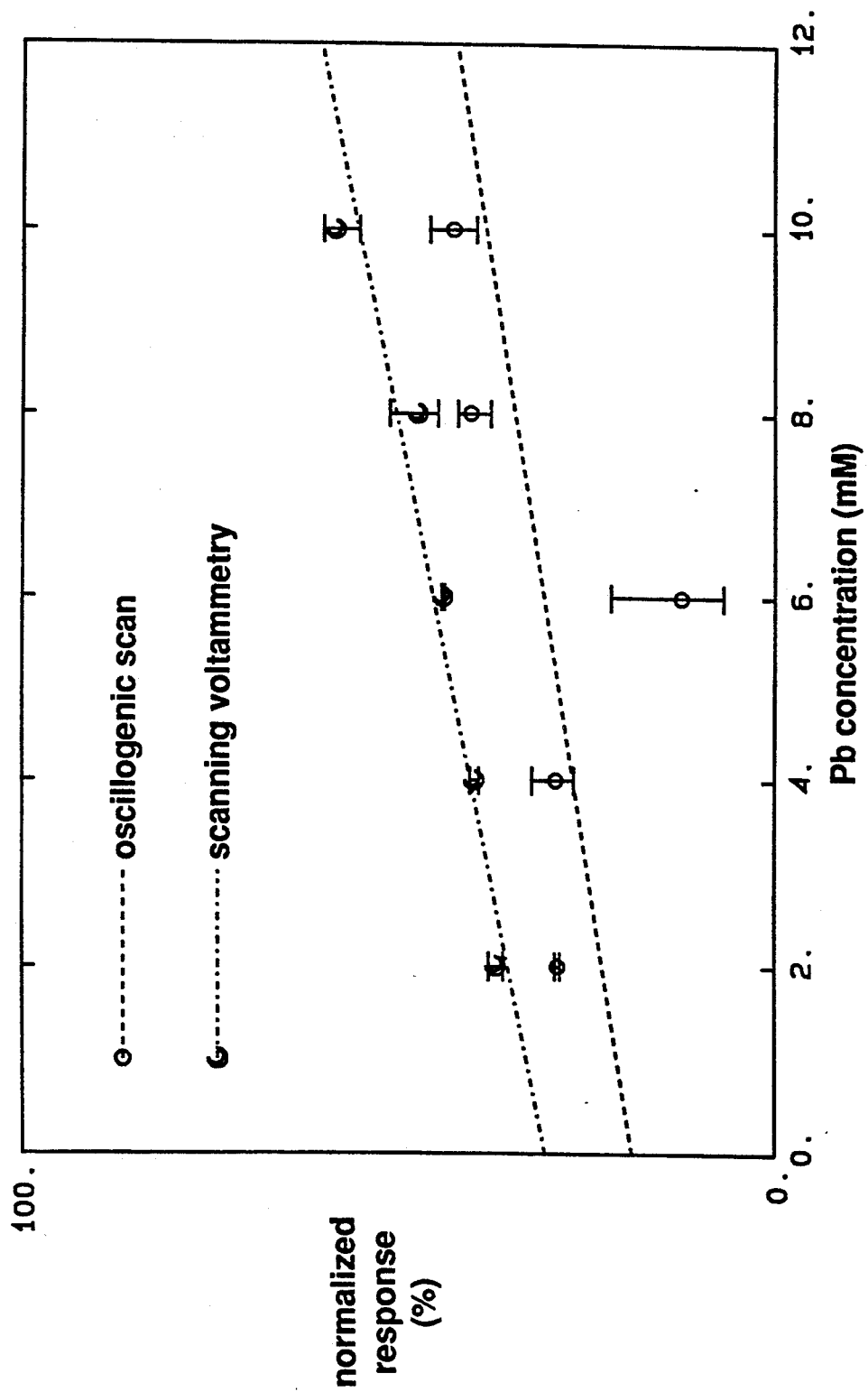
Figure 39. Cadmium peaks as a function of Lead concentration (normalized based on minimum and maximum Lead response)

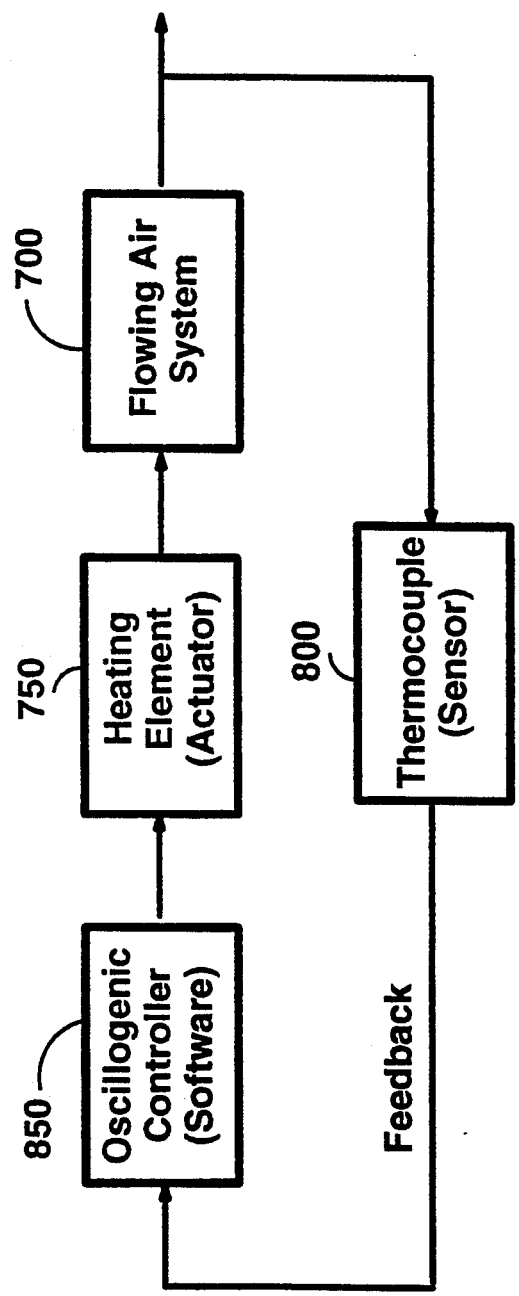
Figure 40. Thermal Oscillogenic System

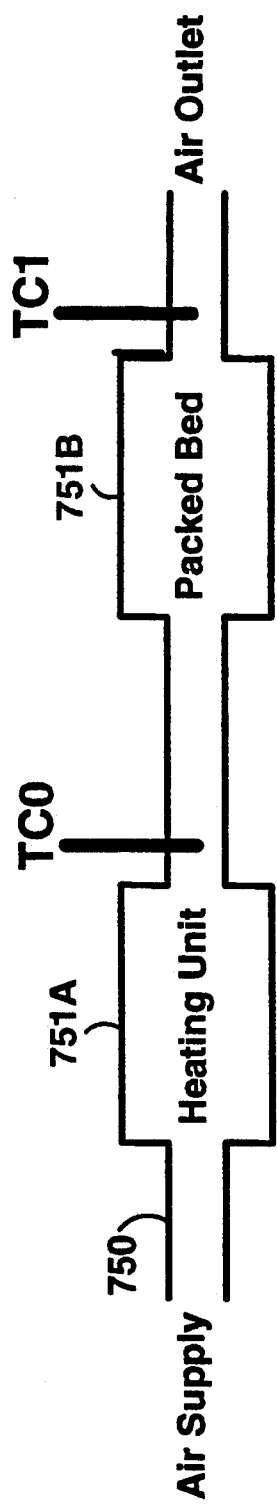
Figure 41. Forced Air Thermal System

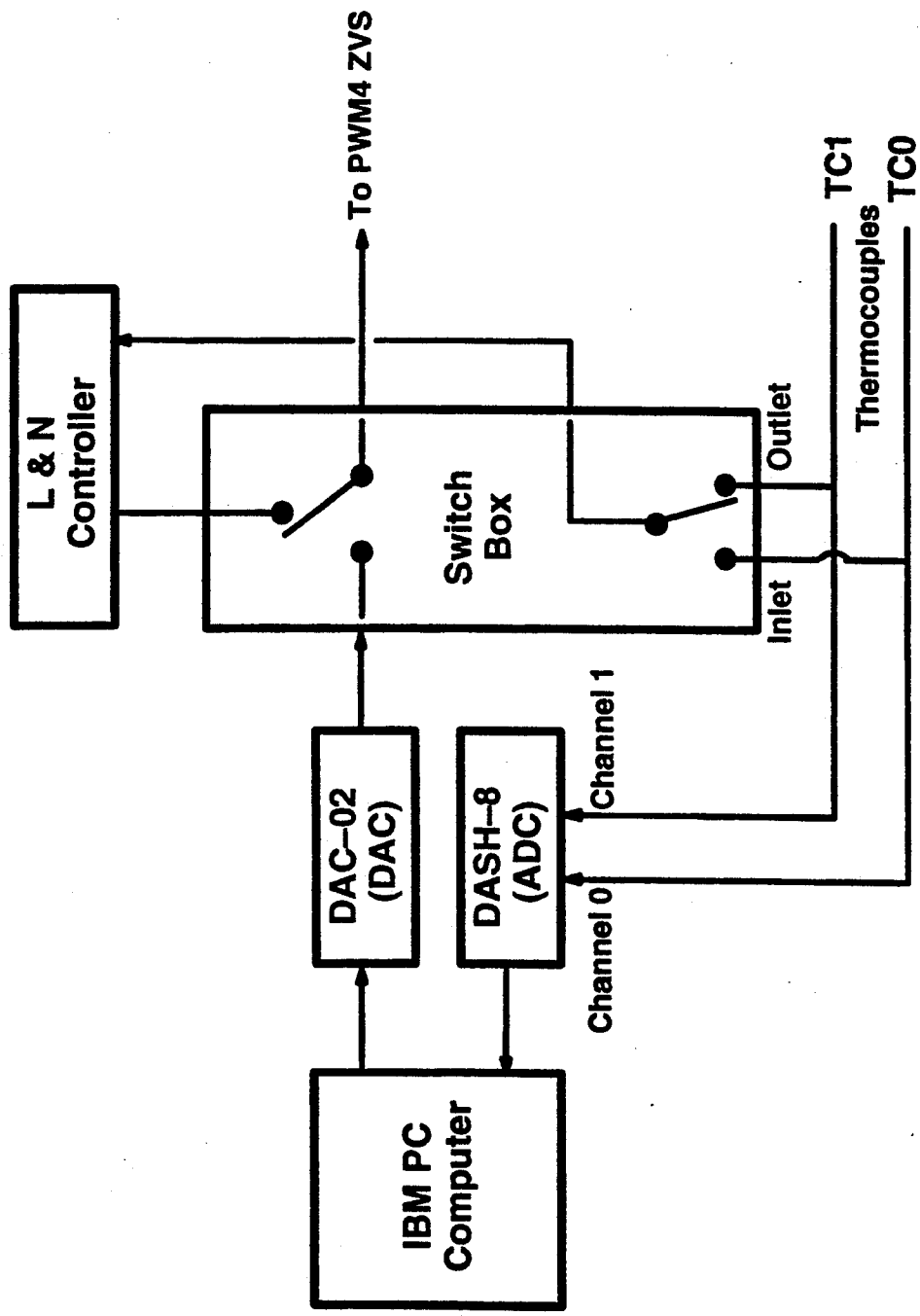
Figure 42. IBM PC and L&N Interface

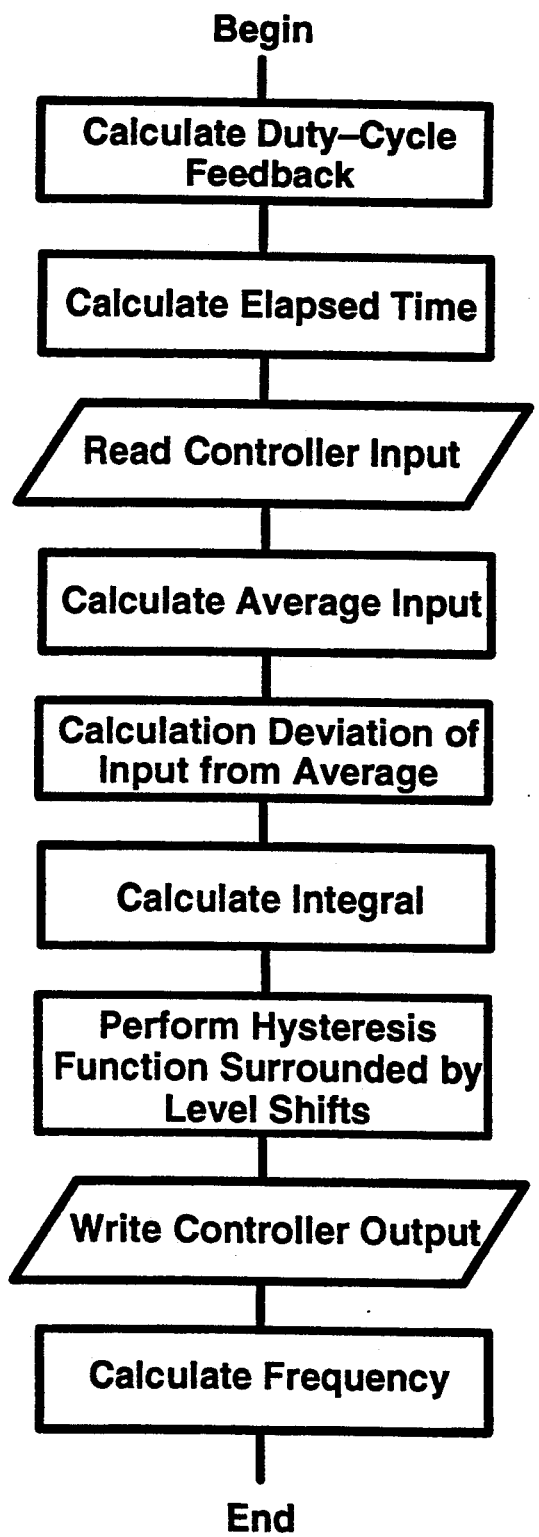
Figure 43A. Oscillogenic Control Algorithm

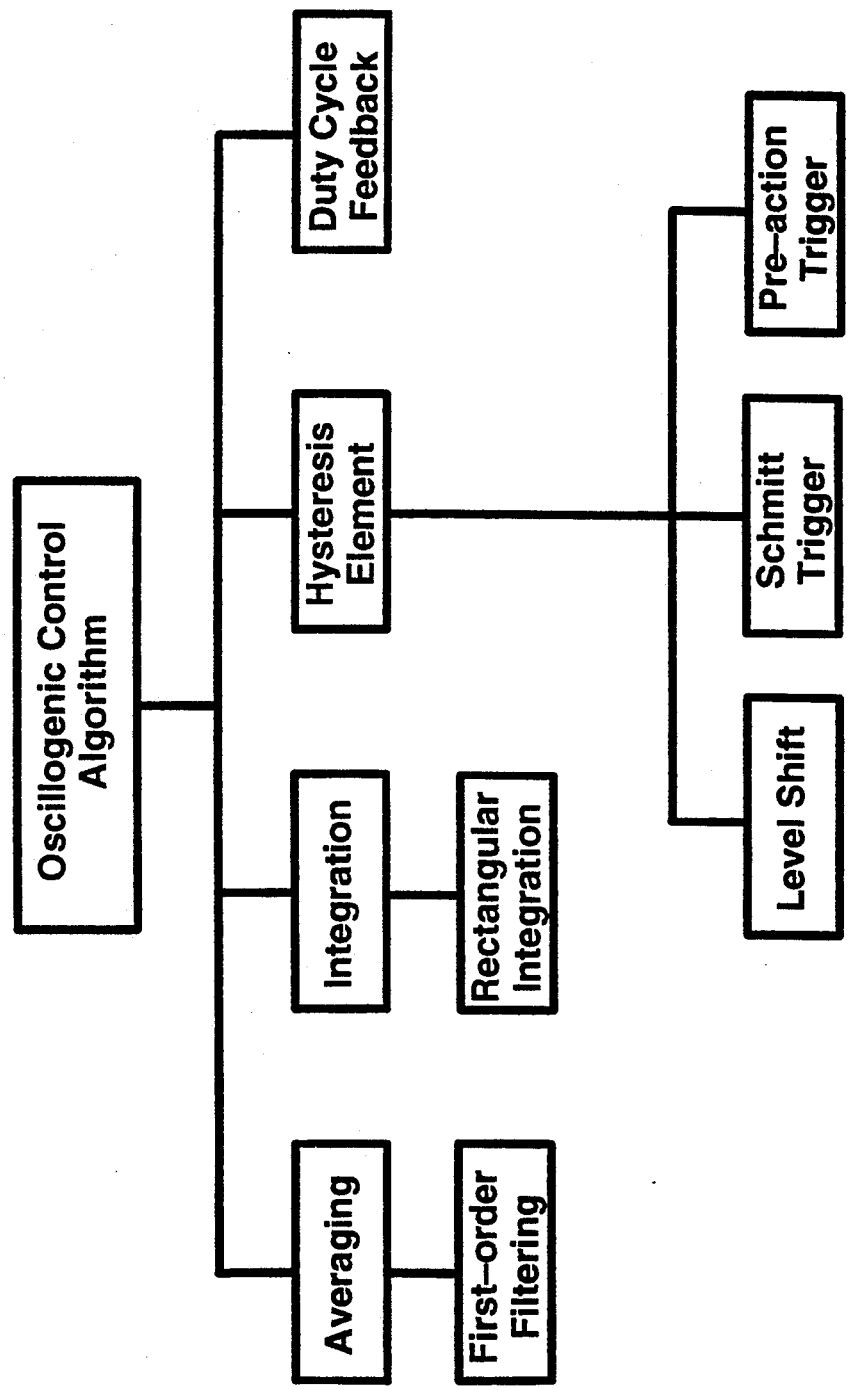
Figure 43B. Top-down Diagram for Oscillogenic Control Algorithm Software Design

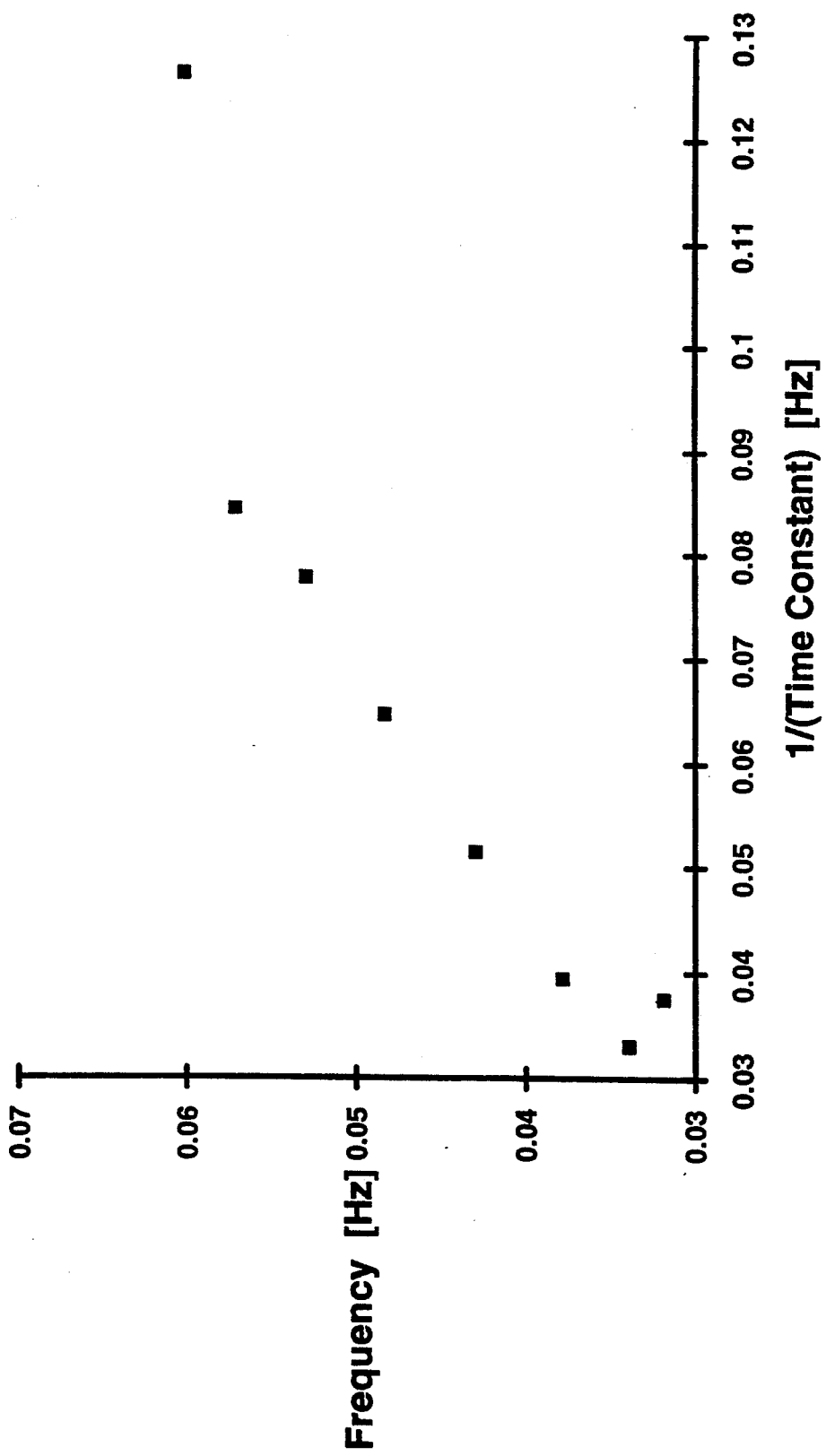
Figure 44. Frequency of Thermal Oscillogenic Instrument as a Function of Reciprocal FOPDT Time Constant

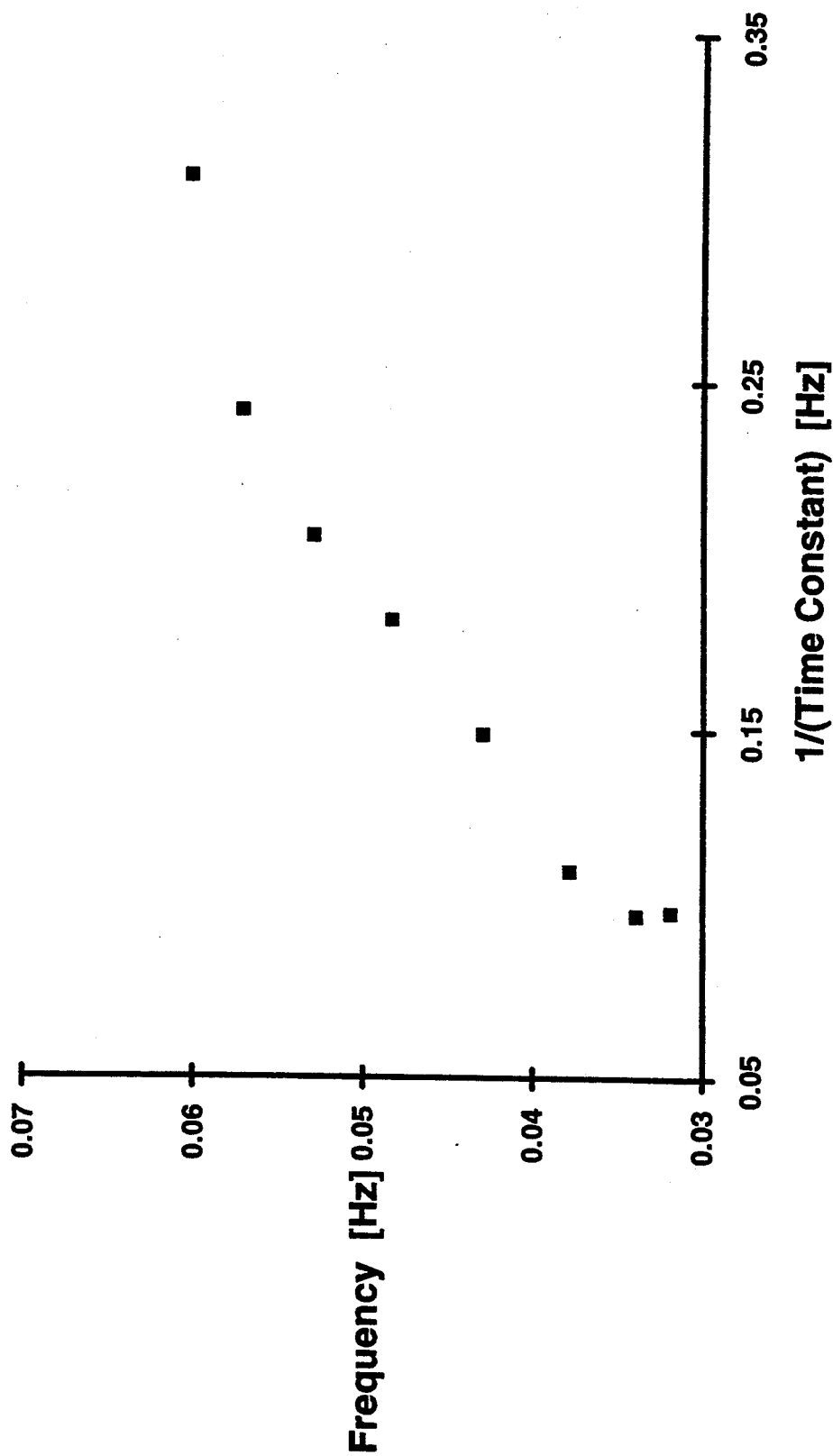
Figure 45. Frequency of Thermal Oscillogenic Instrument as a Function of Reciprocal SOPDT Time Constant

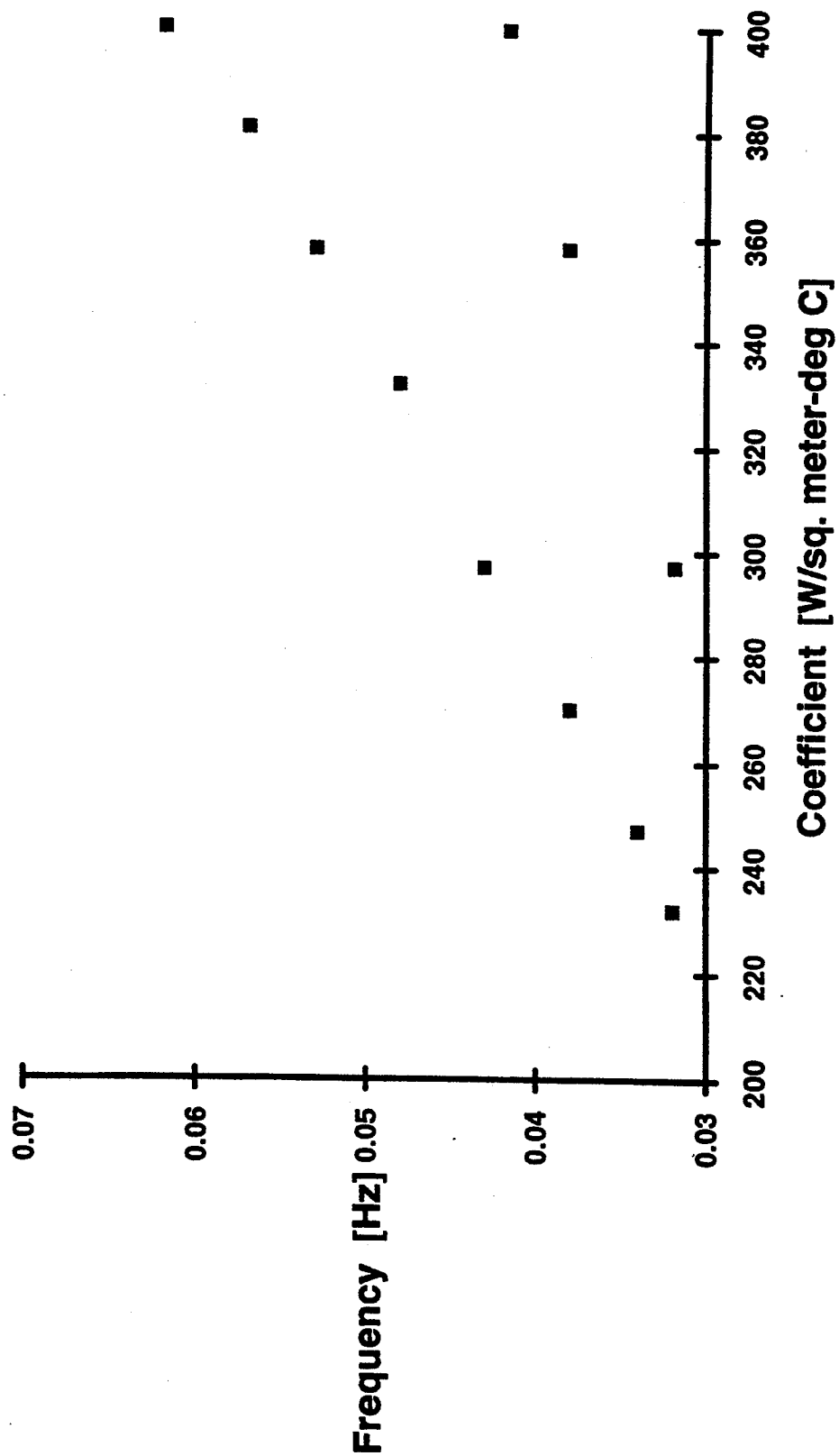
Figure 46. Frequency of Thermal Oscillogenic Instrument as a Function of Convective Heat Transfer Coefficient. Two sets of data are shown.

OSCILLATORY SYSTEMS AND METHODS OF SYNTHESIZING SAME

The present invention relates to oscillatory systems, and more particularly to methods and apparatus for synthesizing and using oscillatory chemical systems.

It has long been known in the art of process or system control that feedback from a system output may be utilized to control that system. Traditional system control theory has heretofore focused one or both of two basic objectives. One basic objective has been to hold, usually with the aid of feedback, a system output or property as close to a predetermined reference input as possible. Control systems having this as the primary objective are generally referred to a servo controllers. Another objective of traditional control theory has been to compensate for disturbances in the system by maintaining an output of the system at a predetermined value independent of changes in load variables. When the primary objective is disturbance compensation, the control is known as regulatory control. In either case, prior control systems in chemical and chemical engineering mass transfer and reactor applications have generally been deemed successful only when oscillatory behavior is avoided. As used herein, the term "oscillatory system" means a system which undergoes stable oscillations. The term "chemical oscillator" refers to an oscillatory chemical or chemical engineering mass or heat transfer system and to reactor systems.

Purely chemical systems having oscillatory dynamic behavior are known to exist and have been the subject of investigation. However, much of the work done to date has labored under the incorrect assumption that such systems occur naturally or not at all. More particularly, these systems were generally believed to be research curiosities, no more than usual and rare occurrences not easily or readily capable of intentional synthesis. As a result, most investigators have simply searched for the existence of such systems without even considering the possibility that such oscillatory systems could be synthesized and utilized.

The possibility of synthesizing oscillating chemical systems was first investigated by a group at Brandeis University. This and other similar work is described in detail in the Mar. 30, 1987 issue of *Chemical Engineering News* in an article entitled "Patterns in Time and Space Generated by Chemistry," and *Scientific American*, March 1983, "Oscillating Chemical Reactions." These investigations concentrated on open homogenous chemical systems. An open homogenous chemical system is a single-phase chemical system which is not closed to the passage of matter and/or energy. In particular, reactions in the open system of a continuous stirred tank reactor (CSTR) have been investigated. Based upon the open homogenous systems studied, the group at Brandeis University formulated the following rules for synthesizing chemical oscillators of this nature: (1) the systems must be far from equilibrium, (2) there must be some feedback in the system, and (3) the system must exhibit bistability. The term bistability means that the system must have two different sets of steady-state conditions. Put another way, the third rule teaches that only certain types of chemical systems can be made to oscillate. Moreover, the feedback in the systems studied by the Brandeis group consisted only of internal chemical feedback, that is, feedback caused by chemical reactions only.

Piezoelectric crystals have been used in electronic oscillator circuits to provide measurements of gas sample compositions. It has been shown that when the crystals of oscillators of this type are exposed to a gas sample, the output frequency of the electronic circuit can be a function of gas composition surrounding the crystal. The technique depends on components of the gas depositing in some manner onto the surface of the crystal, thus changing the mass of the crystals and the frequency of the oscillator. Such piezoelectric electronic sensors are not chemical oscillators since the oscillator dynamics do not depend on the dynamics of the chemical system being studied. Another way of illustrating the contrast between the piezoelectric oscillator and chemical oscillators is to consider the input and output of the systems. The piezoelectric oscillator does not perturb or provide an input to a chemical system, and, as a result, there is no output or response of the chemical system as part of the oscillatory mechanism. Rather, there is a mechanical couple between the electronics of the feedback system and the chemical system. One consequence of this is that direct extraction of information on the dynamics of the deposited chemical system is not possible using these devices. This type of oscillator is an extremely sensitive gravimetric method of analysis.

Prior art devices have utilized electronic circuits which incorporate oscillatory elements to measure the electrical conductivity of electrolytes. The technique commonly used in measuring the electrolyte conductivity requires insulation of the electrodes from contact with the chemical system, i.e., the electrolyte solution. Such an arrangement prevents electrochemical interactions with the dynamics of the chemical system. Accordingly, the chemical dynamics of the measured chemical system do not effect the dynamics of the oscillator.

U.S. Pat. No. 4,396,466—Hetrick et al. is directed to a device for measuring absolute pressure. The apparatus of Hetrick uses an electrochemical apparatus as a feedback element in an oscillator circuit having a period of oscillation said to be proportional to total absolute pressure. The apparatus includes two electrochemical cells adapted to serve as an oxygen-ion-conducting solid electrolyte. Pump and sensor cells are attached to a support structure to define an enclosed volume in communication with ambient atmosphere through an orifice. A sustained oscillatory mode of the system is said to exist if the pump and sensing action allows a phase shift between the voltage applied to the pump cell and voltage measured at the sensor cell. Although the Hetrick reference teaches the existence of an oscillatory chemical system, the reference contains no disclosure or suggestion of methods for the systematic synthesis of such systems. Rather, the teachings of Hetrick references are typical of the prior art perception that such systems are simply found or discovered but cannot be made.

U.S. Pat. No. 4,408,169—Fraser relates to converters or encoders which provide a frequency output as a function of input to a transducer. The Fraser reference discloses closed-loop electronic circuitry wherein a frequency output generated by a transducing process is combined and integrated with the transducer input in order to achieve noise immunity, among other benefits. The circuits disclosed by Fraser are said to convert only high-frequency narrow-band noise to an enclosed frequency at the output of the circuit and to provide noise rejection characteristic of synchronous detection in a frequency encoder or converter for a transducer. However, methods and/or apparatus for synthesizing chemical oscillogenic systems are not disclosed or discussed. Moreover, the Fraser reference does not deal with chemical systems or the dynamics of such systems.

SUMMARY OF THE INVENTION

Accordingly, it is an object of the present invention to provide oscillatory chemical systems and methods for the synthesis of same.

It is a further object of the present invention to provide methods for creating oscillatory chemical systems in order to derive information regarding the properties and characteristics of such chemical systems.

It is a still further object of the present invention to provide methods and apparatus for quickly and efficiently measuring the characteristics and properties of such chemical systems.

It is a still further object of the present invention to provide methods and apparatus for measuring the concentrations of electroactive ions and molecules in an electrolytic solution.

The apparatus and methods of the present invention provide oscillatory chemical systems by coupling certain feedback sub-systems between an output and an input of a chemical system. Applicant has discovered that the dynamic characteristics of the feedback sub-system of the present invention are of special importance in the synthesis of oscillatory chemical systems. In particular, the synthesis of oscillatory chemical systems generally requires coupling a feedback sub-system—having non-linear dynamic properties—between an output and an input of the chemical system.

The present invention provides methods of synthesizing stable oscillatory chemical systems from chemical systems having at least one output dynamically related to at least one input. In order to synthesize stable chemical oscillators according to the present invention, an output and an input of the chemical system are selected such that a dynamic relation exists between the input-/output pair. The chemical system from which the chemical oscillator is synthesized is then analyzed to determine whether the response of said output to a change in said input is a cumulative response or a resilient response. If the input/output response relationship of the selected input/output pair is determined to be resilient, then the methods require connecting a feedback block between said output and said input, said feedback having non-linear dynamics and inverting preaction hysteresis characteristics, or optionally repeating the selection and analysis steps with a different input/output pair until said output exhibits a cumulative response to a change in said input. If said response is determined to be cumulative, the methods require connecting a feedback block between said chemical system output and said chemical system input, said feedback block having non-linear dynamics and inverting Schmitt trigger hysteresis characteristics.

DESCRIPTION OF THE DRAWINGS

FIG. 1-8 illustrates the scanning voltammograms resulting from Comparative Example 1.

FIG. 22 is a schematic circuit diagram showing the feedback block illustrated in FIG. 20.

FIG. 23 is the oscillogenic scan produced according to Example 1.

FIG. 24 is a graphic illustration of the results of Example 1 showing peak frequency as a function of FIGS. 25-29 is a scanning voltammogram showing the results of Comparative Example 2.

FIGS. 30-31 provide graphic illustration of the results of Comparative Example 2 showing lead concentration versus cadmium(2) and lead (2 peaks) according to the scanning voltammetry of Comparative Example 2.

FIGS. 32-36 illustrate the averages of the replicate oscillogenic scans produced according to Example 2.

FIGS. 37 and 38 are graphic illustrations of the results produced according to Example 2, showing lead concentration as a function of frequency for lead (2 peaks) and cadmium (II peaks) in the oscillogenic scans.

FIG. 39 is a graphic illustration of the cadmium responses for both the scanning voltammetry results of Comparative Example 2 and the oscillogenic methods of Example 2 normalized on the scale of the lead responses for each FIG. 40 is a schematic view in block diagram form of the oscillogenic system according to Example 3.

FIG. 41 is a schematic view of the flowing air system shown in FIG. 40.

FIG. 42 is a semi-schematic view showing the oscillogenic controller in FIG. 40.

FIG. 43A is a schematic representation in block diagram form of the oscillogenic control algorithm used according to Example 3.

FIG. 43B is a top-down schematic illustration of the oscillogenic control algorithm used in Example 3.

FIG. 44 is a graphic illustration of the results of Example 3 showing the inverse time constant as a function of frequency according to Example 3.

FIG. 45 is a graphic illustration of the results of Example 3 showing the inverse SOPDT time constant as a function of frequency for the tests performed according to Example 3.

FIG. 46 is a graphic illustration of the results of Example 3 showing the coefficient of convective heat transfer is a function of frequency.

DESCRIPTION OF PREFERRED EMBODIMENTS

General Principles

Figure 1:
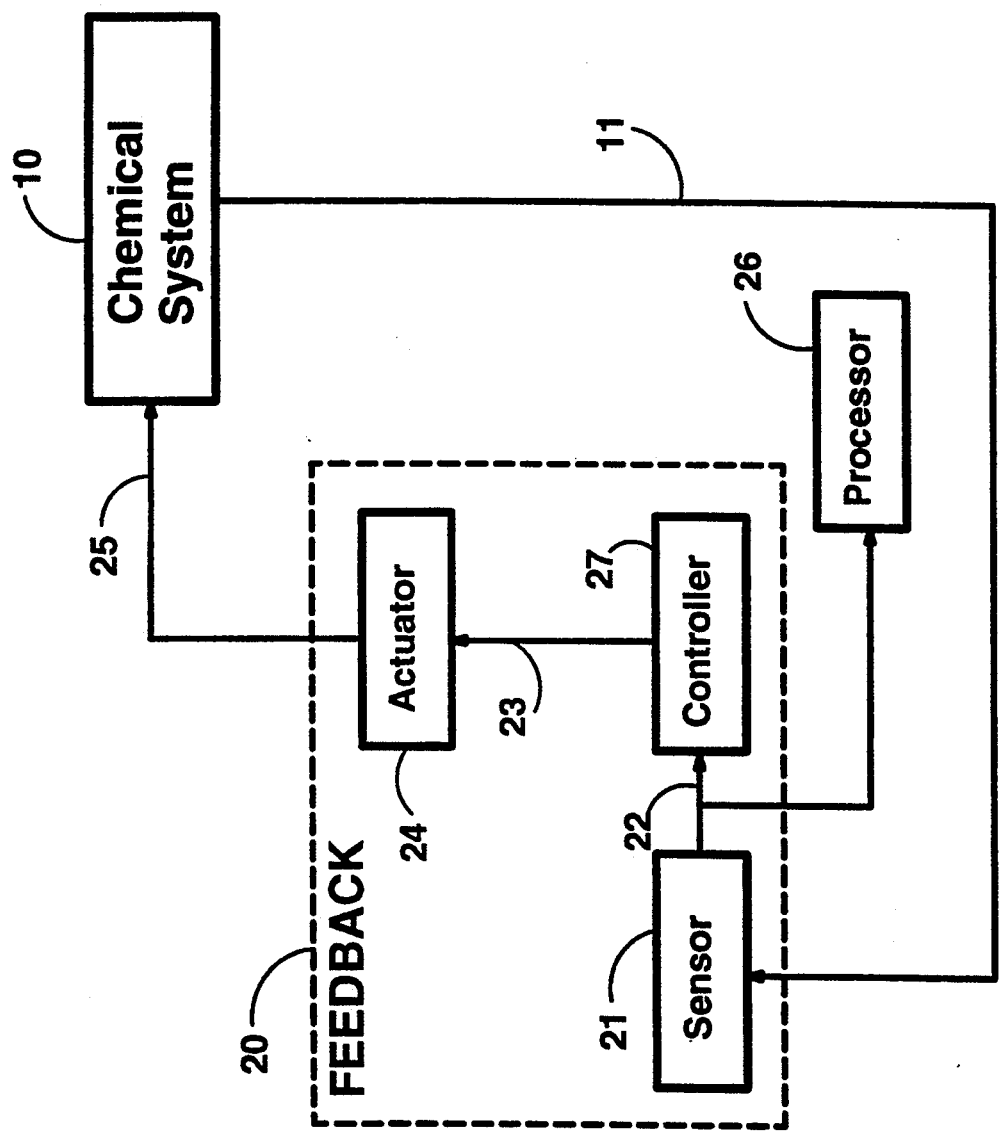
FIG. 1 is a schematic representation in block diagram form of one oscillatory chemical system according to the present invention.

Owing to the unique nature of the present invention, it is particularly desirable to define several of the terms used throughout this specification. As used herein, the term "oscillatory chemical system" refers to a system having dynamics that are affected, at least in part, by microscopic molecular interactions wherein at least one observable property or characteristic parameter of the chemical system is found to pass through a repetitive, sustained pattern of change with time. Thus, chemical systems are to be distinguished from purely mechanical systems that have dynamics substantially related to macroscopic large-body interactions and from purely electrical systems having dynamics substantially determined by the flow of electrons through conductors, capacitors, amplifiers and the like.

In order to understand the synthesis of chemical oscillators according to the present invention, it is helpful to review the fundamentals of oscillation. In mathematical terms, periodicity is defined for a function, f(t), such that if the function has a period, L, then:

$$f(t+L)=f(t) \text{ for all } t \quad [1]$$

Some of the simplest periodic functions are the trigonometric functions. Expressions containing various sine and cosine terms are known as harmonics; therefore, oscillators which generate these waveforms are called harmonic oscillators. An example of an electronic harmonic oscillator is an LC circuit comprised of any inductor and a capacitor connected together. This combination can be described mathematically by the differential equation which follows:

$$\ddot{x}+w^2x=0 \quad [2]$$

where, x is the electrical potential across the terminals and w is the frequency.

Equation 2 also approximates the behavior of a mass attached to a spring and that of a pendulum with a small displacement from vertical. The symbol x represents different physical quantities in each case; angular displacement for the pendulum, translational displacement for the mass on a spring, and a potential across the capacitor for the capacitor/inductor pair. Each of these physical systems is oscillatory or periodic with respect to the physical quantity which x represents. Put another way, the solution to equation 2 contains sine and cosine terms.

In order to understand the synthesis of chemical oscillators according to the present invention, it is also helpful to review and understand some fundamental terms and principles regarding "feedback." A system contains feedback if information related to an output of the system is "returned" to the system. Information may be returned to a system, for example, by perturbing the system in a given manner depending upon the content of the information. Thus, a signal that ultimately affects the system or the value of an input to the system "returns" information to the system when that signal is, at least to some extent, dependent upon the value of a system output. As will be described more fully hereinafter, a feedback sub-system or "block" coupled between a system output and a system input is required for the synthesis and operation of a chemical oscillator according to the present invention.

Linearity and non-linearity of systems are also important concepts necessary in the understanding of the present invention since applicants have found that it is this property of real chemical systems that determines whether the stable oscillatory behavior can be achieved. As the term is used herein, a linear system is a system that can be described by a coupled set of either linear differential or linear difference equations. Any linear system described by ordinary differential equations can be expressed in the form of a set of first order differential equations. For the purpose of illustration, equation [2], which describes the motion of a pendulum or the displacement of a mass on a spring, can be rewritten as a coupled set of first-order differential equations. Yet these equations are only an approximation to the actual physical situation. The presence of friction is the main cause for deviation between the approximation and the reality of the period. Any real system has either a frictional component or a non-conservative force analogous to friction. In mathematical terms, friction is expressed in the differential equation as a term that is proportional to the velocity of the system but which acts in opposition to the acceleration term in the system. The modified form of equation 2 that includes the friction term can be generally expressed as follows:

$$\ddot{x}+f\dot{x}+w^2x=o \quad [3]$$

where f = the friction term or its analog The solution to equation 3 can be generally represented as follows:

$$x(t)=e^{-ft/2}[r_1e^{\Omega t}+r_2e^{-\Omega t}] \quad [4]$$

where $\Omega$ = some function of f and w

An examination of equation 4 indicates that the first exponential term guarantees that the solution to equation 4 goes to zero for large values of time. Accordingly, the value of x will initially oscillate with time but the oscillation will eventually die out and x will become a constant value. As the term is used herein, a stable oscillator is an oscillator that produces amplitudes and periods which are generally constant with respect to time, that is, they do not die out. Thus, the linear systems defined by equation 3 are not stable oscillators since the amplitude and period of those systems eventually die out and go to zero. Applicants have found that this characteristic exists in all real macroscopic systems having friction or its analog and that appreciating this point is important in the synthesis of oscillator systems according to the present invention. Since there are no real systems, other than perhaps quantum mechanical systems, which are described by the harmonic oscillator of equation 2, harmonic oscillators cannot be physically realized, except in approximation.

The Systems

With the above descriptions and definitions in mind, the oscillatory chemical systems of the present invention comprise an underlying chemical system or systems. It is believed that all chemical systems are adaptable for use as the underlying chemical system of the present invention, provided the chemical system includes at least one input dynamically related to at least one output. As described above, chemical systems of the present invention are systems that are characterized and largely governed by microscopic molecular interactions, and include chemical reactors, chemical separation systems, mass transfer systems, heat transfer equipment containing fluids, mixtures of chemical components in a container, electromechanical systems, catalytic systems and fluid flow systems. As the term is used herein, an input to a chemical system is any action that produces an effect on the state of the system. In general, therefore, an input comprises any property or characteristic of the chemical system that can be manipulated to produce a change in the state of the underlying chemical system. For example, in a chemical system comprising a continuous stirred tank reaction system, the rate of introduction of reactants into the system is an input to the system; in a heat transfer system with fluids, the rate of introduction of heat into the system is an input to the system since heat generally has an impact on intermolecular interactions; in an electromechanical cell, the potential across the cell is an input to the system; and in a reverse osmosis chemical separation system, the pressure on the system is an input to the system. As the term is used herein, an output from a chemical system is any observable or measurable physical manifestation of the state of the chemical system. Thus, the output of a chemical system contains information about the state of the system. For example, in a chemical system comprising a continuous stirred tank reactor, the concentration of reaction products in the system is an output from the system; in heat transfer systems, based on fluids, the temperature of the system is an output from the system; in an electromechanical cell, the current flowing in the system is an output from the system; and in a chemical separation system, the concentration of chemical components effluent from the system is an output from the system. A system output and a system input are dynamically related when the partial derivative of the output with respect to the input is not zero; typically the partial derivative is a function of time.

One objective of this invention is to provide oscillatory chemical systems based upon such underlying chemical systems since it is believed that useful information about the physical properties of most chemical systems can be derived from or correlated to the oscillation characteristics of the systems. Applicants have discovered that in order to produce or synthesize stable oscillatory chemical systems, the underlying chemical system must be modified to insure that, in the equation representative of the system dynamics, the friction term or its non-conservative force analog disappears or becomes diminimus. Put another way, the oscillatory chemical system must include means for forcing the values of the poles of the system to be purely imaginary values. This can be illustrated conceptually by means for adding a negative friction to the system, in which case the equation characterizing the system described in Equation 3 is as follows:

$$\ddot{x} + (f-g)\dot{x} + w^2 x = 0 \quad [5]$$

where g = adjustable value which can be made equal to the friction f.

The term g defined above may be thought of as "negative friction" or some form of an energy term which is used to replace the non-conservative energy dissipated by friction f or its analog. Applicant has found that this energy or negative friction, for example, may be added to the system by means for introducing velocity feedback to the system. It should be noted, however, that slight differences between the actual friction f and the value of "negative friction," g, will cause the oscillations of the system to either decay to zero amplitude or to grow exponentially until some system bound is reached. Thus, unless g is identically equal to f for all values of f, the linear system described in equation 5 will not be oscillatory. This is true for all linear systems. If the "negative friction" or gain is too small, then oscillations of the system will decay away to zero. On the other hand, if the gain is too large, the oscillation expands exponentially without limit. Small system imperfections or "noise" typically found in chemical systems tend to destroy the perfect balance needed for a stable oscillator, causing the size or amplitude of the waveform to either grow without bound or to decay away to nothing.

Applicants have found that stable chemical oscillators must include means for measuring the amplitude of the system oscillations and for using this measurement to control the equation of state of the system to ensure stable oscillatory behavior. As the term is used herein, the amplitude of any periodic function is the difference between maximum and minimum values of that function. Since amplitude is a measure of a function, the term functional is used. The amplitude functional has the domain of all periodic functions, and the range of all possible real numbers. With a mere periodic waveform or periodic function as an input, the amplitude functional returns a value for the amplitude. The realization that the amplitude functional is not a linear functional and that a means for controlling amplitude is required for stable oscillatory chemical systems is an important aspect of the present invention. In particular, since an amplitude functional is not a linear functional, it follows that the amplitude control required for the synthesis of stable oscillogenic chemical systems cannot be achieved in a strictly linear system. Therefore, since a non-linear function is needed to measure and control the amplitude of oscillations in a chemical system, and since any stable chemical oscillator in the real world must have some means of amplitude control, then a practical oscillator must have some non-linear elements. The mathematical description of the chemical oscillator must be non-linear. Accordingly, applicants have surprisingly found that the only stable chemical oscillators are non-linear chemical oscillators.

In many respects, the characteristics and properties of physical systems are helpful for the illustration of embodiments of the present invention directed to chemical oscillatory systems. In the context of the chemical system, the term steady-state is used to define the condition in which the system undergoes no change with time. That is, at steady-state the velocities of the state variables of the system all go to zero. Applicant has found that for both physical and chemical systems, the state variables of those systems can never pass through the steady-state point if oscillatory behavior is to be achieved. If the system reaches steady-state, it stays there until it is disturbed by external changes. This is true of all systems; physical or chemical, linear or non-linear.

Accordingly, oscillatory chemical systems of the present invention comprise an underlying chemical system and means for introducing non-linear feedback into the chemical system. It will be appreciated by those skilled in the art that most underlying chemical systems are highly non-linear. Thus, it is theoretically possible that, at least in some of these systems, the means for introducing feedback into the system may include only linear elements, the non-linearity of the system being instead derived from the underlying chemical system itself. However, applicants have found that the means for introducing feedback into the system preferably includes non-linear elements since this will ensure the capacity to achieve oscillogenic behavior even when the underlying chemical system is linear or when it does not have the proper form of non-linearity. Thus, the oscillatory chemical systems of the present invention comprise an underlying chemical system and a non-linear feedback block connected between an output and input of that system. As the term is used herein, a feedback block includes any means for processing information related to a system output and for developing a control signal capable of affecting the state of the system, preferably through manipulation of an input to the system.

For the purposes of convenience and illustration, but not necessarily by way of limitation, the oscillatory chemical systems of the present invention may be described as comprising an underlying chemical system and a feedback system or block. The feedback systems generally include a sensing means linked to the underlying chemical system for sensing or measuring a property of the chemical system. The measured or sensed quantity also preferably represents an observable manifestation that the system is oscillating. The sensed quantity is thus an output of the chemical system and an input to the feedback block. The feedback system in turn utilizes the information contained in the sensed quantity and produces a control action that affects or manipulates an input to the underlying chemical system. The value of this manipulated or input property affects the dynamic equation of state of the chemical system. For example, the value of the measured quantity of chemical reactants added to a system, adjustment of the heat input to a fluid heat exchanger system, adjustment of the number of photons entering a reactive system, or adjustment of the voltage applied to an electrochemical cell. The feedback block of the present invention links the sensed quantity and the manipulated variable in a manner that produces stable system oscillation.

Oscillatory chemical systems according to the present invention are also herein referred to as oscillogenic instruments when the period or other characteristic of the waveform being produced by the system is utilized to derive information about the underlying chemical system. As represented schematically in FIG. 1, oscillogenic instruments according to the present invention comprise an underlying chemical system 10 and a feedback block 20. Feedback block 20 includes any well-known sensor or transducer 21 linked to a readily measurable property of the system, such as output 11, for translating the value of output 11 into a signal 22 detectable by oscillogenic controller 27. Oscillogenic controller 27 can comprise, for example, hardware, software, software or a combination of hardware and software. Controller 27 acts upon the information provided by output 11, in a manner more particularly described hereinafter, and provides a signal 23 to actuator or transducer 24. Actuator 24 acts upon signal 23 and produces a change or adjustment or an input 25 to the underlying chemical system 10.

One important objective of the oscillogenic instrument, as shown in FIG. 1, is to produce a periodic signal that yields information about the state and/or properties of the underlying chemical system 10. Although other underlying chemical system parameters may undergo periodic behavior that yield such information, it is contemplated that such a periodic signal is preferably produced by output 11. Thus, according to a preferred embodiment, processor means 26 is coupled to sensor 21 for processing signal 22 to derive information about the state of underlying system 10. Applicants believe that information about the state of underlying system 10 may be derived from the characteristics of the periodic behavior of output 11, and that different information may be available from different characteristics of the periodic behavior. For example, processing means 26 may comprise means for analyzing amplitude of the waveform. Other characteristics that may be analyzed include phase, waveform, linearity, degree of modulation and frequency, with frequency being preferred.

Figure 2:
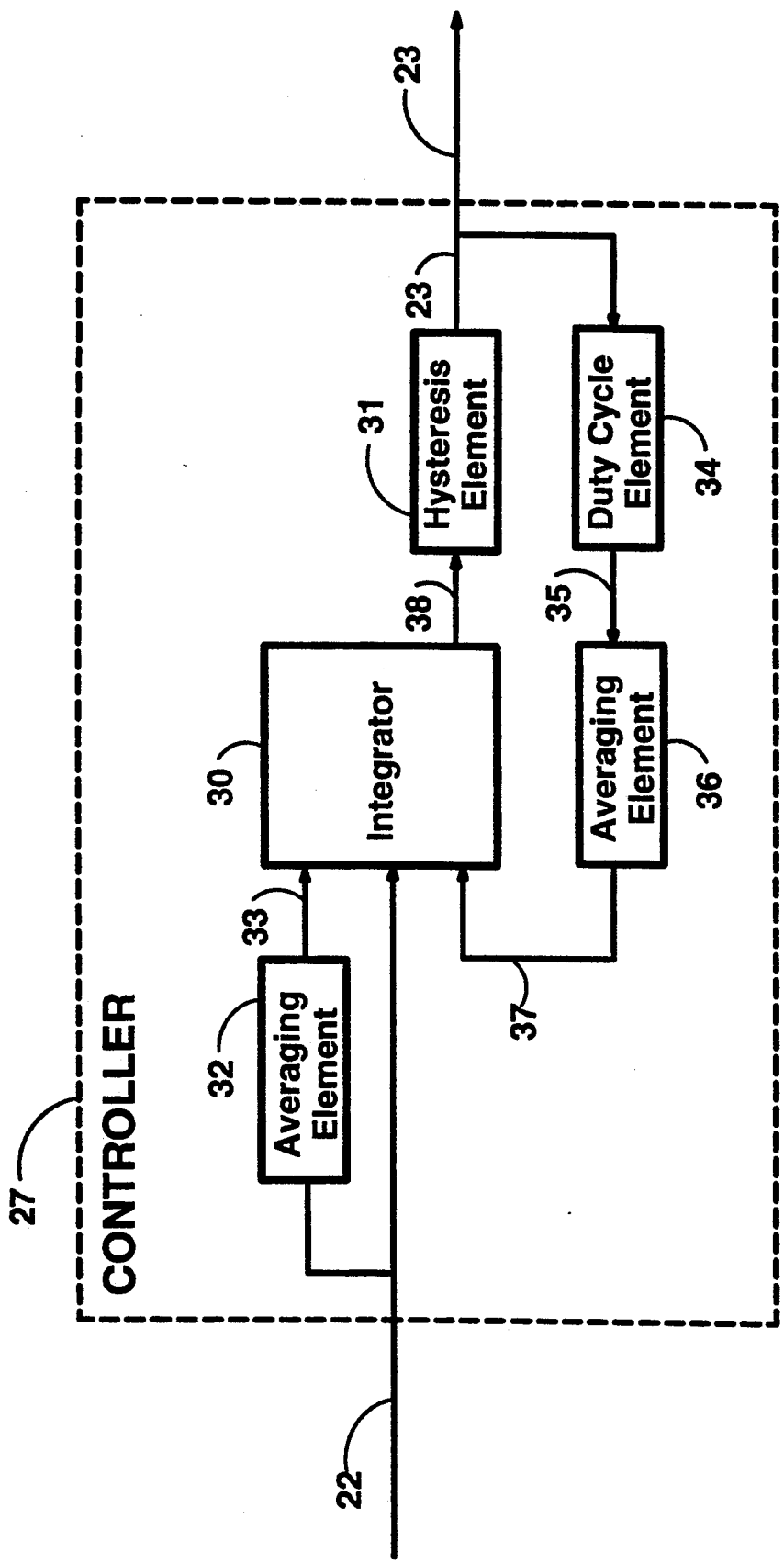
FIG. 2 is a schematic representation in block diagram form of a controller according to the configuration shown in FIG. 1.

As discussed above, the ability of feedback block 20 to control the amplitude of output 11 is an important aspect of the present invention. The required non-linearity is preferably provided by the dynamic characteristics of oscillogenic controller 27. In particular, controller 27 preferably comprises an element having a dynamic response characterized by hysteresis. With reference now to FIG. 2, one preferred embodiment of controller 27 is represented schematically as comprising an integrator 30 coupled to a hysteresis element 31. The input signal 22 is directed to the integrator 30 and to an averaging element 32. The output signal 33 from the averaging element is directed to the integrator 30. Applicants have found that feedback controllers according to the present invention also preferably include a duty cycle element 34 connected to the controller output signal 23. As mentioned above, the individual element of controller 27 may be in the form of electronic components which perform the stated function, i.e., hardware, or computer commands which perform the stated function, i.e., software.

As the term is used herein, duty cycle is a relative measure of the extent to which a periodic waveform is in one of two particular segments of the waveform, said measure generally being defined as a percentage of time in the particular segment of the cycle relative to the total time for one complete cycle. As used herein, every waveform can be described as being a combination of two segments. For the purposes of convenience, the upper segment of a waveform is the portion of the waveform above the midpoint value during any given cycle. As the term is used herein, midpoint value of a waveform means the point on the waveform that is about midway between the crest and the trough of the wave, that is, one half of the amplitude. Thus a waveform oscillating between a value of 0 and 1 has a duty cycle of 50% if the wave is above 0.5 for half of the cycle and below 0.5 for the other half of the cycle.

Duty cycle element 34 receives controller output 23 and develops a signal 35 that is a measure of the duty cycle of the waveform of the controller output. Signal 35 is directed to averaging element 36, the output 37 from the averaging element being directed to integrator 30. Applicants have found that oscillogenic controllers of the present invention preferably have output waveforms with duty cycle of about 50%. Duty cycle element 34 is included in controller 27 as a means for controlling the duty cycle of the output signal, preferably to a value of about 50%.

The schematic representation of FIG. 2 shows, in block diagram form, the functional elements of an oscillogenic controller 27, including hysteresis element 31 and duty cycle controller 34. It will be appreciated by those skilled in the art that many means are known and available for producing the results described above. For example, controller 27 may comprise electronic circuits adapted to perform the stated functions. Alternatively, a computer program or a microprocessor may be utilized to manipulate the signal 22 as described above.

The nature and quality of the hysteresis element in the feedback block is an important aspect of the present invention. As the term is used herein, a hysteresis element is a means for producing an output signal that is dependent not only upon the value of the input signal but also the value of its own output. It is generally preferred that the hysteresis element of the present invention comprise a Schmitt trigger, or its software analog. The term Schmitt trigger is used herein to include all known variations of Schmitt triggers having hysteresis, including inverting Schmitt triggers and preaction Schmitt triggers.

Figure 3:
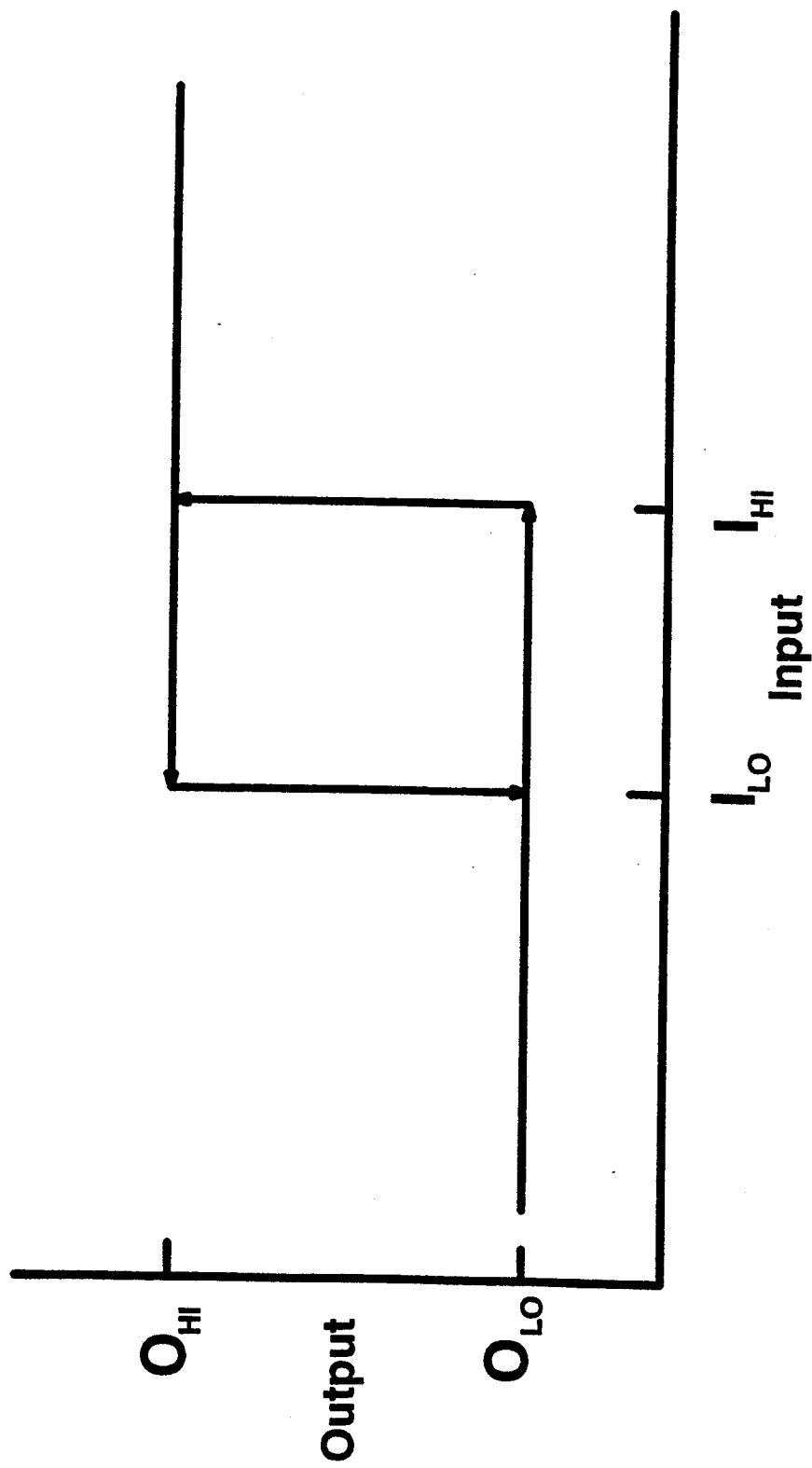
FIG. 3 is a graphical representation of the characteristics of a non-inverting, non-preaction Schmitt

With particular reference now to FIG. 3 and Table 1 below, the characteristics of a Schmitt trigger (non-inverting, non-preaction) are described.

TABLE 1

| Truth Table for the Schmitt Trigger | | |
|---|---|---|
| Input | Previous Output | New Output |
| $<I_{HI}$ | $O_{LO}$ | $O_{LO}$ |
| $>=I_{HI}$ | $O_{LO}$ | $O_{HI}$ |
| $>I_{LO}$ | $O_{HI}$ | $O_{HI}$ |
| $<=I_{LO}$ | $O_{HI}$ | $O_{LO}$ |

As is well understood by those skilled in the art, Schmitt trigger characteristics are produced, for example, by a complementary metal oxide semiconductor (CMOS) 409 dual Schmitt trigger input NAND gate. As can be seen by reference to FIG. 3, the CMOS form of the (non-inverting) Schmitt trigger hysteresis element is a digital circuit in the sense that the output of the device (the ordinate in FIG. 3) is discrete and can take on only one of two values, for example the values labeled $O_{HI}$ and $O_{LO}$ in FIG. 3. If the previous output of a hysteresis element having Schmitt trigger characteristics was $O_{LO}$ and the input signal changed from being less than $I_{HI}$ to being equal or greater than $I_{HI}$, then the output from the hysteresis element switches to $O_{HI}$. If the input signal then decreases, the output remains $O_{HI}$ until the input become equal to or less than $I_{LO}$. The direction of a hysteresis element is indicated by arrows in the graph of output against input. For example, the right arrow in the lower branch of FIG. 3 shows that a previously low output signal would switch to $O_{HI}$ only after the input signal increased to $I_{HI}$ along the lower branch of the hysteresis loop. A hysteresis element having Schmitt trigger characteristics is preferably included in controller 27 when the underlying chemical system exhibits a cumulative system response, as disclosed more fully hereinafter in connection with the synthesis methods of the present invention.

Figure 4:
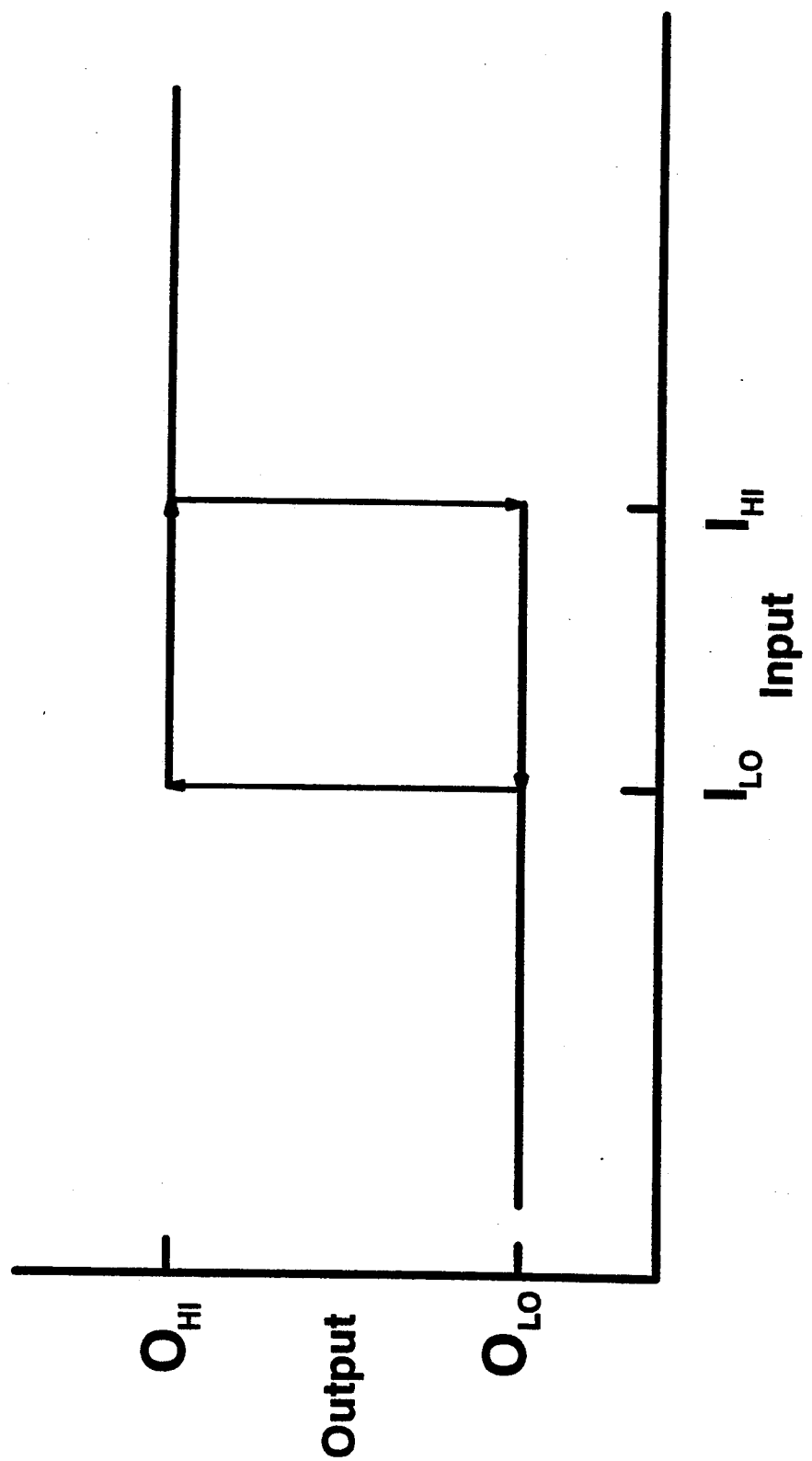
FIG. 4 is a graphic illustration of the characteristics of a non-inverting, preaction Schmitt trigger.

With particular reference now to FIG. 4 and Table 2 below, the characteristics of a preaction Schmitt trigger (non-inverting) are described.

TABLE 2

| Truth Table for the Preaction Schmitt Trigger | | |
|---|---|---|
| Input | Previous Output | New Output |
| $<I_{LO}$ | $O_{LO}$ | $O_{LO}$ |
| $>=I_{LO}$ | $O_{LO}$ | $O_{HI}$ |
| $>I_{HI}$ | $O_{HI}$ | $O_{HI}$ |
| $<=I_{HI}$ | $O_{HI}$ | $O_{LO}$ |

As explained more fully hereinafter, resiliently responding systems are preferably synthesized into stable oscillators using a preaction Schmitt trigger, and even more preferably an inverting, preaction Schmitt trigger. As the term is used herein, an element having preaction trigger dynamics follows the truth table of Table 2 and has a input/output graph generally as shown in FIG. 4. Preaction trigger characteristics are similar to Schmitt trigger characteristics, but the hysteresis direction of the preaction trigger is opposite to the direction of the Schmitt trigger. That is, the right arrow in the upper branch of the hysteresis loop indicates that an increasing input signal switches the output from $O_{HI}$ to $O_{LO}$ as the input increases from less than $I_{LO}$, to greater than or equal to about $I_{HI}$. The output of an element having preaction trigger characteristics will then remain low until the input decreases from an input value greater than $I_{HI}$ to an input value less than or equal to $I_{LO}$.

Figure 5:
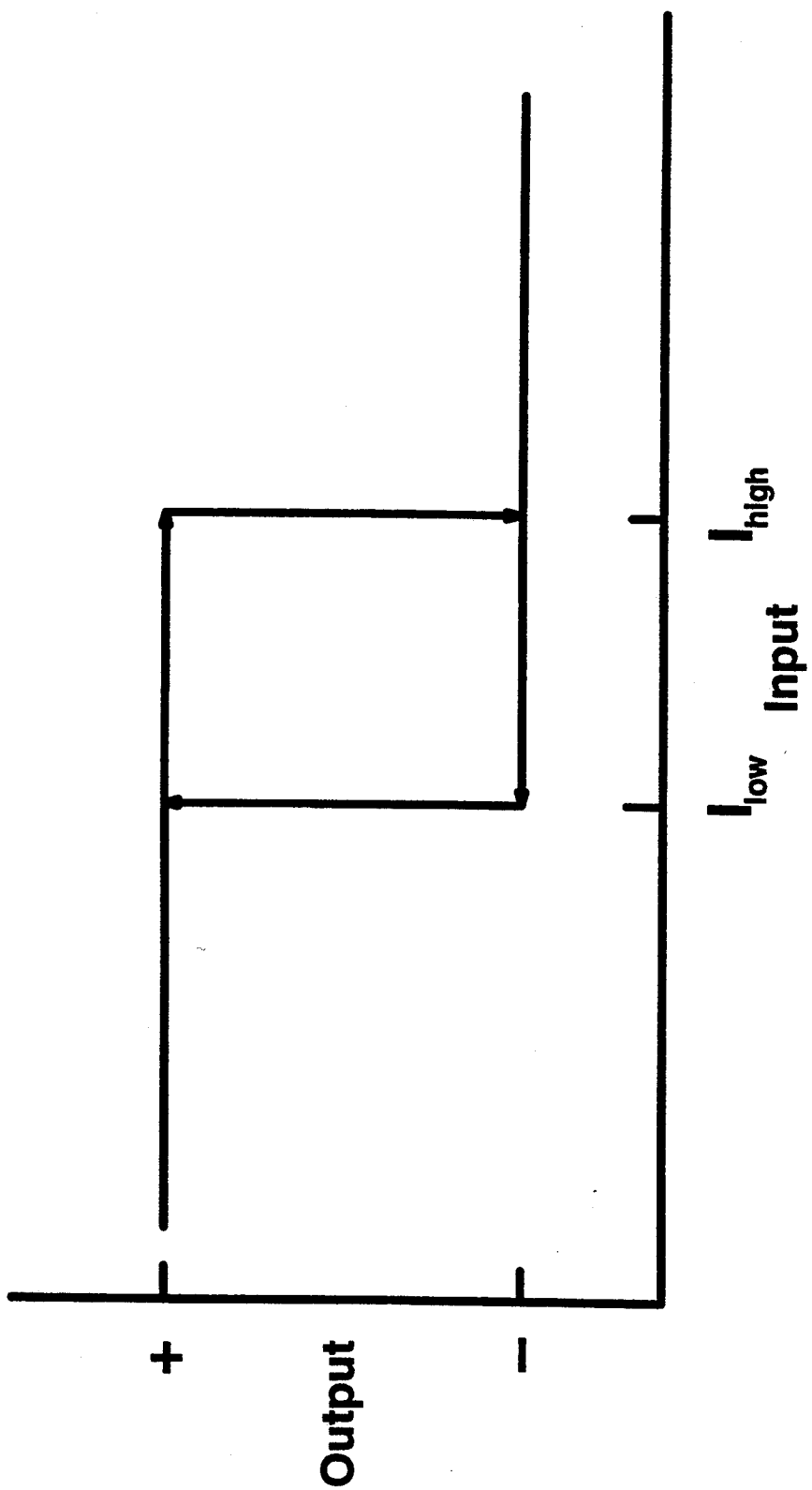
FIG. 5 is a graphic representation of the characteristics of an inverting, non-preaction Schmitt

With particular reference now to FIG. 5 and Table 3 below, the characteristics of an inverting Schmitt trigger (non-preaction) are described.

TABLE 3

| Truth Table for the Inverting Schmitt Trigger | | |
|---|---|---|
| Input | Previous Output | New Output |
| $<I_{LO}$ | $O_{LO}$ | $O_{HI}$ |
| $>=I_{LO}$ | $O_{LO}$ | $O_{LOW}$ |
| $>I_{HI}$ | $O_{HI}$ | $O_{HI}$ |
| $<=I_{HI}$ | $O_{HI}$ | $O_{LO}$ |

For an inverting Schmitt trigger, the output of the Schmitt trigger is followed by an "inverter" that interchanges $O_{HI}$ and $O_{LO}$ (see Table 3). As the term is used herein, an element having inverting Schmitt trigger dynamics follows the truth table of Table 3 and has a input/output graph generally as shown in FIG. 5. For elements having inverting trigger characteristics, the switching potential ($I_{HI}$) when the output state is higher than the switching potential ($I_{LO}$) when the output state is low. Thus, starting at a low point of input voltage, the output from such an inverting element will be high. As the input is raised, the output will stay low as $I_{LO}$ is passed and $I_{HI}$ will switch to low. If the input is then lowered, the output will stay high as $I_{HI}$ is passed and only switch when $I_{LO}$ is reached.

Figure 6:
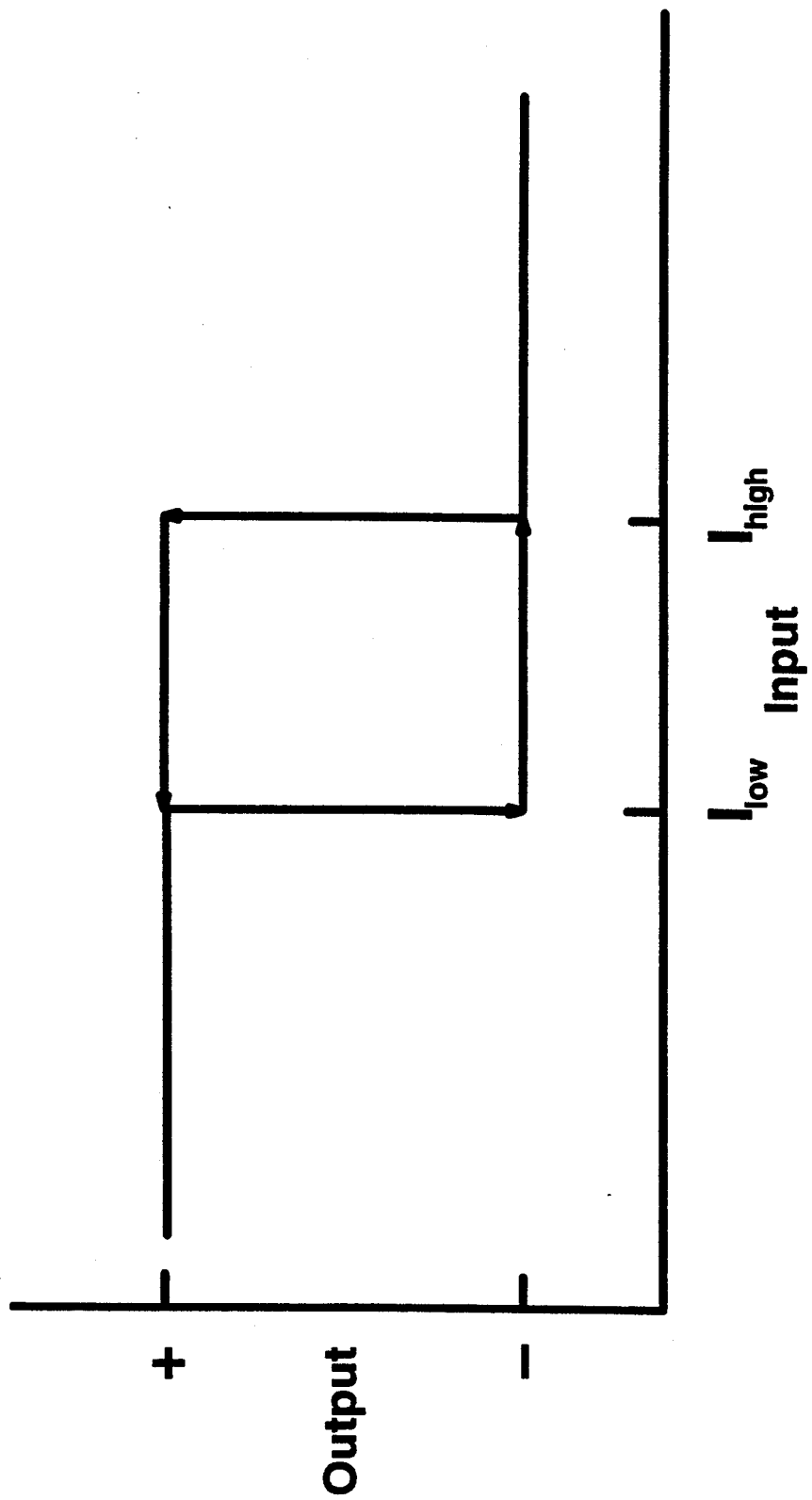
FIG. 6 is a graphic representation of the characteristics of a preaction, inverting Schmitt trigger.

With particular reference now to FIG. 6 and Table 4 below, the characteristics of a preaction, inverting Schmitt trigger are described.

TABLE 4

Truth Table for the Preaction, Inverting Schmitt Trigger

| Input Transition | Previous Output | Next Output |
|---|---|---|
| From >IHI to <ILO | $O_{LO}$ | OHI |
| From <ILO to >ILO | $O_{LO}$ | OLO |

The inverting preaction trigger is a hysteresis element within the meaning of the present invention since the output function of the element during a change of input from low to high does not retrace the output resulting from a change of input from high to low. Thus, starting at a low input and high output, as the input is raised, the output will switch at $I_{LO}$ and remain low until the input is changing from a value greater than $I_{HI}$ to a value less than $I_{HI}$ at which point the output will switch to $O_{HI}$. Applications recognize that preaction hysteresis elements of the type described herein may not be realizable using existing circuit elements. Nevertheless, such elements are available using software analogs, as more fully described hereinafter. Thus, although Schmitt trigger hysteresis characteristics as described above with respect to FIGS. 3–6 and Tables 1–4 are generally achievable with Schmitt trigger hardware, it will be understood that applicants' invention is not so limited. Applicants are not aware of any electronic circuit that possesses preaction trigger characteristics as herein defined. The proper characteristics can be coded in software. An example of suitable software is provided in Table A below.

TABLE A

Pascal "Pre-action" Trigger Function

```
1  function PreActionTrigger(Input,PrevOutput:real):real;
2  const
3      InputLo=0.0;
4      InputHi=1.0;
5      OutputLo=0.0;
6      OutputHi=1.0;
7  var
8      NewOutput:real;
9  begin   {function PreActionTrigger}
10     NewOutput:=PrevOutput;
11     if PrevOutput<OutputHi then
12     begin
13         if Input>=InputLo then NewOutput:=OutputHi;
14     end   {if}
15     else
16     if PrevOutput>OutputLo then
17         if Input<=InputHi then NewOutput:=OutputLo;
18     PreActionTrigger:=NewOutput;
19 end {function PreActionTrigger};
```

Hysteresis element 31 also preferably includes means for shifting the levels of input voltage when a said hysteresis element comprises electronic circuitry, and particularly a CMOS 4093 Schmitt trigger. Such a level shifter may be coupled between signal 38 and the input voltage of the Schmitt trigger if the voltage of signal 38 is not compatible with the input voltage of the Schmitt trigger, and/or between the output 23 of the Schmitt trigger and duty cycle controller 34 if the output voltage required for duty cycle controller 34 is not compatible with the output voltage of the Schmitt trigger. According to certain embodiments, said level shifting means comprises an operational amplifier.

The Synthesis Methods

The methods of synthesizing oscillatory chemical systems according to the present invention require the provision of an underlying chemical system having at least one output dynamically related to at least one point. As will be understood by those skilled in the art, most chemical systems have more than one output dynamically related to more than one input. Applicants have found that the relationship between the outputs and inputs that are used in the apparatus and methods of the present invention have an important impact upon the achievement of stable oscillations in chemical systems. In particular, applicants have found that the synthesis of stable oscillatory chemical systems requires an analysis of the dynamic relationship between the input-/output pair. More particularly, applicants have found that the dynamic response of a chemical system output to a particular chemical system input has an impact on the type and nature of the feedback block that is required by the synthesis methods of the present invention. Thus, the selection of the input/output pair to be used according to the present synthesis methods constitutes one important aspect of the present invention.

Figure 7:
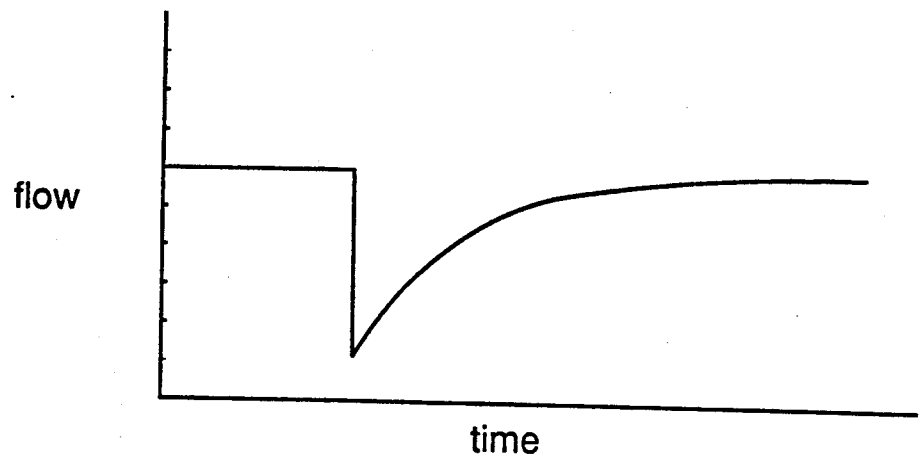
FIG. 7 is a graphic illustration of a dynamic system having resilient response.
Figure 8:
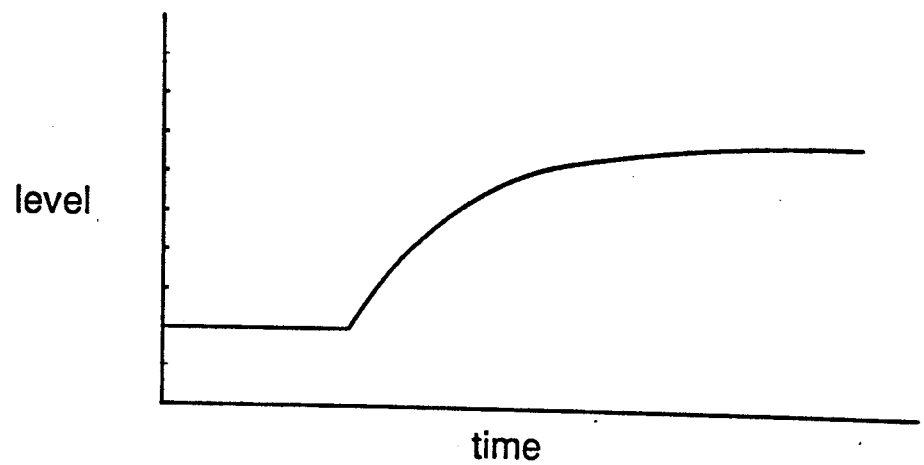
FIG. 8 is a graphic representation of a dynamic system having cumulative response.
Figure 9B:
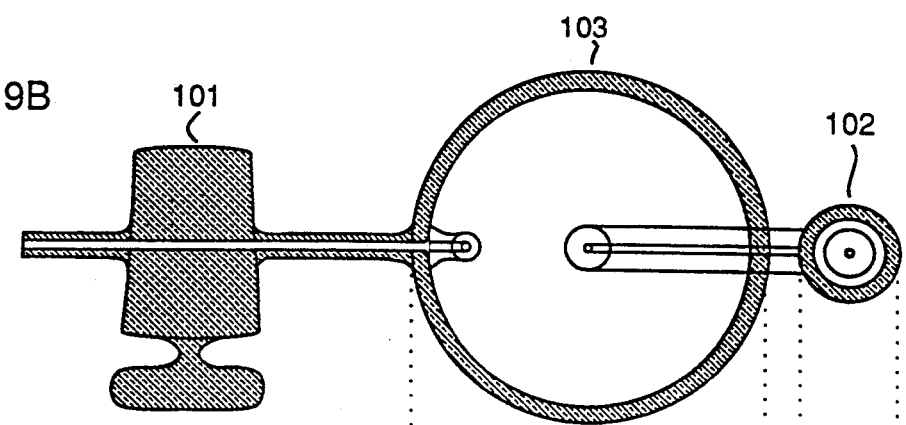
FIG. 9B is a plan view of the electrochemical cell used in Examples 1 and 2.
Figure 9A:
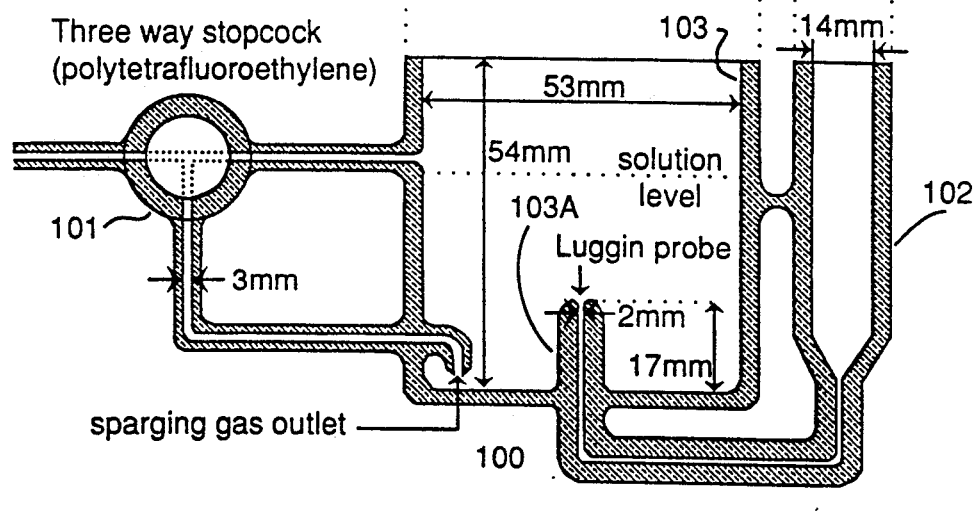
FIG. 9A is a cross-sectional view of the electrochemical cell utilized in Example 1.

A variety of techniques are known and available to those skilled in the art for analyzing the dynamics of chemical systems, and all such techniques are within the broad scope of the present invention. For example, one technique comprises providing a computer simulation of the system dynamics and analyzing the system using the simulation. In other techniques, the dynamic relationship between an output of the underlying chemical system and an input to that system can be analyzed by observing the open-loop response of the underlying system to a step change in the system input. The response of chemical systems to step changes in an input variable generally either falls predominantly into the category of response known as "cumulative response" or predominantly into the category of response known as "resilient response." The dynamic response of resilient and cumulative systems is illustrated graphically in FIGS. 7 and 8, respectively. As the term is used herein, a pair of input/output variables is said to exhibit cumulative response if the observed output tends to move toward an entirely new steady state value following a step change in the input. If, on the other hand, a step change in the system input produces an initial perturbation of the output from its starting value followed by a subsequent return of the output back to about its initial value, then such an input/output response relationship, then such an input/output pair is said to exhibit resilient response. Depending upon the input/output relationship, different non-linear feedback blocks are preferably incorporated in the oscillatory chemical systems according to the synthesis methods of the present invention.

The present methods of synthesizing oscillatory chemical systems generally require selecting an output and an input of the chemical system, said input/output pair being dynamically related. Although the present description is directed primarily to a selection step in which only one output and one input are selected in any given step, those skilled in the art will understand that the synthesis methods of the present invention are readily adaptable to complex chemical systems that may require the selection of more than one input/output pair in a given selection step.

Once the input-output pair is selected, the synthesis methods of the present invention require the step of analyzing the underlying chemical system with respect to the selected input/output pair. The analysis step preferably comprises analyzing the open-loop response of said output to a change in said input. As the term is used herein, the openloop response of an output means the change of the output based upon the dynamics of the underlying chemical system alone, that is, in the absence of any external control action. The analysis step therefore allows a determination of whether the response of the selected output to a change in the selected input is predominantly a cumulative or a resilient response.

A further step according to the present synthesis methods comprises connecting a feedback block between the selected input and the selected output. As discussed above, the feedback block of the present invention is preferably characterized by having non-linear dynamics, and even more preferably, non-linear hysteresis characteristics. Although applicants contemplate that essentially all chemical oscillators synthesized by the present methods will have a feedback block comprising a hysteresis element, the selection of the particular hysteresis characteristics will not be the same for all chemical oscillators. In particular, applicants have found that the hysteresis characteristic of the feedback block are preferably chosen based upon the results of the analysis step described above. For example, it is preferred according to one embodiment of the present invention that said feedback block has preaction trigger hysteresis characteristics whenever said input/output response is determined to be resilient. According to another embodiment, a repeating step is performed between said analysis step and said connecting step. According to this embodiment, the selection and analysis steps are repeated until the selected output exhibits a cumulative response to the selected input. If it is determined by the analysis step that the input/output response is cumulative, then said connecting step preferably comprises connecting a feedback block having Schmitt trigger hysteresis characteristics between said input and said output. Since the dynamic response of most input/output pairs in chemical systems will be either predominantly resilient or cumulative, the present methods preferably include connecting between the selected input/output pair a feedback block having hysteresis characteristics selected from the group consisting of preaction trigger characteristics and Schmitt trigger characteristics.

Certain preferred embodiments of the present invention include the further step of controlling the duty cycle of the output of said feedback. This controlling step generally comprises monitoring the output of said feedback and adjusting the input to said hysteresis element in response to said monitoring. Although monitoring and adjusting steps may be done off-line by a human observer or operator, it is preferred that said monitoring and adjusting steps be performed automatically by an electronic circuit or computer software. These preferred embodiments thus require the step of connecting a duty-cycle controller between the output of said feedback block and the input of said hysteresis element. The term feedback block output and hysteresis element input are used herein in the broad sense and include signals that are substantially proportioned to the actual input and output signals.

EXAMPLES

The non-limiting Examples which follow illustrate both the methods and apparatus of the present invention. Examples 1 and 2 illustrate embodiments of the invention relating to the synthesis of oscillatory chemical systems derived from an underlying electrochemical system. Example 3 illustrates embodiments relating to the synthesis of oscillatory chemical systems derived from underlying heat transfer systems. Additional details about the electrochemistry examples and the background thereof are contained in the thesis of Dr. Peter Kip Mercure entitled "The Oscillogenic Instrument," published May 29, 1990, which is available in the virginia Tech University Library, Blacksburg, Va. under call number LD5655 V856 1986 M473 and which is incorporated herein by reference. Additional details about the heat transfer example and the background thereof are contained in the thesis of Mr. Philip McGraw entitled "The Oscillogenic Control Algorithm," published Mar. 14, 1991, which is available in the Virginia Tech University Library, Blacksburg, Va. under the call number LD5655 V8556 19876 M447 and which is incorporated herein by reference.

EXAMPLES—ELECTROCHEMISTRY

Examples 1-2, including comparative examples, were performed using an electrochemical system as described below and as illustrated in FIGS. 9-39. The electrochemical system comprised an electrode immersed in an electrolyte solution and was prepared according to the electrochemical cell design described by H. O. Finklea of the Chemistry Department, Virginia Polytechnic Institute and State University [Finklea 1982], which is incorporated herein by reference.

A. THE ELECTROCHEMICAL CELL

FIGS. 9A-13 show schematic drawings of the cell used according to the present examples. The cell was constructed of a borosilicate glass cell, designated generally as 100, having a polyfluoroethylene three-way stopcock valve 101. The cell was constructed with cylindrical symmetry, and the side well 102 for the reference electrode was connected to the working cell 103 by a 2 mm inside diameter tube 103A (a Luggin probe). Because of the cylindrical symmetry of the cell 100 and the fact that the Luggin probe 103A was placed at the axis of the cylinder, it is believed that the large diameter of the reference electrode probe 104 would not affect the symmetry of the lines of constant electrical potential around the working electrode. The reference electrode 104 was a saturated Calomel electrode (Beckman).

Figure 11B:
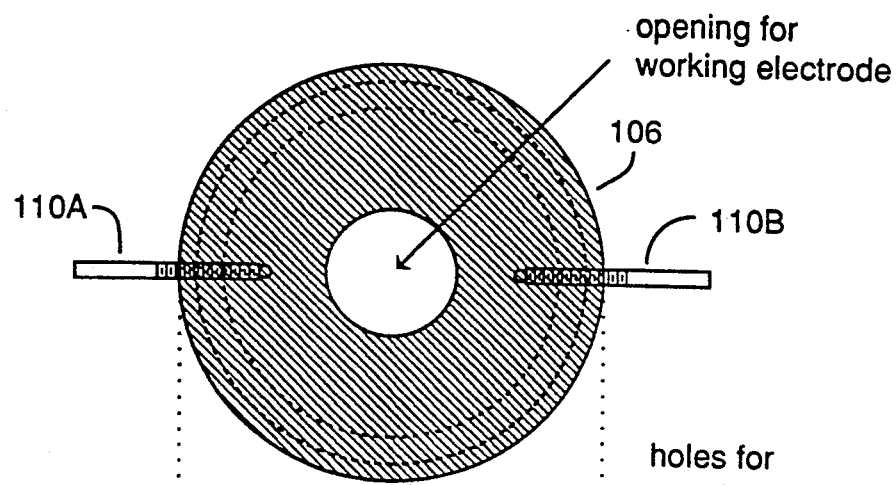
FIGS. 11A and 11B are cross-sectional and plan views of the cap used in the electrochemical cell described in Example 1, respectively.
Figure 11A:
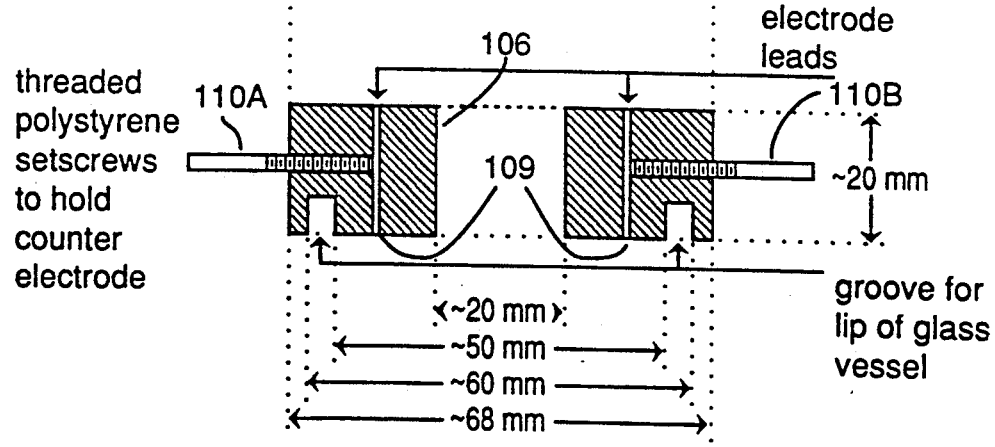

As best illustrated in FIG. 1 (the cell 100 was filled with approximately 60-70 ml. of electrolyte to a level just below the upper gas inlet 105. A cap 106 for the cell was constructed of polytetrafluoroethylene. The construction of the cap is illustrated in FIG. 11. The cap served as a support for working electrode 107 and counter electrode 108, as well as a seal to allow a blanket of inert gas in the space 103B above the electrolyte in the cell 100.

The counter electrode was a piece of platinum gauze (25 mm by 50 mm, 52 mesh, Fisher Scientific Co., Springfield, N.J. 07081) formed into a cylinder. The gauze was held in a cylindrical form by spot welding the two ends together, and it was suspended from the cell cover by two lengths of heavy gauge platinum wire 108A and 108B (70 mm each, 26 gauge, Fisher Scientific Co., 711 Forbes Ave., Pittsburgh, Pa. 15219), which were also spot welded to the platinum gauze. Support wires 108A and 108B were held in vertical holes 109 in cap 106 by means of threaded plastic rods 110A and 110B, which clamped the platinum wires in place.

Figures 12, 13:
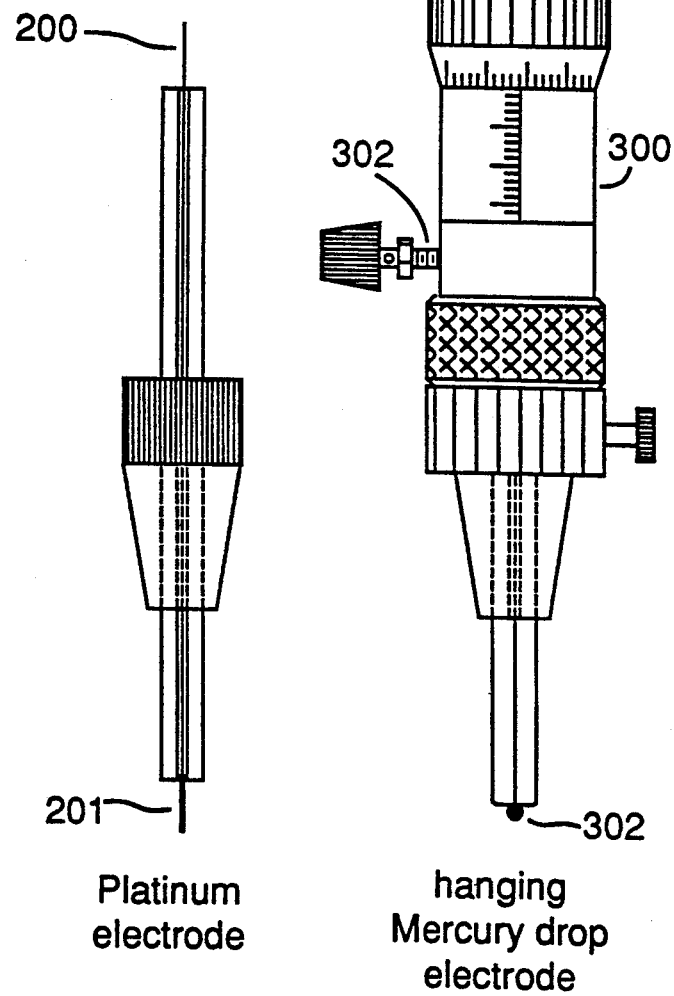
FIG. 12 is a semi-schematic view of the platinum electrode used in the examples.
FIG. 13 is a semi-schematic view of the hanging mercury drop electrode used in the examples.

Working electrode 107 was either a short length of heavy gauge platinum wire, as illustrated in FIG. 12 or a hanging mercury drop electrode, as illustrated in FIG. 13. The platinum working electrode, illustrated in FIG. 12, was constructed of a piece of heavy gauge platinum wire 200 with a Kynar wire wrap wire lead soldered to one end. The other end of the platinum wire was sealed with cement into the end of glass capillary 201 such that about 5 millimeters of bare end protruded from the cement (wire 0.48 mm diameter, 4.1 mm exposed length, 6.2 mm exposed area).

The hanging mercury drop electrode, illustrated in FIG. 13, was a commercial device from Metrohm (model E410, 'microfeeder' electrode, Metrohm AG, CH-9100 Herisau, Switzerland). This electrode was equipped with a mercury reservoir 300, the volume of which was controlled by a micrometer piston. In operations using the Mercury drop electrode, reservoir of cell 100 was connected to a glass capillary tube and the mercury drop 301 exuded and hung from the end, suspended in the electrolyte. The size of the mercury drop was measured by the number of divisions the micrometer was moved for each drop. Four divisions of the micrometer were used per drop, which from the literature on the E410 electrode is about 0.83 mm in diameter and about 2.22 mm in area. Electrical contact was made through the metal body of the electrode to the mercury, and a metal stud 302 was attached to the side of the metal body for connection to the potentiostat.

Figure 10:
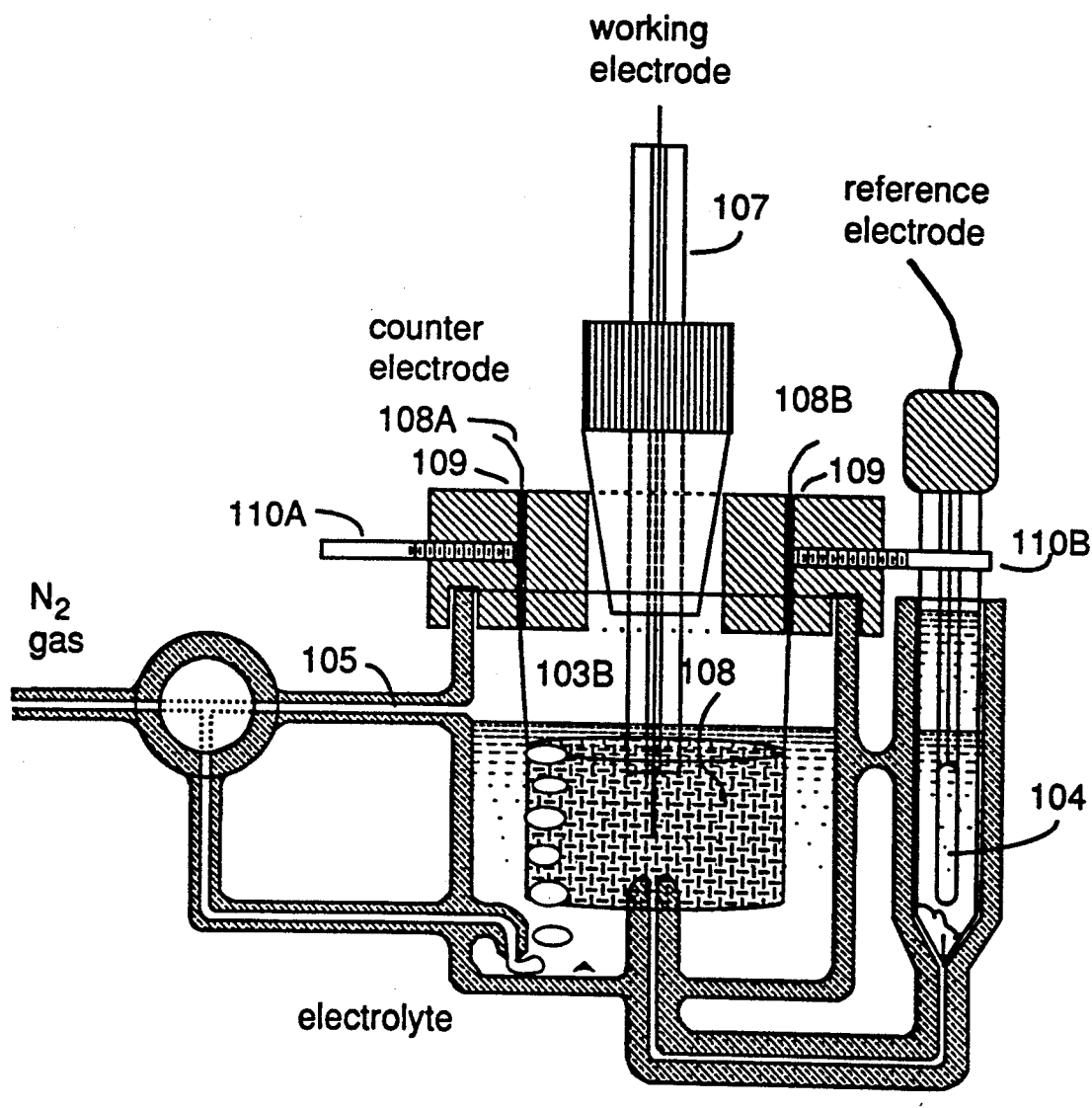
FIG. 10 is a semi-schematic representation of an assembled electrochemical cell according to Example 1.

FIG. 10 shows the overall relationships of the various parts of the electrochemical cell. In the operation of sparging the electrolyte with inert gas (low oxygen content nitrogen, <5 ppm, AIRCO), the nitrogen cylinder was equipped with a double stage regulator and a needle valve to regulate the flow rate of the nitrogen; first nickel chromium (stainless) steel tubing and then polyvinyl (Tygon) tubing were used to connect the gas valve to the glass cell. The electrode assembly was mounted on a ring stand (not shown), and a small incandescent light bulb placed behind the glass electrochemical cell helped in positioning and using the electrodes. The assembly was shielded from electrical noise by a Faraday cage (not shown) constructed from copper window screen. The screen was cut and bent into a box shape just big enough to enclose the base of the ring stand and the clamps holding the electrode assembly. The joints of the screen were soldered together with Lead/Tin solder. A box-shaped lid was similarly constructed. The metal rod of the ring stand extended up through the lid, and the rod was electrically connected to the copper cage. The cage was also electrically connected to the shield on the cable leading to the potentiostat.

B. THE SUPPORTING ELECTRONICS

Figure 14:
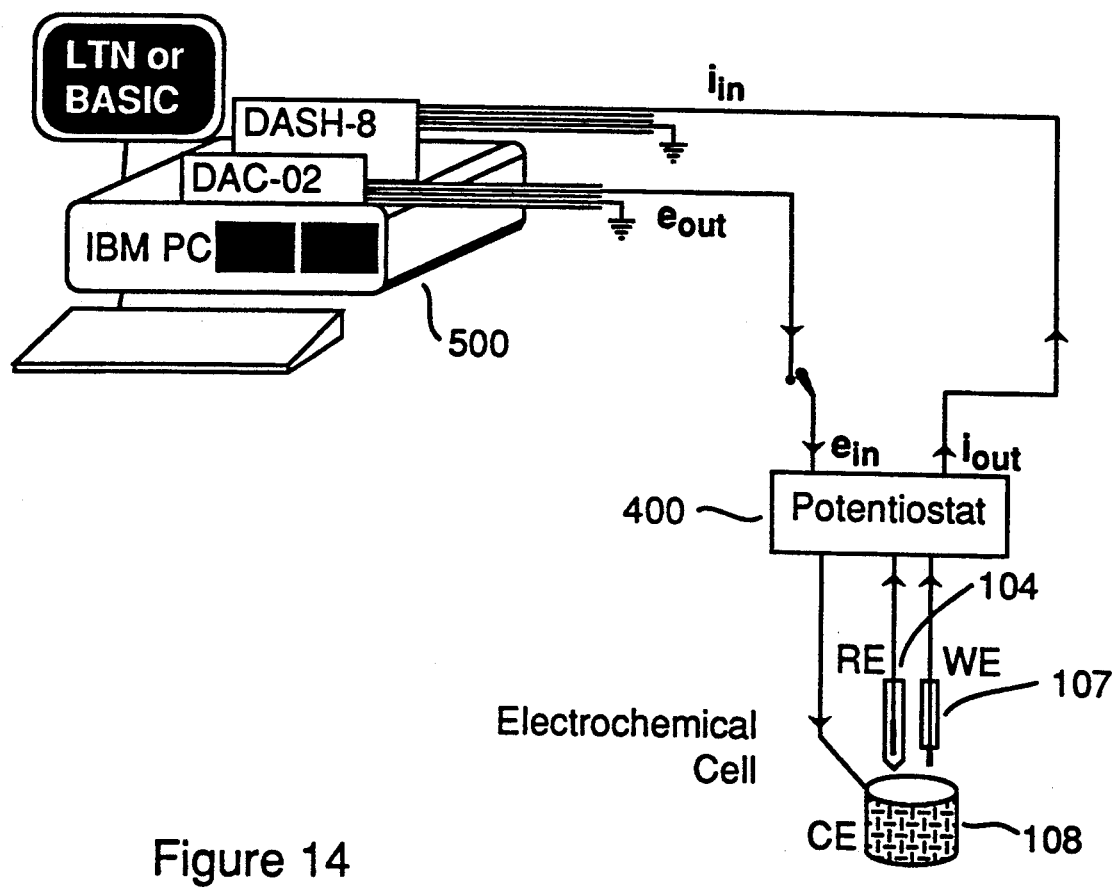
FIG. 14 is a semi-schematic view of the electrochemical system configured to conduct the scanning voltammetry tests of comparative examples 1 and 2.

The arrangement of the supporting electronics for the electrochemical cell are shown generally in FIG. 14. The underlying electrochemical system comprised a potentiostat 400 connected to the various electrodes 104, 107 and 108. A personal computer 500 was connected to the potentiostat 400 and was used to control the potential applied to the electrodes.

Figure 15:
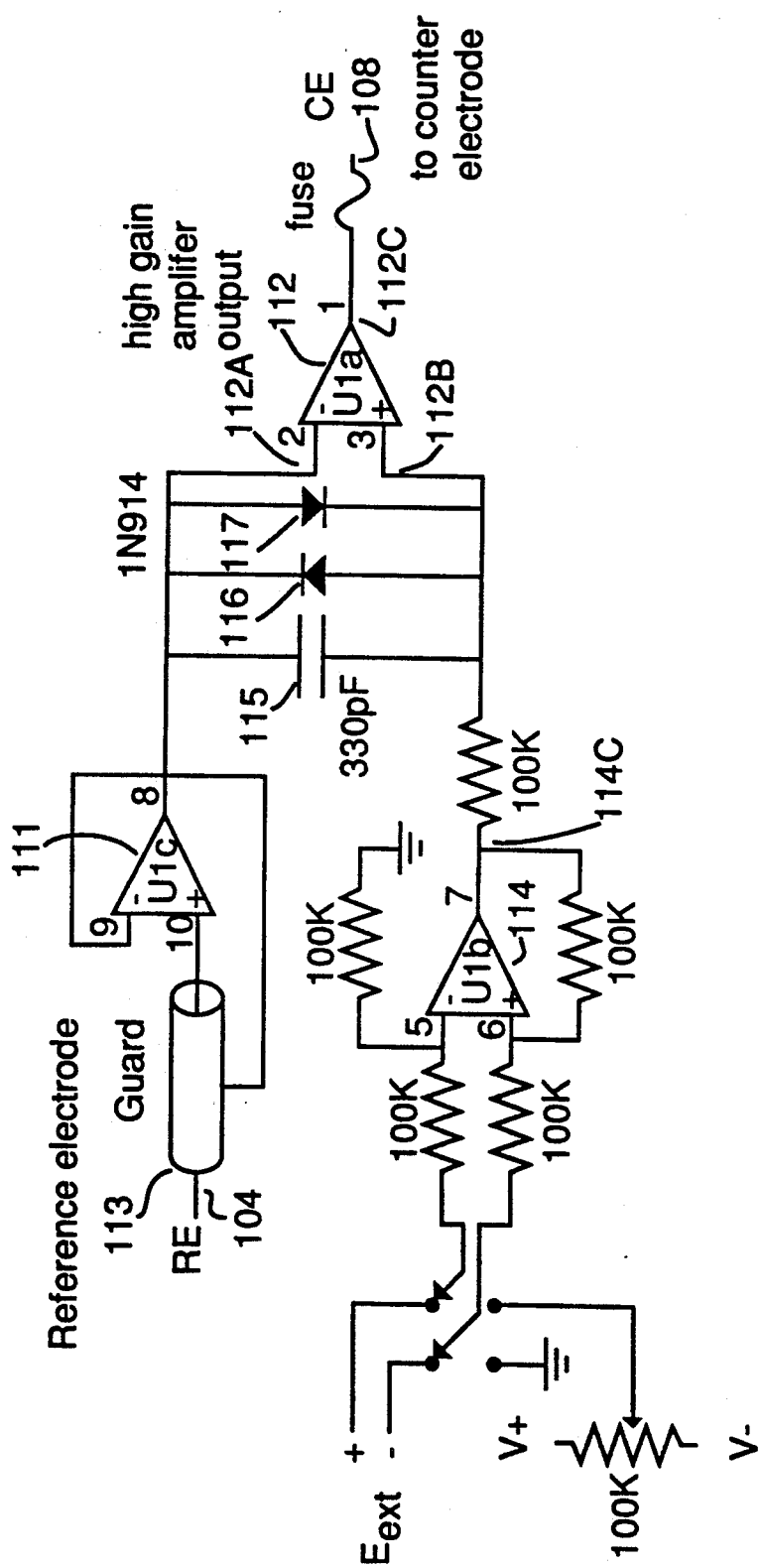
FIG. 15 is a semi-schematic representation of the potential output section of the potentiostat shown in blocked diagram 4 in FIG. 14.

The electronics associated with the potentiostat 400 will now be described in more detail in connection with FIGS. 15-17. In the potential output portion of the potentiostat, the reference electrode 104 was input to a voltage follower amplifier 111 ($U_1$, input impedance $>10^{12}\Omega$). The amplifiers in all of the circuits in this example are FET input, bipolar output operational amplifiers (Texas Instruments' TL084 or TL094 quad op amp packages, Radio Shack). The output of the voltage follower buffer amplifier 111 was connected to the minus input 112A of a high gain operational amplifier 112 (having a gain of greater than about 15,000). The output of the buffer amplifier also was connected to shield 113 around the lead to the reference electrode as a guard circuit to further reduce leakage currents. A standard differential amplifier 114 (U1b) was used to buffer the potential setpoint of the potentiostat. This setpoint can come from an internal voltage divider or an external source (Eext). In the examples, the external source was the personal computer 500. The output 114A of the differential buffer 114 was directed to the positive input of the high gain amplifier 112. Connected across the input terminals 112A and 112B of the high gain amplifier 112 (pins 2 and 3 of U1a), were a capacitor 115 to improve stability, and diodes 116 and 117 (type 1N914) to protect the amplifier input from transients. Although the operational amplifiers were protected against output short circuits, the output of the high gain amplifier 112 was also fused at 116 (0.25 ampere) to protect the electrodes and the rest of the circuit. The output 112C of the high gain amplifier (U1a) was the gain times the difference between the inputs. This output was connected to the counter electrode 108 (CE) which in turn affected the potential of the electrolyte solution around the working electrode 107. Reference electrode 104, via Luggin probe 103A, measured the electrical potential of the electrolyte solution in the vicinity of the working electrode, thus closing the loop. The potential difference between the reference electrode 104 and the setpoint was very small (<0.0001 volt) because of the high gain of the amplifier.

Figure 16:
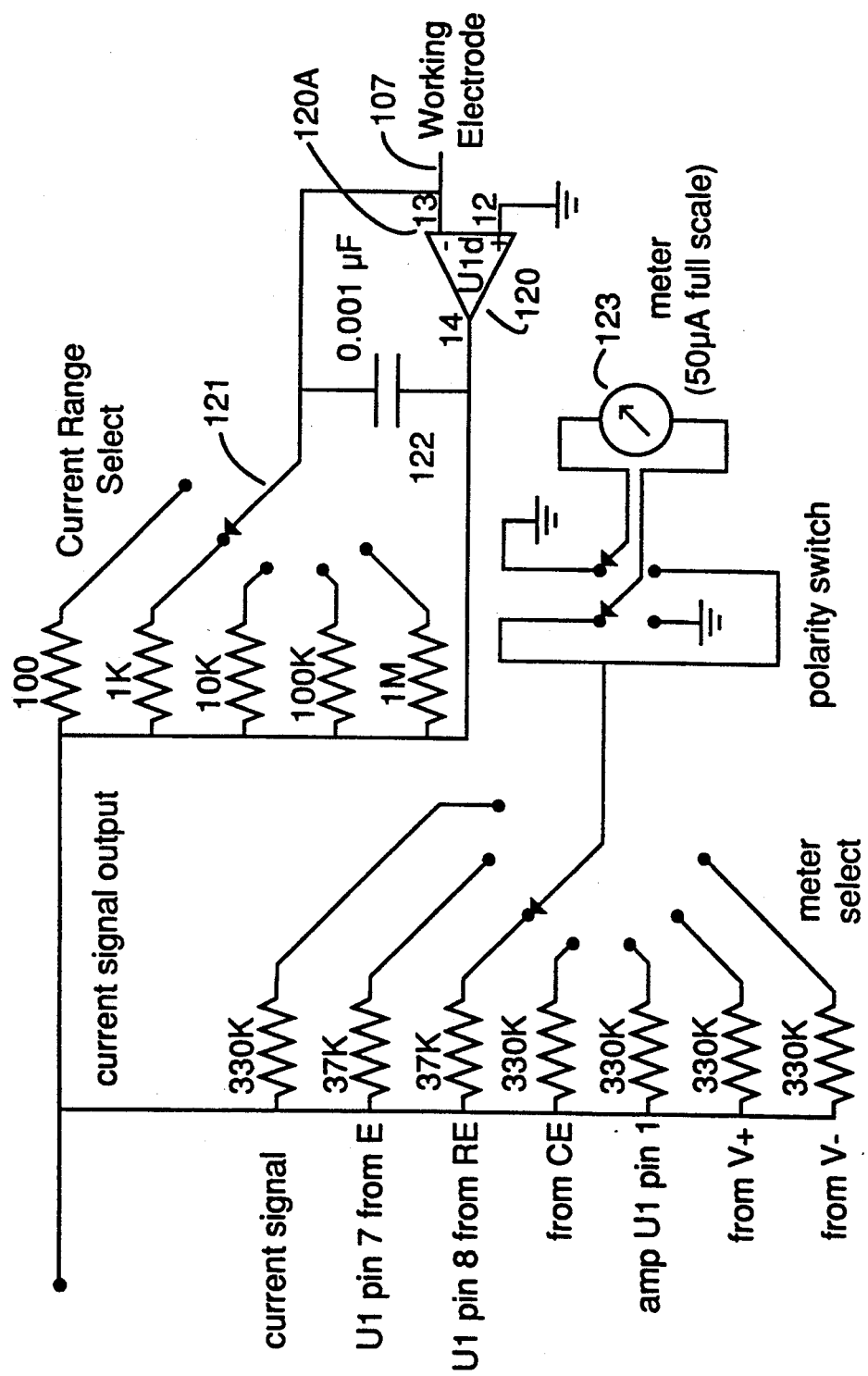
FIG. 16 is a semi-schematic view of the current measuring and output section of the potentiostat shown in blocked diagram form in FIG. 14.

FIG. 16 shows the current measuring circuit of the potentiostat 400. The working electrode 107 was connected to the input 120A of a low impedance current follower circuit 120 (pin 13 of U1d, <60$\Omega$ on the most sensitive scale to <0.006$\Omega$ on the least sensitive scale). In the feedback path of the circuit, a rotary switch 121 was provided to select the current range, from 1 volt-/microampere to 10 volts/milliampere. Also in the feedback path was a 0.001 microFarad capacitor 122 to improve the stability of the circuit. A meter 123 was also included in the potentiostat to monitor various internal voltages, from top to bottom: (1) the signal proportional to the current, (2) the potential setpoint, (3) the reference electrode potential, (4) the counter electrode potential, (5) the output of the high gain amplifier, (6) the positive supply voltage, and (7) the negative supply voltage.

Figure 17:
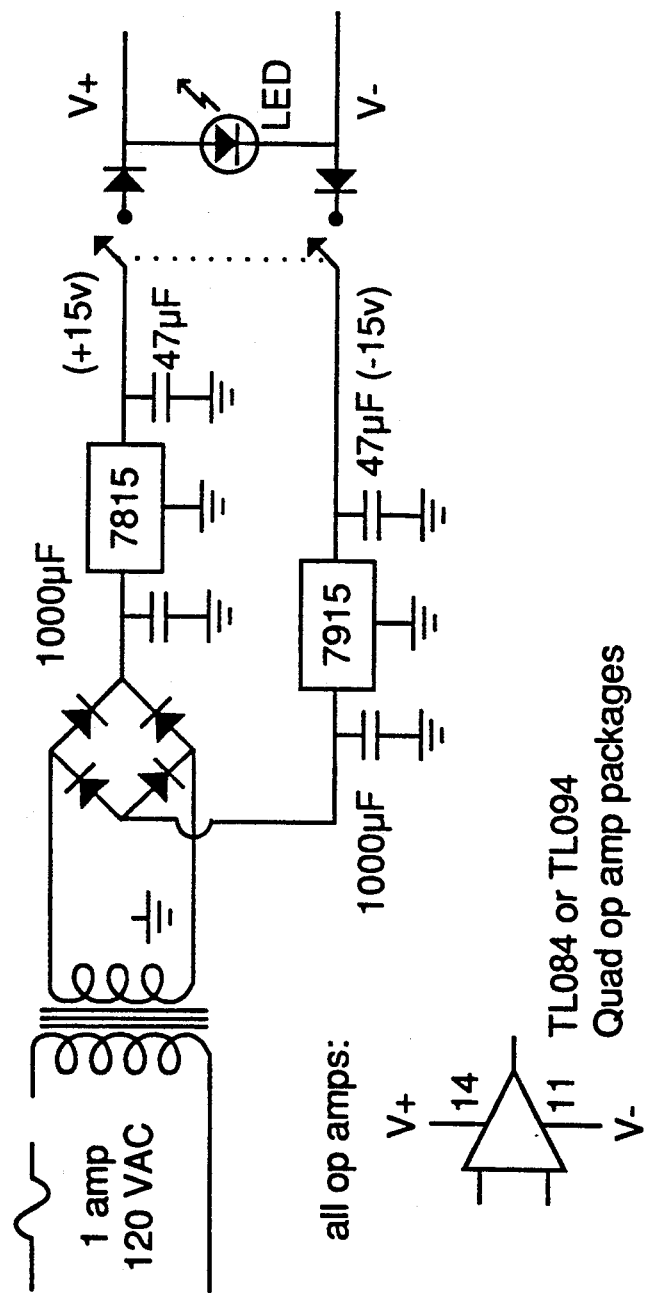
FIG. 17 is a semi-schematic view of the power supply section of the potentiostat shown in block diagram form in FIG. 14.

The power supply for the potentiostat is shown in FIG. 17. The power line supply was fused and the output had series diodes for protection. A switch was provided to completely remove power from the potentiostat and the electrodes. The power supply connections for the operational amplifiers are also shown.

The inputs and outputs to the electrochemical system were measured and/or controlled by a microcomputer 500 (IBM PC, IBM Entry Level Systems, Boca Raton, FL). The interface for voltage setpoint output was a commercially available digital-to-analog converter board (model DAC-02, MetraByte Corporation, 254

Tosca Drive, Stoughton, Mass. 02072) which was installed in the microcomputer. The interface for measuring the current signal from the potentiostat was a commercially available analog-to-digital converter board (model DASH-8, MetraByte Corporation, 254 Tosca Drive, Stoughton, Mass. 02072) which was also installed within the microcomputer.

COMPARATIVE EXAMPLE 1

In order to demonstrate the operability of the electrochemical cell, scanning voltammetric tests were conducted. The scanning voltammetry tests were controlled by a commercially available program installed on the microcomputer available under the trade name Lab Tech Notebook, distributed by Laboratory Technologies Corporation, 255 Ballardvalle Street, Wilmington, Mass. 01887. The raw data obtained as a result of these tests is reported according to the following conventions. The signal from the current measuring circuit shown in FIG. 12 is a positive voltage for a flow of electrons from the working electrode. In order obtain a consistency with standard electrochemical convention, the signal recorded by the personal computer was inverted before display. The potential applied to the working electrode is herein stated as a potential "with respect to the reference electrode." In the configuration of the present apparatus, the potential of the reference electrode was substantially the same as the setpoint applied to the potentiostat circuit shown in FIG. 11. Operation of the circuit shown in FIG. 12 results in the working electrode being held at a value substantially equivalent to ground. For example, if the potential applied to the input of the potentiostat, that is, the setpoint, is one volt, then the reference electrode potential will also be substantially one volt, while the working electrode will have a potential of about 0 with respect to the circuit ground. However, the potential of the working electrode with respect to the reference electrode will be $-1$ volt. Accordingly, the potentials reported herein with respect to the scanning voltammetry tests are the negatives of the voltage output by the digital to analog converter card.

The scanning voltammetry tests were conducted by first filling the clean glass cell with about 60–70 ml of electrolyte. The cell was then clamped on the ring stand in the open Faraday cage. The stopcock was adjusted such that the nitrogen was allowed to pass only to the sparging outlet at the bottom of the cell and at a rate of about 3–4 bubbles per second for about 15 minutes. This was found to be sufficient to remove residual oxygen from the solution such that it was not detectable as background current. The cell cap with the clean counter electrode in place was then mounted on the cell such that the counter electrode was centered in the cell and adjusted vertically such that the tip of the Luggin probe was centered between the top and bottom of the counter electrode. A ground glass stopper was placed in the opening for the working electrode. The microcomputer was then initiated to run the experiment. The potentiostat was set to its internal setpoint voltage and the voltage adjusted to the starting voltage of the experiment.

The working electrode was then installed in the cell such that it was centered in the cell and just above the Luggin probe. The reference electrode was then placed into the side well of the cell such that the level of electrolyte in the reference electrode is above the level of the electrolyte in the rest of the cell so as to avoid contamination of the reference electrode.

The electrodes were then connected to the potentiostat. The top was placed on the Faraday cage and all necessary grounding connections were made. The computer program was started and the potentiostat was switched to external voltage input. Upon completion of the computer program, the potentiostat was disconnected.

Figure 18:
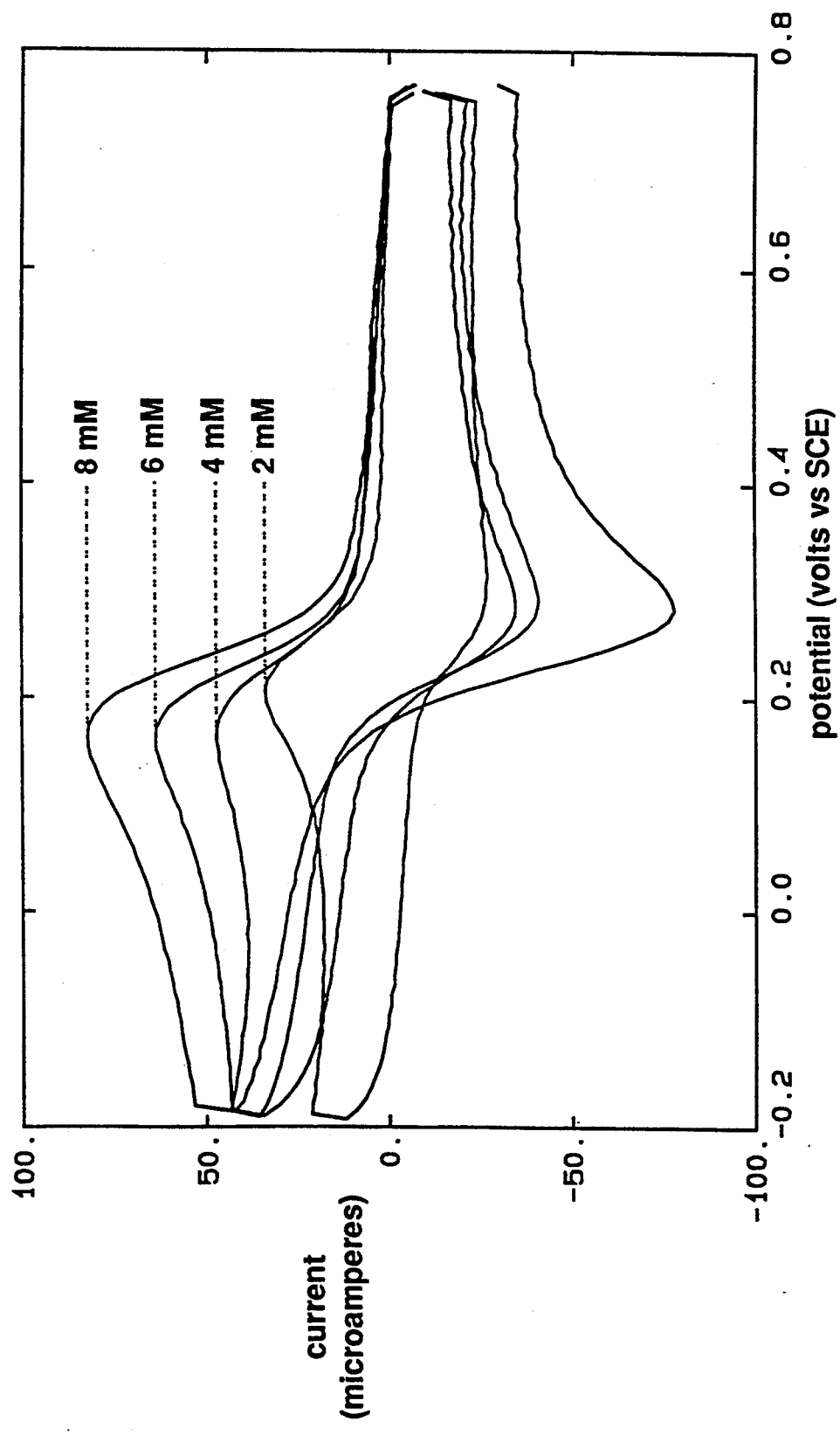
Figure 19:
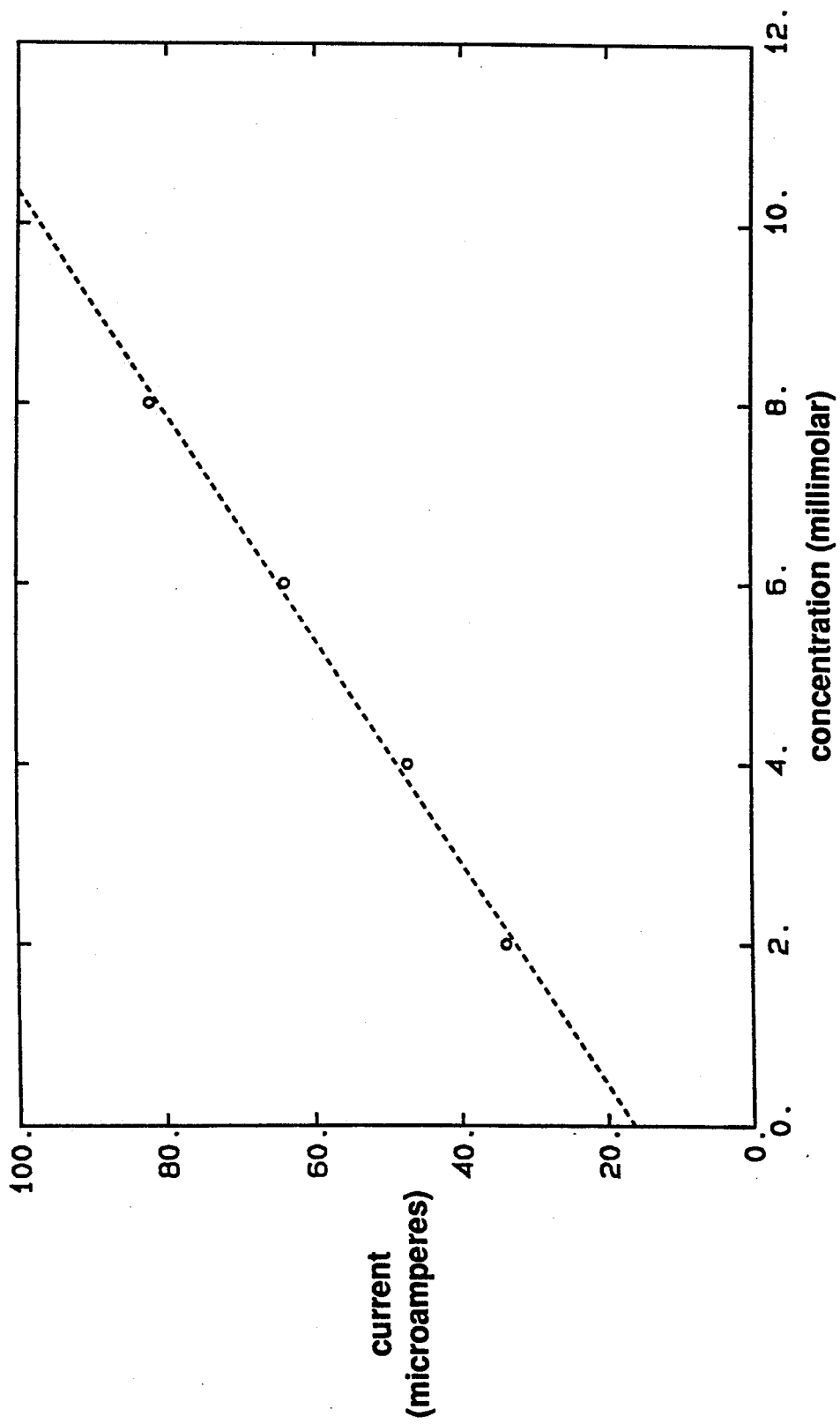
FIG. 19 is a graphical illustration of the results of Comparative Example 1 showing the relationship between peak scanning voltammetry current as a function of concentration of ferricyanide.

The cell was used to test the reduction of ferricyanide to ferrocyanide. A first electrolyte solution (solution A) consisting of a 1 molar aqueous solution of $KNO_3$ (ACS certified grade crystals, Fisher Scientific Co., Springfield, N.J. 07081) was prepared. A second electrolyte solution (solution B) consisting of 10 millimolar $K_3Fe(CN)_6$ in 1 molar $KNO_3$ was made. Solutions A and B were then used to prepare solutions C–F consisting of ferricyanide solutions of 2, 4, 8 and 10 millimolar $K_3Fe(CN)_6$, respectively. Each solution C–F was prepared by taking an aliquot of solution A and placing it into a volumetric flask, and then adding sufficient solution B to provide the designated molarity. The working electrode was platinum wire. Between runs, the electrode was cleaned by polishing with a paste of alumina (Conaco) and distilled water. The scanning voltammograms produced as a result of the tests on solutions C–F are shown in FIG. 18, and a plot of the peak currents on the negative going potential scan versus concentration is shown in FIG. 19, thus demonstrating the quantitative use of scanning voltammetry to measure concentration.

EXAMPLE 1

Figure 20:
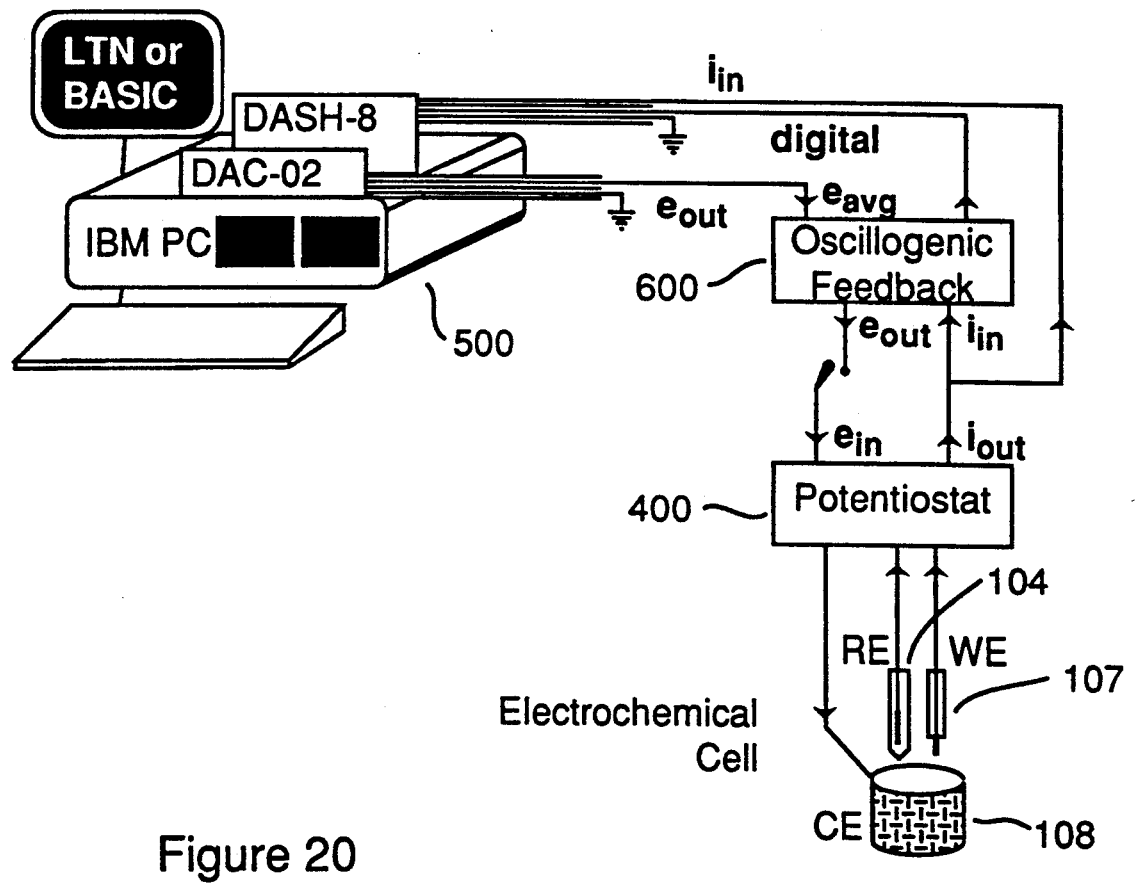
FIG. 20 is a semi-schematic view of the oscillogenic system according to Examples 1 and 2.

The methods of the present invention were applied to the electrochemical system described in Comparative Example 1 to produce a stable oscillogenic system. The general configuration of the apparatus used according to this method is shown in FIG. 20. According to this configuration, an oscillogenic feedback block 600 was connected between the current output from the electrochemical system and the potential input to the electrochemical system. The microcomputer 500 was coupled to the feedback block in order to aid in control and monitoring of the experiment.

The first step according to this embodiment of the present methods comprised the selection of an output of the electrochemical system that was dynamically related to one or more system inputs. The electrochemical system was analyzed by preparing a computer simulation of the system and analyzing the system using the simulation results. Initially, the current flowing to the working electrode was selected as a system output dynamically related to the applied potential as a system input. Analysis of this system revealed that such a system exhibited resilient response characteristics. It was determined that the net charge transferred across the electrode was a system output that was dynamically related to the applied voltage according to a cumulative response behavior. Furthermore, it was found that this system output was readily measured by integrating the current, as explained more fully below.

Figure 21:
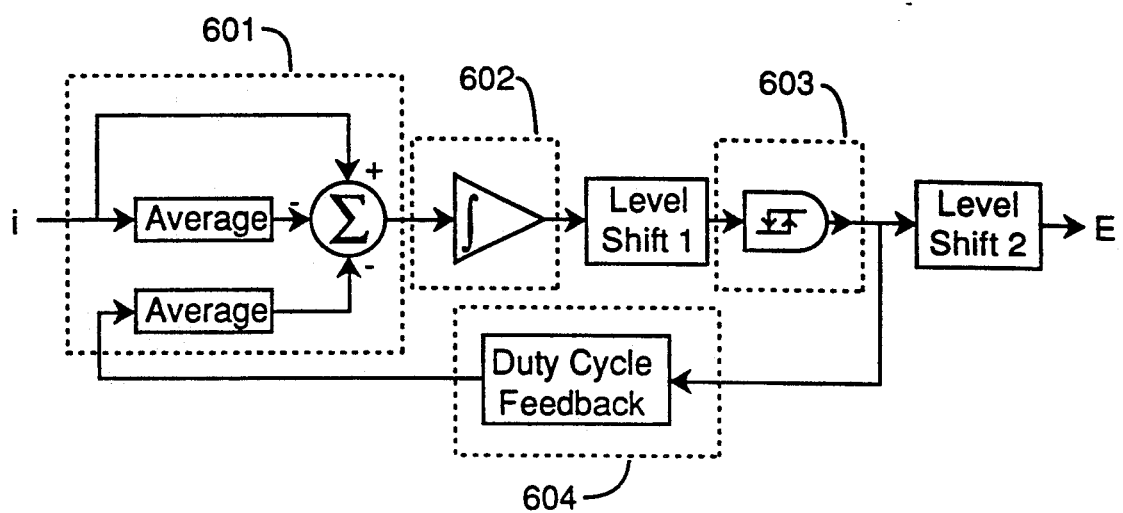
FIG. 21 is a schematic view in block diagram form of the feedback block shown in FIG. 20.

In general, the feedback block consisted of an input averaging section 601, an integrator section 602, a hysteresis section 603 and a duty cycle controller 604 connected as shown generally in FIG. 21. With particular reference to FIG. 22, the integrator consisted of a an operational amplifier with a feedback capacitor (polystyrene, Radio Shack), and the hysteresis element was a Schmitt trigger (CMOS 4093, Radio Shack). Since the output voltage of the integrator was not compatible with the input voltage of the Schmitt trigger, an operational amplifier was used as a level shifter to shift the voltage linearly. Since the output voltage of the Schmitt trigger was not the desired input to the electrochemical cell, another linear level shifter was used. In the illustrated circuit, the input to the integrator was a potential representative of the difference between the instantaneous current minus the average current by using an operational amplifier as an active first order filter. This input/output pair exhibited an increased cumulative response and was found to exhibit a much more stable oscillogenic behavior relative the system described above. A dynamic integrator balance, or dynamic trim, in the form of a duty cycle controller was also incorporated into the feed back block. The duty cycle controller developed a signal which was a measure of the duty cycle. This signal was then fed into the integrator to trim the duty cycle appropriately. The feedback block illustrated in FIG. 22 yielded a stable oscillogenic instrument.

Beginning from the left in the circuit shown in FIG. 22, the first circuit is an "averaging" circuit in the form of a simple first-order summing filter having a the time constant of about 0.47 seconds. The summing integrator circuit comprises a 3000 picoFarad polystyrene capacitor used for its low leakage characteristic. The potentiometer comprised is a balance adjustment. The output of the integrator was scaled or level shifted to provide the proper input signal for the Schmitt trigger using the two potentiometers shown in the circuit. These potentiometers were adjusted until an input of +10 volts gave an output of −10 volts and an input of −10 volts will gave an output of 0 volts. The hysteresis element, the Schmitt trigger, was a commercially available CMOS 4093 quad Schmitt nand gate. A CMOS (Complementary-Metal-Oxide-Semiconductor) device was chosen, rather than a TTL (Transistor- Transistor-Logic) device, because the power supply range of the former is much higher (the same supplies as the operational amplifier can be used). The power supply connections in this circuit are unusual, but this made the overall circuit design easier. The second level shifter is required to convert from the Schmitt trigger logic levels to the actual potential applied to the electrochemical cell. The variable resistor adjusted the voltage step size ($\delta E$), and the microcomputer digital-to-analog converter set the average voltage ($E_{avg}$). The circuit for the duty cycle controller section takes the logic level of the Schmitt trigger and subtracts an average value for the duty cycle desired (50%). This difference was then applied as an error signal. The gain of this circuit is very low (0.018); the adjustment to the integrator is small, a trim.

Using the procedure described in connection with Comparative Example 1, the electrochemical cell was again operated, except the feedback block 600 was incorporated in the system and a concentration series was used to compare the oscillogenic instrument to the accepted technique of scanning voltammetry. The average potential was scanned through a range of values, while the resulting frequencies were measured. The digital-to-analog converter used in the microcomputer had a digital input capable of measuring frequencies, but the LABTECH NOTEBOOK program could not make use of this ability. So a BASIC program was written to step the average potential and record the frequencies. This program is provided on pages 409 to 410 of the aforementioned Mercure Ph.D. thesis entitled "The Oscillogenic Instrument". The connections between the interface boards in the microcomputer, the oscillogenic feedback circuit, the potentiostat, and the electrochemical cell are shown in FIG. 20.

The results of test are shown graphically in FIG. 23 as frequency versus applied potential for a series of electrolyte concentrations ranging from 0 to 10 micromolar. The peak frequencies are shown as a function of concentration in FIG. 24. As can be seen from this test, a stable oscillogenic system was produced and valuable information about the underlying chemical system, eg., the electrolyte concentration, is found to be derivable from information about the nature of the oscillations, eg., the frequency. Moreover, the measured value in FIG. 23 is 0.11 volts. The peak width at half height for scanning voltammetry varies with the scan rate, and is not symmetrical (in extreme cases there is no half height on the negative side of the peak). But a comparison of FIGS. 23 and 18 shows that the oscillogenic technique has a sharper peak than scanning voltammetry. This may provide the ability to more easily discriminate between chemical species.

COMPARATIVE EXAMPLE 2

A second system was tested using the apparatus and procedure described in Comparative Example 1 with a different type of electrode, in a different potential region, using different types of ions, and a different type of electrochemical reaction (an insoluble product rather than a soluble one) was used. The system was a mixture of Lead and Cadmium ions in a perchlorate electrolyte [Brown 1984]. Stock solutions of aqueous NaOH (ACS certified grade, Fisher Scientific Co., Springfield, N.J. 07081), and perchloric acid (from ACS reagent grade, 70% solution, Fisher Scientific Co., Springfield, N.J. 07081) were prepared. The NaOH was standardized against potassium hydrogen phthalate. Stock solutions of $Pb(NO_3)_2$ (ACS certified grade crystals, Fisher Scientific Co., Springfield, N.J. 07081) and $Cd(NO_3)_2 \cdot 4H_2O$ (ACS certified grade crystals, Fisher Scientific Co., Springfield, N.J. 07081) in distilled water were also prepared. A burette was used for the NaOH and perchloric acid solutions to dispense appropriate quantities into 100 ml beakers. Pipets were used to dispense the Lead and Cadmium solutions. The pH of the mixture was adjusted to 1.7 by the addition of perchloric acid stock. The mixtures were transferred to 100 ml volumetric flasks and distilled water was added to bring the volume to 100 ml. The final solutions were about: 0.5 M $NaClO_4$, 0.01 M $HClO_4$, and 0.004 M $Cd++$. Concentrations of Lead ion were about: 0.002, 0.004, 0.006, 0.008, and 0.010 M $Pb++$. The experiments were done in triplicate. The peak position should have remained constant, and if a run deviated significantly (>0.012 volt) from the average peak potential it was rejected. No more than one run out of the three was ever rejected.

The averages of the replicate scanning voltammetry results for the concentration series are shown graphically in FIGS. 25-29 as short line segments due to the number of data points taken during each run. There are two peaks corresponding to the two electroactive ionic species. The peak resulting from the reaction of Lead is about −0.4 volts, and the peak resulting from the reaction of the Cadmium is about −0.6 volts. The peak values as a function of concentration are shown in FIGS. 30 and 31.

EXAMPLE 2

The procedure of Comparative Example 2 was repeated except that the oscillogenic feedback block described in connection with Example 1 was connected as shown in FIG. 20. The averages of the replicate oscillogenic scans are shown in FIGS. 32-36 as short line segments. The total scan times were limited by the time that a Mercury drop would safely stay on the tip of the hanging Mercury drop electrode. The Metrabyte analog-to-digital card had a frequency measuring mode and a period measuring mode, however, the frequencies used (100's of Hz) fell in a region where the precision of the card was low. The measurements in FIGS. 32-36 were made in frequency mode, counting cycles for one second, thus the precision of the measurement was $\pm$Hz. The Lead concentration changes and the peaks reflect this change; FIG. 37 shows the dependence of the peak current and the peak frequency on the Lead concentration. Since the Cadmium concentration does not change, any change in the Cadmium peak heights with a change in Lead concentration indicates an interference of the Lead in the Cadmium determination. FIG. 38 shows the Cadmium peaks in the oscillogenic scan.

Both the scanning voltammetric and the scanning oscillogenic methods show similar responses as a function of concentration. Comparing the peak widths in scanning voltammetry (FIGS. 25-29) to those from the oscillogenic scan (FIGS. 32-36), the scanning voltammetry current peaks appear to be somewhat broader than the frequency peaks from the oscillogenic scan. Because the oscillogenic peaks are marginally better resolved than the scanning voltammetric peaks, it may be expected that the interaction between the Lead and Cadmium responses to be much less in the oscillogenic system. But there are interferences in both methods. While the Cadmium concentration did not change, the peak response in both methods did. In both methods, the change in the Lead peaks was much greater than that of the Cadmium peaks. The Lead ion reacts before the Cadmium ion in the potential scan and the Lead will continue to react when the Cadmium begins to react. So a maximum interference effect can be expected. In an effort to compare the relative magnitudes of the interference in both methods, the Cadmium responses for both scanning voltammetry and oscillogenic methods were normalized on the scale of the Lead responses for each method. The results are plotted in FIG. 39. The minimum value on the vertical axis represents the response for the minimum (0 mM) concentration of Lead (as predicted by the linear regression for both methods); the maximum value on the vertical axis represents the response for the maximum (12 mM) concentration of Lead (as predicted by the linear regression for both methods). For scanning voltammetry results: normalized peak response (% of maximum) = (ipeak (microamperes) $-0.2488)/(2.6248-0.2488)$ [6]

For oscillogenic scan results:

normalized peak response (% of maximum) = (fpeak (Hz) $-141.00)/(301.46-141.00)$ [7]

FIG. 39 shows no significant difference between the curves for the scanning voltammetry and the oscillogenic method. Despite the fact that the peaks are better resolved in the oscillogenic method, this does not appear to reduce the interference observed. But it can be said that the oscillogenic technique will give concentration results just as selective as the scanning voltammetry method.

EXAMPLE 3

An oscillogenic instrument in which the underlying physical system was a stream of heated air was synthesized. The oscillogenic system is illustrated in block diagram form in FIG. 40 and consisted of the flowing air system 700, an actuator 750 in the form of an electrical resistance heating element, a sensor 800 in the form of a thermocouple and a feedback block 850. In this example, the actuator output and hence the input to the underlying chemical system was heat and the parameter measured by the sensor and hence the system output was temperature.

The experimental apparatus for the underlying chemical system is illustrated schematically in FIG. 41 and consisted of approximately 70 centimeters of multi-diameter glass tubing 751 through which air was forced. Most of the glass tubing had an approximate inside diameter of 0.89 centimeters. Two 13-centimeter sections 751A and 751B of the tubing had an inside diameter of 5 centimeters. Section 751A housed the heating unit (heating elements from a 500 Watt forced air hair dryer) and section 751B contained a packed bed of 3 millimeter diameter glass beads.

Two thermocouples TC0 and TC1 Were placed through 3 millimeter holes in the smaller diameter section of the tubing such that they protruded into the air flow. TC0 was placed downstream from the heating unit section 751A but upstream from the packed bed section 751B, while TC1 was located downstream from the packed bed section 751B and about 13 centimeters upstream from where the air exited the system into the surrounding room. Air was supplied to the entrance of the glass tubing from a filtered and regulated compressed air supply. The air was filtered before it entered the regulator (Sears model 282.160232 regulator). The supply air pressure was adjusted via the regulator from 0 to 30 psig as indicated by a pressure gage located just downstream from the regulator. From the regulator the air passed through a length of steel piping and connections, through approximately 120 centimeters of 2.54 centimeter diameter plastic Tygon tubing, and through a small glass wool filter before it entered the glass tubing apparatus. The pressure observed at the entrance to the glass tubing was approximately 2.5 psig when the supply gage read 30 psig.

To monitor and control the temperature of air flowing through the system, the actuator and sensor components of the system utilized electronic interfacing. The thermocouples produced a very low-level (millivolt)) potential signals that were amplified to a level usable by feedback block (often 0 to 5 or 0 to 10 volts). In the apparatus presently described, an AD521 instrument amplifier circuit was used for this purpose. The signal produced by the feedback block was conditioned and/or converted in such a way as to produce the intended process variable adjustment by the actuator. In particular, a 0-to-10 volt signal from the feedback block was used by a pulse width modulator circuit (PWM) to activate a zero voltage switch (ZVS). The ZVS produced an alternating current (AC) waveform to the heating element such that heating occurred at a rate which was about proportional to the controller's original 0 to 10 volt signal.

As illustrated schematically in FIG. 42, the feedback block included an IBM PC with 640 kilobytes of read/write memory, two 5.25-inch floppy diskette drives, IBM color graphics adapter (CGA) and color monitor. A Leeds and Northrup digital controller was utilized in combination with IBM PC. The PC was interfaced to the apparatus through a switch box such that either the Leeds and Northrup or the IBM PC could be used to control the temperature of the air at one of two different points in the system. Two add-in interface cards provided the computer with the needed analog-to-digital conversion (ADC) and digital-to-analog conversion (DAC). Metrabyte, Inc. manufactured these two boards, the model DASH-8 (ADC) and the model DAC-02 (DAC). The ADC board was capable of reading a −5-to-+5 volt signal with a resolution of millivolts and the DAC board produced a 0-to-10 volt signal with the same resolution.

The primary functioning of the feedback block according to the present example was performed by a software implementation which provided control action similar to the circuitry described in connection the previous examples. In particular, FIGS. 43A and 43B contain flowchart depictions of the software-based control algorithm installed in the PC, and the Pascal listing for same appears in Table 5A. The names of Table 5B, and each module's action is briefly summarized. Lines 3 through 6 of "ControlAlgorithm" perform the duty-cycle feedback action. The elapsed time is calculated on Line 7 from the elapsed number of samples since the controller was started ("RunCount") multiplied by the amount of time between sampling ("SampleTime"). (The "RunCount" is re-scaled in another part of the control program to maintain an accurate time-base in case the "SampleTime" is modified by the program operator.) The input to the controller from the sensor is read in Line 8's reference to the "ReadAnalog" procedure. Line 9 averages the input signal (using a first-order filtering function) and line 10 calculates how much the instantaneous input deviates from the average input. The integration of the input and duty-cycle deviations is calculated on Lines 11 through 13, making use of the "Integral" function. Lines 14 through 17 perform the pre-hysteresis level shift and the Schmitt trigger operations. The post-hysteresis level shift is accomplished in lines 18 through 20. The "WriteAnalog" procedure referenced on line 21 sends the controller output signal out through the DAC (Digital to Analog Converter) to the actuator. Lines 22 through 27 perform bookkeeping operations that update frequency data every cycle after the first two full cycles.

Due to its software implementation, certain of the control parameters used according to the present example were adjustable. Two significant pairs of control parameters in the oscillogenic controller adjusted the shape of the Schmitt trigger hysteresis loop. The Schmitt trigger function itself is defined as a "pure Schmitt trigger" with a width and height of one dimensionless unit. Controller input and output ranges were normalized to the range of zero to one, providing the basis for the dimensionless units used for all internal calculations in the oscillogenic control program. The pre-hysteresis gain and offset changed the apparent width and horizontal offset of the hysteresis loop. If the signal from the integration block is multiplied by a high pre-hysteresis gain then the unit width Schmitt trigger will be narrow in comparison with the range of the multiplied integrator signal. As will be noted hereinafter, a gain of 50.0 yielded more useful results than did gains near unity. A pre-hysteresis offset of 0.5 provided that the integral signal oscillated around zero.

The post-hysteresis level shift dictated the effective height of the hysteresis loop. A gain of greater than unity for this setting is meaningless since both the Schmitt trigger output and the controller output signals have a maximum defined range of zero to one. The post-hysteresis gain used consistently in the oscillogenic runs was 0.4, which translates into a 4-volt DAC output signal range. An offset of 0.1 gave the DAC output levels of 1 and 5 volts. The maximum amplitude for the controller output waveform was achieved by selecting a unity gain and a zero offset for the post-hysteresis level shift settings.

The oscillogenic controller settings also included a duty-cycle set point and the duty-cycle feedback gain. It was found that the duty-cycle set point should be set to 0.5 (fifty percent) for stable oscillogenic performance. The duty-cycle feedback gain affects the amount of influence the duty cycle feedback exerts on the operation of the oscillogenic instrument. Unless otherwise indicated, a duty-cycle feedback gain of 0.1 was used for this example.

The remaining two adjustable parameters in the software-driven oscillogenic controller are the averaging filter time constants. In the thermal oscillogenic instrument of the present example, frequencies varied between 0.03 and 0.06 hz. The filter time constant used for both input and duty-cycle averaging for most experiments was 100 seconds. This gave a range for the ratio of filter time constant to oscillation period of between 3 and 6. Filter time constants greater than about 100 tended to retarded the oscillogenic frequency's tracking of changes in the physical system parameter. Table 6 lists all of the controller settings that are adjustable in the oscillogenic control algorithm developed. All of the controller parameters were adjustable via a controller-settings menu in the control program. A copy of the settings menu screen (with settings used for the present example) is presented in Table 7.

Timer interrupt-driven software coupled to timer interrupt hardware was used to activate the control algorithm at specified time periods. The IBM PC had a time-of-day clock timer that generated interrupts at a rate of approximately 18.2 Hz and the time interval at which the control algorithm ran was adjustable by integer multiples of 0.055 seconds. The adjustment was made possible by a primary interrupt procedure (called "Timer") that was designed to run on every interrupt but which invoked the control procedure only after a specified number of timer interrupts. The interrupt-driven part of the oscillogenic control program was not reentrant primarily because it referenced parts of the PC-DOS operating system that were not reentrant.

The control program also provided a real-time, visual, data display feature for monitoring data during the operation of the oscillogenic instrument. The oscillogenic control program written for this research included both numeric and graphic displays of controller input data and a numeric display of controller output and oscillogenic frequency. Means for storing data were also provided.

Duty-cycle feedback gain is a tuning parameter that the control algorithm uses to amplify (i.e., multiply) the duty cycle deviation signal. The resulting duty cycle feedback signal is fed back to the integrator, as FIG. 46 shows. The duty-cycle feedback gains used in these tuning experiments ranged from 0.01 to 10. When the value was too low, recovery of duty-cycle and frequency was sluggish. When the duty-cycle feedback gain was too high, the background frequency of the instrument masked physical system changes that would otherwise have been indicated by frequency changes.

Sluggish recovery from a positive direction disturbance in air flow rate is caused by the heater remaining on high for longer than usual (ie., duty-cycle higher than fifty percent). This tendency occurs because the controller tries to keep the temperature oscillating about the same pseudo-set point (time averaged temperature). A higher air flow rate makes more heat necessary if the same equilibrium temperature is to be maintained, and for this reason the heater remains high longer and the heater duty-cycle increases.

The oscillogenic instrument was tuned by adjusting the duty-cycle feedback gain and the pre-hysteresis gain. Duty-cycle feedback gain tuning had a primary influence on meeting the disturbance recovery objective. Pre-hysteresis gain was the tuning parameter that affected the sensitivity of the instrument's frequency to changes in the variable that the instrument measures. The pre-hysteresis gain effectively adjusts the width of the nonlinear element input range. With a Schmitt trigger nonlinearity having a defined width of one unit, the width of the hysteresis loop can be altered with the pre-hysteresis gain. With low pre-hysteresis gains (1.0 or less), little or no shift in frequency was observed after transient effects of a step disturbance had dissipated. These transient effects involved a sudden drop in frequency and were probably caused by the temporary duty-cycle imbalance. Pre-hysteresis gains on the order of 10 gave the best frequency sensitivity. A value of 50 was selected for the present example. At values of 100 and above the frequency became less constant and apparently too sensitive to system noise. A complete list of the oscillogenic controller tuning parameters is given in Table 8, along with approximate ranges over which each parameter is valid.

The underlying chemical system, with heat applied as input and temperature as output was analyzed by conducting open-loop dynamic testing on the system and found to exhibit cumulative response characteristics. However, after responding initially like a first-order cumulative response, the system continued with a sluggish upward trend. One explanation for this type of dynamic behavior may be that the slow temperature drift was caused by the glassware and other stationary components of the system heating up at a slower rate than the stream of flowing air. If this were the case, then the equilibrium temperature of the air stream would experience a temperature change only at the rate that heat transfer from the stationary components (other than the heater itself) dictated. This slow drift would only be noticeable after the initial response caused by the heating element.

Based upon the open loop testing, it was expected that under the conditions existing during oscillogenic experiments the temperature would oscillate at a rate sufficiently high to avoid significant influence of effects from the slow drift phenomena observed during step testing. Because the drift begins to dominate the response at times after about one half the "first-order-plus-dead-time" time constant, tuning parameters of the feedback loop were adjusted to result in a frequency response have an oscillation period that was less than the FOPDT time constant of the system. That is, the instrument was tuned to provide an oscillation frequency range in which the slow drift phenomena did not dominate the dynamic response.

After the tuning experiments yielded satisfactory controller parameters and after software synchronization problems were solved, the oscillogenic system was operated under a series of conditions in order to establish operability and the relationship between oscillation characteristics and other parameters of the system. In particular, the inverse FODT time constant, the inverse SODT time constant, and the coefficient of convective heat transfer coefficient were each found to be functionally related to the frequency of the oscillogenic system, as illustrated in FIGS. 44, 45 and 46, respectively.

TABLE 5A

Listing of "ControlAlgorithm" Procedure

```
1  procedure ControlAlgorithm;
2  begin {procedure ControlAlgorithm}
3      Data.DutyCycleDeviation: = DutyCycleGain*(DutyCycleSetPoint
4                                        −FOFilter(Data.DutyCycle,
5                                                  AlphaDutyCycle,
6                                                  HistoryDutyCycle));
7      Data.Time: = SampleTime*RunCount;
8      ReadAnalog(Data.Input);
9      Data.AvgInput: = FOFilter(Data.Input, AlphaInput, HistoryInput);
10     Data.InputDeviation: = Data.AvgInput-Data.Input;
11     Data.IntegralDeviation: = Integral(Data.InputDeviation
12                                        +Data.DutyCycleDeviation,
13                                        HistoryDeviation);
14     Data.DutyCycle: = SchmittTrigger(LevelShift(Data.IntegralDeviation,
15                                                 PreHysteresisGain,
16                                                 PreHysteresisOffset),
17                                      Data.DutyCycle;
18     Data.Output: = LevelShift(Data.DutyCycle,
19                               PostHysteresisGain,
20                               PostHysteresisOffset);
21     WriteAnalog(Data.Output);
22     if Switched then
23     begin
24        Switched: = false;
25        if Cycle>1 then Data.Frequency: = 1.0/(Data.Time-TimeLastSwitched);
26        TimeLastSwitched: = Data.Time;
27     end {if};
28 end {procedure ControlAlgorithm};
```

TABLE 5B

| Module | Description |
| --- | --- |
| Modules Referenced by "ControlAlgorithm" | |
| FOFilter | Uses first-order filter algorithm to average data |
| ReadAnalog | Reads controller input through ADC from sensor |
| Integral | Uses rectangular numerical integration algorithm to perform integration |
| SchmittTrigger | Simulates a Schmitt trigger integrated circuit |
| LevelShift | Multiplies by a gain and adds an offset |
| WriteAnalog | Writes controller output through DAC to actuator |

TABLE 6

Adjustable Oscillogenic Control Parameters

1. Pre-Hysterisis Gain
2. Pre-Hysteresis Offset
3. Post-Hysteresis Gain
4. Post-Hysteresis Offset
5. Duty-Cycle Feedback Gain
6. Duty-Cycle Set Point
7. Input Averaging Filter Time Constant
8. Duty-Cycle Averaging Filter Time Constant

TABLE 7

Controller Parameter Input Menu
Oscillogenic Controller Settings:

| | | |
| --- | --- | --- |
| 1 | Input Filter Time Constant = | 100.000 |
| 2 | Pre-Hysteresis Gain = | 10.000 |
| 3 | Pre-Hysteresis Offset = | 0.500 |
| 4 | Post-Hysteresis Gain = | 0.400 |
| 5 | Post-Hysteresis Offset = | 0.100 |
| 6 | Duty Cycle Filter Time Constant = | 100.000 |
| 7 | Duty Cycle Gain = | 0.100 |
| 8 | Duty Cycle Set Point = | 0.500 |
| 9 | Save Settings to Defaults File | |
| 10 | Finished with Settings | |

TABLE 8

Adjustable Oscillogenic Control Parameters

1 Pre-Hysteresis Gain ($0.0^+$ ... MaxReal)
2 Pre-Hysteresis Offset ($-1.0$ ... $1.0$)
3 Post-Hysteresis Gain ($0.0^+$ ... $1.0$)
4 Post-Hysteresis Offset ($0.0$ ... $1.0$)
5 Duty-Cycle Feedback Gain ($0.0^+$ ... MaxReal)
6 Duty-Cycle Set Point ($0.0$ ... $1.0$)
7 Input Averaging Time Constant ($0.0^+$ ... MaxReal)
8 Duty-Cycle Averaging Time Constant ($0.0^+$ ... MaxReal)

Note:
$0.0^+$ denotes a value slightly larger than zero, and MaxReal denotes a very large positive value.

What is claimed is:

1. A method of synthesizing a stable oscillatory chemical system from an underlying chemical system having inputs and outputs comprising:
   (a) selecting an output of the underlying chemical system that is dynamically related to one or more of said inputs;
   (b) analyzing the underlying chemical system to determine whether the response of said output to a change in said input is a cumulative response or a resilient response;
   (c) whenever said response is determined to be resilient,
      (i) connecting a feedback block between said output and said input, said feedback block having non-linear dynamics and a preaction hysteresis characteristics; or
      (ii) repeating steps (a) and (b) with a different input-/output pair until said output exhibits a cumulative response to a change in said input; and
   (d) whenever said response is determined to be cumulative, connecting a feedback block between said chemical system output and said chemical system input, said feedback block having non-linear dynamics and inverting or non-inverting Schmitt trigger hysteresis characteristics.

2. The method of claim 1 wherein said analyzing step comprises analyzing the open-loop response of said underlying chemical system.

3. A stable oscillatory chemical system synthesized according to the methods of claim 1.

4. The method of claim 1 wherein steps (c)(i) and step (d) further include controlling the duty cycle of said feedback block.

5. The method of claim 4 wherein said controlling step comprises maintaining the duty cycle of said feedback block at a value of about 50%.

6. The method of claim 1 wherein said feedback block comprises an integrator and a hysteresis element connected to said integrator.

7. The method of claim 6 wherein said hysteresis element comprises an electronic circuit or a software algorithm.

8. The method of claim 6 wherein said feedback block further comprises a duty cycle controller for controlling the duty cycle of said feedback block.

9. A method of synthesizing a stable oscillatory chemical system from an underlying chemical system for extracting information about the physical characteristics of said underlying chemical system comprising:
   (a) selecting an output quantity of the chemical system whose value is readily measured or determined;
   (b) selecting an input quantity related to said output quantity such that (i) the partial derivative of said output with respect to said input is not zero and (ii) the response of said output is cumulative with respect to a change in said input;
   (c) connecting a feedback block between said chemical system output and said chemical system input, said feedback block having non-linear dynamics and having inverting Schmitt trigger hysteresis characteristics; and
   (d) controlling the duty cycle of said feedback block to produce stable oscillatory behavior in said chemical system.

10. The method of claim 9 wherein said selecting step comprises analyzing the open-loop response of said underlying chemical system.

11. A stable oscillatory chemical system synthesized according to the methods of claim 9.

12. The method of claim 9 wherein said controlling step comprises maintaining the duty cycle of said feedback block at a value of about 50%.

13. The method of claim 9 wherein said feedback block comprises a Schmitt trigger element.

14. The method of claim 13 wherein said Schmitt trigger element comprises an electronic circuit.

15. The method of claim 14 wherein said feedback block comprises a duty cycle controller for the duty cycle of said feedback block.

16. A method of synthesizing a stable oscillatory chemical system from a chemical system for extracting information about the physical characteristics of said chemical system comprising:
(a) selecting an output quantity of the chemical system whose value is readily determined;
(b) selecting an input quantity related to said output quantity such that (i) partial derivative of said output with respect to said input is not zero and (ii) the response of said output is resilient with respect to a change in said input;
(c) connecting a feedback block between said chemical system output and said chemical system input, said feedback block having non-linear dynamics and inverting or non-inverting preaction hysteresis characteristics.

17. The method of claim 16 wherein said selecting step comprises analyzing the open-loop response of said underlying chemical system.

18. A stable oscillatory chemical system synthesized according to the methods of claim 16.

19. The method of claim 16 further comprising the step of controlling the duty cycle of said feedback block.

20. The method of claim 13 wherein said Schmitt trigger element comprises a software algorithm.

* * * * *